(12) United States Patent
Mohan et al.

(10) Patent No.: US 12,007,564 B2
(45) Date of Patent: Jun. 11, 2024

(54) METHODS AND APPARATUSES FOR CORNER DETECTION USING NEURAL NETWORK AND CORNER DETECTOR

(71) Applicant: MAGIC LEAP, INC., Plantation, FL (US)

(72) Inventors: Anush Mohan, San Jose, CA (US); Guy Rosenthal, Tel Aviv (IL); Adi Perry, Tel Aviv (IL); Gilboa Sheveki, Shoham (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/315,766

(22) Filed: May 11, 2023

(65) Prior Publication Data

US 2023/0288703 A1  Sep. 14, 2023

Related U.S. Application Data

(63) Continuation of application No. 16/875,499, filed on May 15, 2020, now Pat. No. 11,686,941.

(Continued)

(51) Int. Cl.
*G06T 7/13* (2017.01)
*G02B 27/01* (2006.01)
(Continued)

(52) U.S. Cl.
CPC ......... *G02B 27/017* (2013.01); *G06F 18/214* (2023.01); *G06N 3/08* (2013.01);
(Continued)

(58) Field of Classification Search
CPC .......... G02B 27/017; G02B 2027/0138; G02B 2027/014; G06F 18/214; G06F 3/011;
(Continued)

(56) References Cited

U.S. PATENT DOCUMENTS 8,831,277 B1    9/2014  Hoke et al.
10,664,722 B1 *  5/2020  Sharma ............... G06F 18/2431
(Continued)

FOREIGN PATENT DOCUMENTS

JP    2017-191501    10/2017
JP    2018-60296     4/2018

OTHER PUBLICATIONS

Foreign Response for JP Patent Appln. No. 2021-568283 dated Dec. 6, 2023.
(Continued)

*Primary Examiner* — Ali Bayat
(74) *Attorney, Agent, or Firm* — Vista IP Law Group, LLP

(57) ABSTRACT

An apparatus configured to be head-worn by a user, includes: a screen configured to present graphics for the user; a camera system configured to view an environment in which the user is located; and a processing unit coupled to the camera system, the processing unit configured to: obtain locations of features for an image of the environment, wherein the locations of the features are identified by a neural network; determine a region of interest for one of the features in the image, the region of interest having a size that is less than a size of the image; and perform a corner detection using a corner detection algorithm to identify a corner in the region of interest.

19 Claims, 28 Drawing Sheets

Related U.S. Application Data

(60) Provisional application No. 62/849,386, filed on May 17, 2019.

(51) Int. Cl.

| | |
|---|---|
| *G06F 18/214* | (2023.01) |
| *G06N 3/08* | (2023.01) |
| *G06T 3/18* | (2024.01) |
| *G06V 10/25* | (2022.01) |
| *G06V 10/44* | (2022.01) |
| *G06V 10/764* | (2022.01) |
| *G06V 10/774* | (2022.01) |
| *G06V 10/82* | (2022.01) |
| *G06V 20/20* | (2022.01) |

(52) U.S. Cl.
CPC .................. *G06T 3/18* (2024.01); *G06T 7/13* (2017.01); *G06V 10/25* (2022.01); *G06V 10/44* (2022.01); *G06V 10/454* (2022.01); *G06V 10/764* (2022.01); *G06V 10/7753* (2022.01); *G06V 10/82* (2022.01); *G06V 20/20* (2022.01); *G02B 2027/0138* (2013.01); *G02B 2027/014* (2013.01)

(58) Field of Classification Search
CPC .......... G06F 3/012; G06F 3/013; G06F 3/017; G06F 3/0346; G06N 3/08; G06N 3/045; G06T 3/18; G06T 7/13; G06T 2207/20164; G06T 2207/30244; G06T 7/246; G06T 2207/20081; G06T 2207/20084; G06V 10/25; G06V 10/44; G06V 10/454; G06V 10/764; G06V 10/7753; G06V 10/82; G06V 20/20
USPC ....................................................... 382/199
See application file for complete search history.

(56) References Cited

U.S. PATENT DOCUMENTS

| | | |
|---|---|---|
| 11,301,045 B1 | 4/2022 | Berme et al. |
| 2008/0272986 A1 | 11/2008 | Lee |
| 2012/0075343 A1 | 3/2012 | Chen et al. |
| 2016/0196654 A1 | 7/2016 | Aoki et al. |
| 2016/0225286 A1 | 8/2016 | Dayal |
| 2016/0267720 A1* | 9/2016 | Mandella ............ G06F 3/03545 |
| 2016/0300121 A1 | 10/2016 | Chertok et al. |
| 2016/0360970 A1 | 12/2016 | Tzvieli et al. |
| 2016/0364623 A1* | 12/2016 | Evans ..................... G06V 10/20 |
| 2017/0076434 A1* | 3/2017 | Pyo ............................ G06T 3/60 |
| 2017/0109580 A1* | 4/2017 | Kaehler ..................... G06T 7/60 |
| 2017/0148222 A1 | 5/2017 | Holzer et al. |
| 2017/0307891 A1 | 10/2017 | Bucknor et al. |
| 2018/0033155 A1* | 2/2018 | Jia ............................. G06T 7/33 |
| 2018/0130241 A1* | 5/2018 | Sunkavalli ................ G06T 5/77 |
| 2018/0137642 A1 | 5/2018 | Malisiewicz et al. |
| 2019/0043244 A1* | 2/2019 | Ranftl ..................... G06T 17/10 |
| 2019/0303648 A1* | 10/2019 | Zhai ..................... G06V 10/764 |
| 2020/0018944 A1 | 1/2020 | Fang et al. |
| 2020/0065559 A1 | 2/2020 | Vats |
| 2020/0074610 A1 | 3/2020 | Pu et al. |
| 2020/0357117 A1 | 11/2020 | Lyman et al. |
| 2021/0262204 A1 | 8/2021 | Tafazoli Bilandi et al. |

OTHER PUBLICATIONS

Foreign OA for JP Patent Appln. No. 2021-568283 dated Sep. 12, 2023.
Non-Final Office Action for U.S. Appl. No. 16/875,499 dated Oct. 13, 2023.
Amendment Response to NFOA for U.S. Appl. No. 16/875,499 dated Jan. 9, 2023.
Notice of Allowance for U.S. Appl. No. 16/875,499 dated Feb. 15, 2023.
PCT International Search Report and Written Opinion for International Appln. No. PCT/US2020/033208, Applicant Magic Leap, Inc., dated Sep. 29, 2020 (13 pages).
Brown et al. "Multi-Scale Oriented Patches." Dec. 2004 (Dec. 2004) Retrieved on Jun. 29, 2020 (Jun. 29, 2020) from <https://lwww.researchgate.net/profile/Simon_Winder/publication/239917360 Multi-Scale_Oriented_Patchesllinks/565e783f08ae4988a7bd62cO/Multi-Scale-Oriented-Patches.pdf> entire document.
Extended European Search Report for EP Patent Appln. No. 20810549.4 dated Jun. 13, 2022.
Liu, L., et al., "Deep Learning for Generic Object Detection: A Survey," arvix.org, dated Sep. 12, 2018.
Akgul, O., "Applying Deep Learning in Augmented Reality Tracking," 2016, 12th International Conference on Signal-Image Technology & Internet-Based Systems.
Foreign Response for EP Patent Appln. No. 20810549.4 dated Jan. 9, 2023.
Foreign NOA for JP Patent Appln. No. 2021-568283 dated Dec. 26, 2023.

* cited by examiner

METHODS AND APPARATUSES FOR CORNER DETECTION USING NEURAL NETWORK AND CORNER DETECTOR

CROSS-REFERENCE TO RELATED APPLICATION(S)

The present application is a continuation of pending U.S. patent application Ser. No. 16/875,499 filed on May 15, 2020, entitled "METHODS AND APPARATUSES FOR CORNER DETECTION USING NEURAL NETWORK AND CORNER DETECTOR", which claims the benefit of, U.S. Provisional Patent Application Ser. No. 62/849,386, filed on May 17, 2019, entitled "METHODS AND APPARATUSES FOR CORNER DETECTION USING NEURAL NETWORK AND CORNER DETECTOR". The contents of the aforementioned U.S. provisional patent applications and U.S. patent applications are hereby explicitly and fully incorporated by reference in their entireties for all purposes, as though set forth in the present application in full.

FIELD OF THE INVENTION

The present application relates to head-worn image display devices, and methods and apparatus for detecting corners in images generated by head-worn image display devices.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. patent application Ser. No. 14/555,585 filed on Nov. 27, 2014, entitled "VIRTUAL AND AUGMENTED REALITY SYSTEMS AND METHODS", the contents of which are hereby expressly and fully incorporated by reference in their entirety, as though set forth in full.

MR systems may employ wearable display devices (e.g., head-worn displays, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a head-worn display device views a virtual representation of a virtual object on the display and walks around an area where the virtual object appears, the virtual object can be rendered for each viewpoint, giving the user the perception that they are walking around an object that occupies real space. If the head-worn display device is used to present multiple virtual objects, measurements of head pose can be used to render the scene to match the user's dynamically changing head pose and provide an increased sense of immersion.

Head-worn display devices that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the head-worn display device to capture images or videos of the scene being viewed by the user.

Current optical systems, such as those in MR systems, optically render virtual content. Content is "virtual" in that it does not correspond to real physical objects located in respective positions in space. Instead, virtual content only exists in the brains (e.g., the optical centers) of a user of the head-worn display device when stimulated by light beams directed to the eyes of the user.

In some cases, a head-worn image display device may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment. Localization map may be used by head-worn image display device to perform localization. In particular, when performing localization, the image display device may obtain a real-time input image from camera system of the image display device, and match features in the input image with features of the localization map.

Accordingly, feature detection is an important feature for the head-worn image display device. Methods and apparatuses for detecting features, such as corners, in images are described herein. The detected corners may be utilized as features for creating localization maps. Alternatively, the corners may be detected as features from input images for matching with features of localization map for localization of a user.

SUMMARY

The present application relates generally to interest point detection using a combination of neural network and corner detector.

In one embodiment described herein, a hybrid approach (using both the neural network and feature detector) utilizes hardware and/or software block(s) for real-time or non-real-time processing images to extract features (e.g., corners) candidates, together with a neural network (e.g., a light-weight neural network) to efficiently classify and extract areas where there are good candidates of features (e.g., corners). Then good features (e.g., corners) are selected from the candidates. This technique is better than existing solutions, which struggle with higher image noise (e.g., in low light), and areas where it is hard to identify a feature (e.g., a corner) since all of the existing solutions are very local by their nature. The advantage of the neural network is that it uses a larger context of the image to identify a feature (e.g., corner) even if it is difficult to do it based on the nearby pixels alone. The hybrid approach is also better than other neural networks that are trained to extract features (e.g., corners). In particular, these neural networks are not nearly as fast and as efficient as the hybrid approach described herein, because they extract features (e.g., corners) end-to-end, which takes a lot of computational resources and memory, and is not real-time.

An apparatus configured to be head-worn by a user, includes: a screen configured to present graphics for the user; a camera system configured to view an environment in which the user is located; and a processing unit coupled to the camera system, the processing unit configured to: obtain locations of features for an image of the environment, wherein the locations of the features are identified by a neural network; determine a region of interest for one of the features in the image, the region of interest having a size that is less than a size of the image; and perform a corner detection using a corner detection algorithm to identify a corner in the region of interest.

An apparatus configured to be head-worn by a user includes: a screen configured to present graphics for the user; a camera system configured to view an environment in which the user is located; and a processing unit coupled to the camera system, the processing unit configured to: obtain locations of features for image data associated with the environment, wherein the locations of the features are identified by a neural network; determine a region of interest for one of the features in the image, the region of interest having a size that is less than a size of the image; and perform a corner detection using a corner detection algorithm to identify a corner in the region of interest.

Optionally, the processing unit is configured to determine the region of interest as having a position that is based on at least one of the locations identified by the neural network, and wherein the position is with respect to the image.

Optionally, the image data is associated with at least one image that is generated by the camera system and transmitted to the neural network.

Optionally, the camera system is configured to generate the image, and transmit the image to the neural network.

Optionally, the neural network is in a module of the apparatus.

Optionally, the neural network is implemented in one or more computing devices that are remote from the apparatus.

Optionally, the neural network has machine learning capability.

Optionally, the processing unit is configured to obtain the locations of the features by obtaining a heatmap generated by the neural network, the heatmap indicating the locations of the features.

Optionally, the region of interest comprises a N×N patch, and the processing unit is configured to perform the corner detection on the N×N patch, and wherein N is an integer larger than 1.

Optionally, the region of interest comprises a patch having 144 pixels or less, and the processing unit is configured to perform the corner detection on the patch.

Optionally, the region of interest comprises a 8×8 patch, and the processing unit is configured to perform the corner detection on the 8×8 patch.

Optionally, the image data includes at least one low resolution image that is reduced in resolution from at least one high resolution image generated by the camera system.

Optionally, the image has a first resolution, and wherein the locations of the features are identified by the neural network based on other image having a second resolution that is less than the first resolution.

Optionally, the processing unit is also configured to convert the image with the first resolution to the other image with the second resolution.

Optionally, the first resolution comprises a VGA resolution.

Optionally, the second resolution comprises a QVGA resolution.

Optionally, the apparatus further includes the neural network.

Optionally, the neural network has been trained using a reference dataset.

Optionally, the neural network comprises a convolutional neural network.

Optionally, the neural network is configured to compute interest point locations and descriptors.

Optionally, the neural network comprises an encoder configured to down sample an input image spatially.

Optionally, the neural network also comprises: an interest point decoder configured to operate on an encoder output from the encoder, and produce a score for each pixel in the input image; and a descriptor decoder configured to operate on the encoder output, unsampled the encoder output to a higher resolution, and produce a vector for each pixel in the input image.

Optionally, the neural network is configured to use homographic adaptation for improving geometric consistency of an interest point detector.

Optionally, the neural network comprises a convolutional neural network configured to train the interest point detector.

Optionally, the neural network is configured to perform image warping to create one or more warped images in the homographic adaptation.

Optionally, the processing unit is configured to determine a position of the corner in the image based at least in part on a position of the corner in the region of interest.

Optionally, the apparatus further includes a non-transitory medium configured to store the position of the first corner in the image.

Optionally, the processing unit is configured to determine a score for each pixel in the region of interest.

Optionally, the neural network is a part of the processing unit.

Optionally, the apparatus further includes the neural network, the neural network being communicatively coupled to the processing unit.

A method performed by a head-worn image display device, includes: obtaining locations of features in an image, wherein the locations of the features are identified by a neural network; determining a region of interest for one of the features in the image, the region of interest having a size that is less than a size of the image; and performing a corner detection using a corner detection algorithm to identify a corner in the region of interest.

Optionally, wherein the region of interest is determined as having a position that is based on at least one of the locations identified by the neural network, and wherein the position is with respect to the image.

Optionally, the method further includes: generating the image; and transmitting the image to the neural network.

Optionally, the neural network is in a module of the head-worn image display device.

Optionally, the neural network is implemented in one or more computing devices that are remote from the head-worn image display device.

Optionally, the neural network has machine learning capability.

Optionally, the locations of the features are obtained by receiving a heatmap from the neural network, wherein the heatmap indicates the locations of the features.

Optionally, the region of interest comprises a N×N patch, and the corner detection is performed on the N×N patch, and wherein N is an integer larger than 1.

Optionally, the region of interest comprises a patch having 144 pixels or less, and the corner detection is performed on the patch.

Optionally, the region of interest comprises a 8×8 patch, and the corner detection is performed on the 8×8 patch.

Optionally, the image has a first resolution, and wherein the locations of the features are identified by the neural network based on other image having a second resolution that is less than the first resolution.

Optionally, the method further includes converting the image with the first resolution to the other image with the second resolution.

Optionally, the first resolution comprises a VGA resolution.

Optionally, the second resolution comprises a QVGA resolution.

Optionally, the method further includes the neural network.

Optionally, the neural network has been trained using a reference dataset.

Optionally, the neural network comprises a convolutional neural network.

Optionally, the neural network is configured to compute interest point locations and descriptors.

Optionally, the neural network comprises an encoder configured to down sample an input image spatially.

Optionally, the neural network also comprises: an interest point decoder configured to operate on an encoder output from the encoder, and produce a score for each pixel in the input image; and a descriptor decoder configured to operate on the encoder output, unsampled the encoder output to a higher resolution, and produce a vector for each pixel in the input image.

Optionally, the neural network is configured to use homographic adaptation for improving geometric consistency of an interest point detector.

Optionally, the neural network comprises a convolutional neural network, and wherein the interest point detector is trained with the convolutional neural network.

Optionally, the neural network is configured to perform image warping to create one or more warped images in the homographic adaptation.

Optionally, the method further includes determining a position of the corner in the image based at least in part on a position of the corner in the region of interest.

Optionally, the method further includes storing the position of the first corner in the image in a non-transitory medium.

Optionally, the method further includes determining a score for each pixel in the region of interest.

A method of training and using a neural network for image interest point detection, includes: generating a reference dataset comprising a plurality of reference sets, wherein each of the plurality of reference sets includes: an image; and a set of reference interest points corresponding to the image; and for each reference set of the plurality of reference sets: generating a warped image by applying a homograph to the image; generating a warped set of reference interest points by applying the homograph to the set of reference interest points; calculating, by the neural network receiving the image as input, a set of calculated interest points and a calculated descriptor; calculating, by the neural network receiving the warped image as input, a set of calculated warped interest points and a calculated warped descriptor; calculating a loss based on the set of calculated interest points, the calculated descriptor, the set of calculated warped interest points, the calculated warped descriptor, the set of reference interest points, the warped set of reference interest points, and the homograph; and modifying the neural network based on the loss; wherein the method further comprises: obtaining locations of features in an input image, wherein the locations of the features are identified by the neural network; determining a region of interest for one of the features in the input image, the region of interest having a size that is less than a size of the input image; and performing a corner detection using a corner detection algorithm to identify a corner in the region of interest.

Optionally, the neural network includes an interest point detector subnetwork and a descriptor subnetwork, wherein: the interest point detector subnetwork is configured to receive the image as input and calculate the set of calculated interest points based on the image; and the descriptor subnetwork is configured to receive the image as input and calculate the calculated descriptor based on the image.

Optionally, modifying the neural network based on the loss includes modifying one or both of the interest point detector subnetwork and the descriptor subnetwork based on the loss.

Optionally, the method further includes prior to generating the reference dataset, training the interest point detector subnetwork using a synthetic dataset including a plurality of synthetic images and a plurality of sets of synthetic interest points, wherein generating the reference dataset includes generating the reference dataset using the interest point detector subnetwork.

Optionally, generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of sets of calculated warped interest points; generating a plurality of sets of calculated interest points by applying a plurality of inverse homographs to the plurality of sets of calculated warped interest points; and aggregating the plurality of sets of calculated interest points to obtain the set of reference interest points.

Optionally, each of the plurality of reference sets further includes a reference descriptor corresponding to the image, and wherein generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of calculated warped descriptors; generating a plurality of calculated descriptors by applying a plurality of inverse homographs to the plurality of calculated warped descriptors; and aggregating the plurality of calculated descriptors to obtain the reference descriptor.

Optionally, the set of reference interest points is a two-dimensional map having values corresponding to a probability that a particular pixel of the image has an interest point is located at the particular pixel.

A method includes: capturing a first image; capturing a second image; calculating, by a neural network receiving the first image as input, a first set of calculated interest points and a first calculated descriptor; calculating, by the neural network receiving the second image as input, a second set of calculated interest points and a second calculated descriptor; and determining a homograph between the first image and the second image based on the first and second sets of calculated interest points and the first and second calculated descriptors; wherein the neural network includes: an interest point detector subnetwork configured to calculate the first set of calculated interest points and the second set of calculated interest points, and a descriptor subnetwork configured to calculate the first calculated descriptor and the second calculated descriptor; and wherein the method further comprises: obtaining locations of features in an input image, wherein the locations of the features are identified by the neural network; determining a region of interest for one of the features in the input image, the region of interest having a size that is less than a size of the input image; and performing a corner detection using a corner detection algorithm to identify a corner in the region of interest.

Optionally, the interest point detector subnetwork is configured to calculate the first set of calculated interest points concurrently with the descriptor subnetwork calculating the first calculated descriptor; and the interest point detector subnetwork is configured to calculate the second set of calculated interest points concurrently with the descriptor subnetwork calculating the second calculated descriptor.

Optionally, the method further includes training the neural network by generating a reference dataset comprising a plurality of reference sets, wherein each of the plurality of reference sets includes an image and a set of reference interest points corresponding to the image; and for each reference set of the plurality of reference sets: generating a warped image by applying a homograph to the image; generating a warped set of reference interest points by applying the homograph to the set of reference interest points; calculating, by the neural network receiving the image as input, a set of calculated interest points and a calculated descriptor; calculating, by the neural network receiving the warped image as input, a set of calculated warped interest points and a calculated warped descriptor; calculating a loss based on the set of calculated interest points, the calculated descriptor, the set of calculated warped interest points, the calculated warped descriptor, the set of reference interest points, the warped set of reference interest points, and the homograph; and modifying the neural network based on the loss.

Optionally, modifying the neural network based on the loss includes modifying one or both of the interest point detector subnetwork and the descriptor subnetwork based on the loss.

Optionally, the method further includes, prior to generating the reference dataset, training the interest point detector subnetwork using a synthetic dataset including a plurality of synthetic images and a plurality of sets of synthetic interest points, wherein generating the reference dataset includes generating the reference dataset using the interest point detector subnetwork.

Optionally, generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of sets of calculated warped interest points; generating a plurality of sets of calculated interest points by applying a plurality of inverse homographs to the plurality of sets of calculated warped interest points; and aggregating the plurality of sets of calculated interest points to obtain the set of reference interest points.

Optionally, each of the plurality of reference sets further includes a reference descriptor corresponding to the image, and wherein generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of calculated warped descriptors; generating a plurality of calculated descriptors by applying a plurality of inverse homographs to the plurality of calculated warped descriptors; and aggregating the plurality of calculated descriptors to obtain the reference descriptor.

An optical device includes: at least one camera configured to capture a first image and a second image; and one or more processors coupled to the camera and configured to perform operations comprising: receiving the first image and the second image from the at least one camera; calculating, by a neural network using the first image as an input, a first set of calculated interest points and a first calculated descriptor; calculating, by the neural network using the second image as an input, a second set of calculated interest points and a second calculated descriptor; and determining a homograph between the first image and the second image based on the first and second sets of calculated interest points and the first and second calculated descriptors; wherein the neural network includes: an interest point detector subnetwork configured to calculate the first set of calculated interest points and the second set of calculated interest points; and a descriptor subnetwork configured to calculate the first calculated descriptor and the second calculated descriptor; and wherein the one or more processors are configured to: obtain locations of features in an input image, wherein the locations of the features are identified by the neural network; determine a region of interest for one of the features in the input image, the region of interest having a size that is less than a size of the image; and perform a corner detection using a corner detection algorithm to identify a corner in the region of interest.

Optionally, the interest point detector subnetwork is configured to calculate the first set of calculated interest points concurrently with the descriptor subnetwork calculating the first calculated descriptor; and the interest point detector subnetwork is configured to calculate the second set of calculated interest points concurrently with the descriptor subnetwork calculating the second calculated descriptor.

Optionally, the neural network was previously trained by generating a reference dataset comprising a plurality of reference sets, wherein each of the plurality of reference sets includes an image and a set of reference interest points corresponding to the image; and for each reference set of the plurality of reference sets: generating a warped image by applying a homograph to the image; generating a warped set of reference interest points by applying the homograph to the set of reference interest points; calculating, by the neural network receiving the image as input, a set of calculated interest points and a calculated descriptor; calculating, by the neural network receiving the warped image as input, a set of calculated warped interest points and a calculated warped descriptor; calculating a loss based on the set of calculated interest points, the calculated descriptor, the set of calculated warped interest points, the calculated warped descriptor, the set of reference interest points, the warped set of reference interest points, and the homograph; and modifying the neural network based on the loss.

Optionally, modifying the neural network based on the loss includes modifying one or both of the interest point detector subnetwork and the descriptor subnetwork based on the loss.

Optionally, generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of sets of calculated warped interest points; generating a plurality of sets of calculated interest points by applying a plurality of inverse homographs to the plurality of sets of calculated warped interest points; and aggregating the plurality of sets of calculated interest points to obtain the set of reference interest points.

Optionally, each of the plurality of reference sets further includes a reference descriptor corresponding to the image, and wherein generating the reference dataset includes: for each reference set of the plurality of reference sets: obtaining the image from an unlabeled dataset comprising a plurality of unlabeled images; generating a plurality of warped images by applying a plurality of homographs to the image; calculating, by the neural network receiving the plurality of warped images as input, a plurality of calculated warped descriptors; generating a plurality of calculated descriptors by applying a plurality of inverse homographs to the plurality of calculated warped descriptors; and aggregating the plurality of calculated descriptors to obtain the reference descriptor.

Additional and other objects, features, and advantages of the application are described in the detail description, figures and claims.

BRIEF DESCRIPTION OF THE DRAWINGS

The drawings illustrate the design and utility of various embodiments of the present application. It should be noted that the figures are not drawn to scale and that elements of similar structures or functions are represented by like reference numerals throughout the figures. In order to better appreciate how to obtain the above-recited and other advantages and objects of various embodiments of the present application, a more detailed description of the present applications briefly described above will be rendered by reference to specific embodiments thereof, which are illustrated in the accompanying drawings. Understanding that these drawings depict only typical embodiments of the application and are not therefore to be considered limiting of its scope, the application will be described and explained with additional specificity and detail through the use of the accompanying drawings in which.

DETAILED DESCRIPTION

Figure 1:
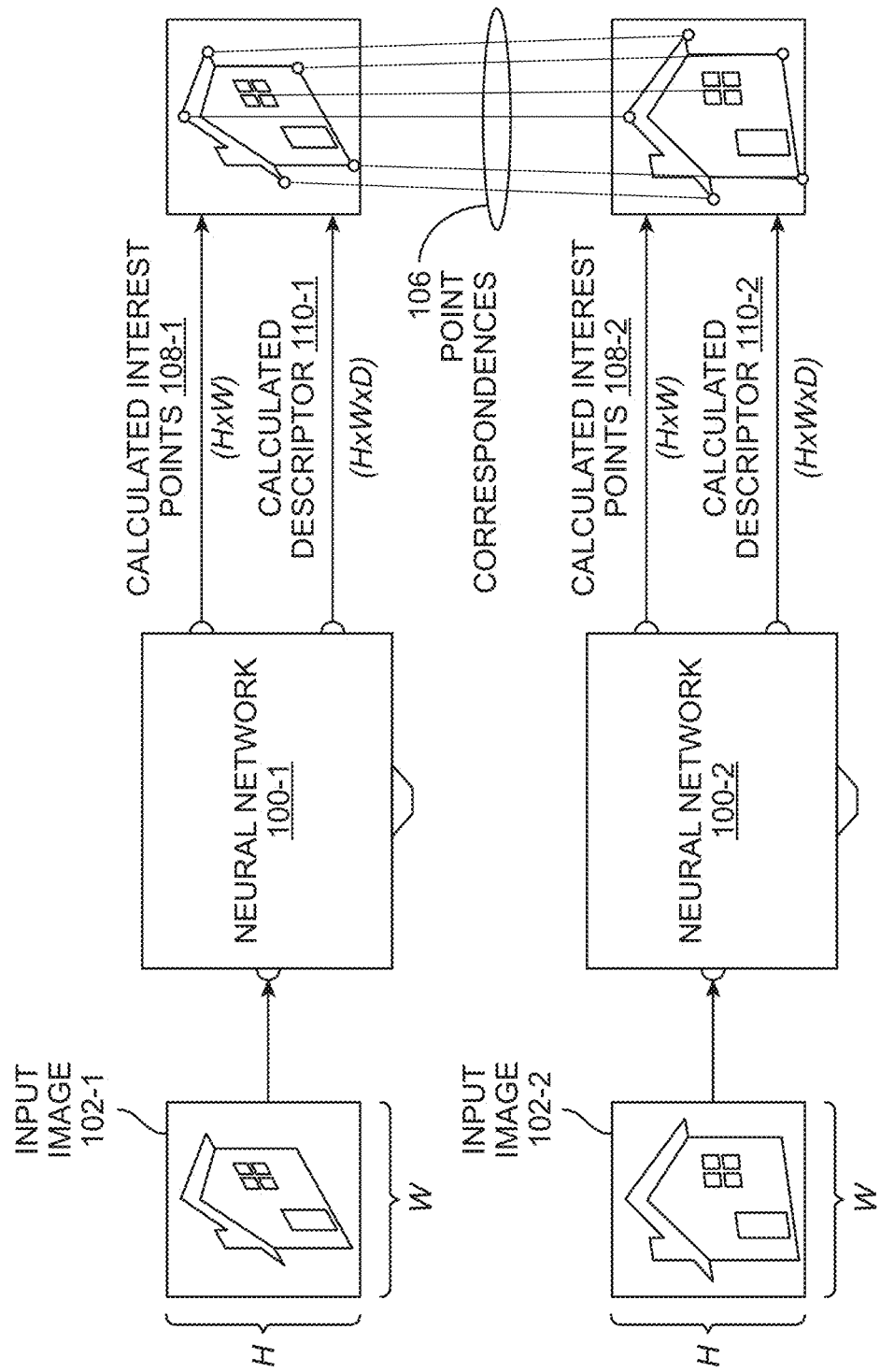
FIG. 1 illustrates a determination of point correspondences between interest points of a pair of input images using a neural network, according to some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lend themselves to applications in other types of display systems (including other types of VR, AR, and/or MR systems), and therefore the embodiments are not to be limited to only the illustrative examples disclosed herein.

Convolutional neural networks have been shown to be superior to hand-engineered representations on almost all tasks requiring images as input. In particular, fully convolutional neural networks which predict two-dimensional (2D) "key-points" or "landmarks" are well studied for a variety of tasks such as human pose estimation, object detection, and room layout estimation. Some of these techniques utilize a large dataset of 2D ground truth locations labeled with human annotations. It seems natural to similarly formulate interest point detection as a large-scale supervised machine learning problem and train the latest convolutional neural network architecture to detect them. Unfortunately, when compared to more semantic tasks such as human-body key-point estimation, where a network is trained to detect semantic body parts such as the corner of the mouth or left ankle, the notion of interest point detection is semantically ill-defined. This difficulty makes training convolution neural networks with strong supervision of interest points non-trivial.

Instead of using human supervision to define interest points in real images, embodiments described herein offer a self-supervised solution using self-training. In the approaches of the embodiments described herein, a large dataset of pseudo-ground truth interest point locations in real images is created, supervised by the interest point detector itself rather than human knowledge. To generate the psuedo-ground truth interest points, a fully convolutional neural network is first trained on millions of unique examples from a synthetic image dataset. As feature extraction is a basic step for image matching and tracking in image sequences, it was acknowledged that detection and precise location of distinct points may be important. These distinct points were characterized as corners, edges (basic elements for the analysis of poly-hedra), and centers of circular features, such as holes, disk, or rings. Junctions (Y, X, T, L) were also deemed critical for detecting such distinct points. For example, T-junctions generically indicate interposition and hence depth discontinuities.

Borrowing from these insights, a large dataset of synthetic shapes for large-scale training of the interest point detector may be created consisting of simple geometric shapes where there is no ambiguity in the interest point locations. The interest point detector as described herein was shown to significantly outperform traditional interest point detectors on the dataset of synthetic shapes. When applied to real images, the interest point detector performs well considering that domain adaptation is a known problem when training on synthetic images. However, when compared to classical interest point detectors on a diverse set of image textures and patterns, the performance of the interest point detector is not so consistent. To bridge the gap in performance on real world images between the interest point detector and classical detectors, one or more embodiments described herein include a feature (which may be referred to herein as homographic adaptation) that permits multi-scale, multi-transforms.

Homographic adaptation enables self-supervised training of interest point detectors. In some embodiments, it warps the input image multiple times to help an interest point detector see the scene from many different viewpoints and scales. When used in conjunction with the interest point detector to generate the psuedo-ground truth interest points and boost the performance of the detector, the resulting detections are more repeatable. One step after detecting robust and repeatable interest points is to attach a fixed dimensional descriptor vector to each point (or to all image pixels), which can be used for matching interest points across images. Therefore, in some embodiments, the interest point detector subnetwork may be combined with a descriptor subnetwork. The resulting network can be used to extracts points from a pair of images and establish point correspondences, as shown in FIG. 1.

According to some embodiments, which includes a self-supervised approach, an initial interest point detector and a homographic adaptation procedure automatically labels images from a target, unlabeled domain. The generated labels are in turn used to train a fully convolutional network that jointly extracts points and descriptors from an image. The fully convolutional network can be used in a wide range of applications, particularly those involving image-to-image geometry tasks such as computing a homograph between two images. Homographs give exact, or almost exact, image-to-image transformations for camera motion with only rotation around the camera center, scenes with large distances to objects, and planar scenes. Because most of the world is reasonably planar, a homograph is good model for what happens when the same three-dimensional (3D) point is seen from different viewpoints. Because homographs do not require 3D information, they can be randomly sampled and easily applied to any 2D image involving little more than bilinear interpolation. For these reasons, homographs are utilized in some embodiments.

FIG. 1 illustrates the determination of point correspondences 106 between the interest points of a pair of input images 102 using a neural network 100, according to some embodiments. Specifically, FIG. 1 shows two instantiations of neural network 100 (i.e., neural networks 100-1, 100-2) that is a fully convolutional neural network that computes scale invariant feature transform (SIFT)-like 2D interest point locations and descriptors in a single forward pass utilizing point correspondence. When receiving input images 102-1, 102-2 as input, neural networks 100-1, 100-2 calculate sets of calculated interest points 108-1, 108-2 and calculated descriptors 110-1, 110-2 based on input images 102-1, 102-2, respectively. Point correspondences 106 are then determined by a comparison between calculated interest points 108-1, 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures.

According to one example, a first interest point corresponding to input image 102-1 may be determined to correspond to a second interest point corresponding to input image 102-2 by determining that, amongst the five closest interest points (according to pixel-to-pixel distance) to the first interest point, the descriptor associated with the second interest point is most similar (determined by, for example, using the L2 distance) to the descriptor associated with the first interest point, as compared to the descriptors associated with the five closest interest points. According to another example, a first interest point corresponding to input image 102-1 may be determined to correspond to a second interest point corresponding to input image 102-2 by determining that, amongst all interest points corresponding to input image 102-2, the descriptor associated with the second interest point is most similar to the descriptor associated with the first interest point, as compared to the descriptors associated with all interest points corresponding to input image 102-2.

Figure 2:
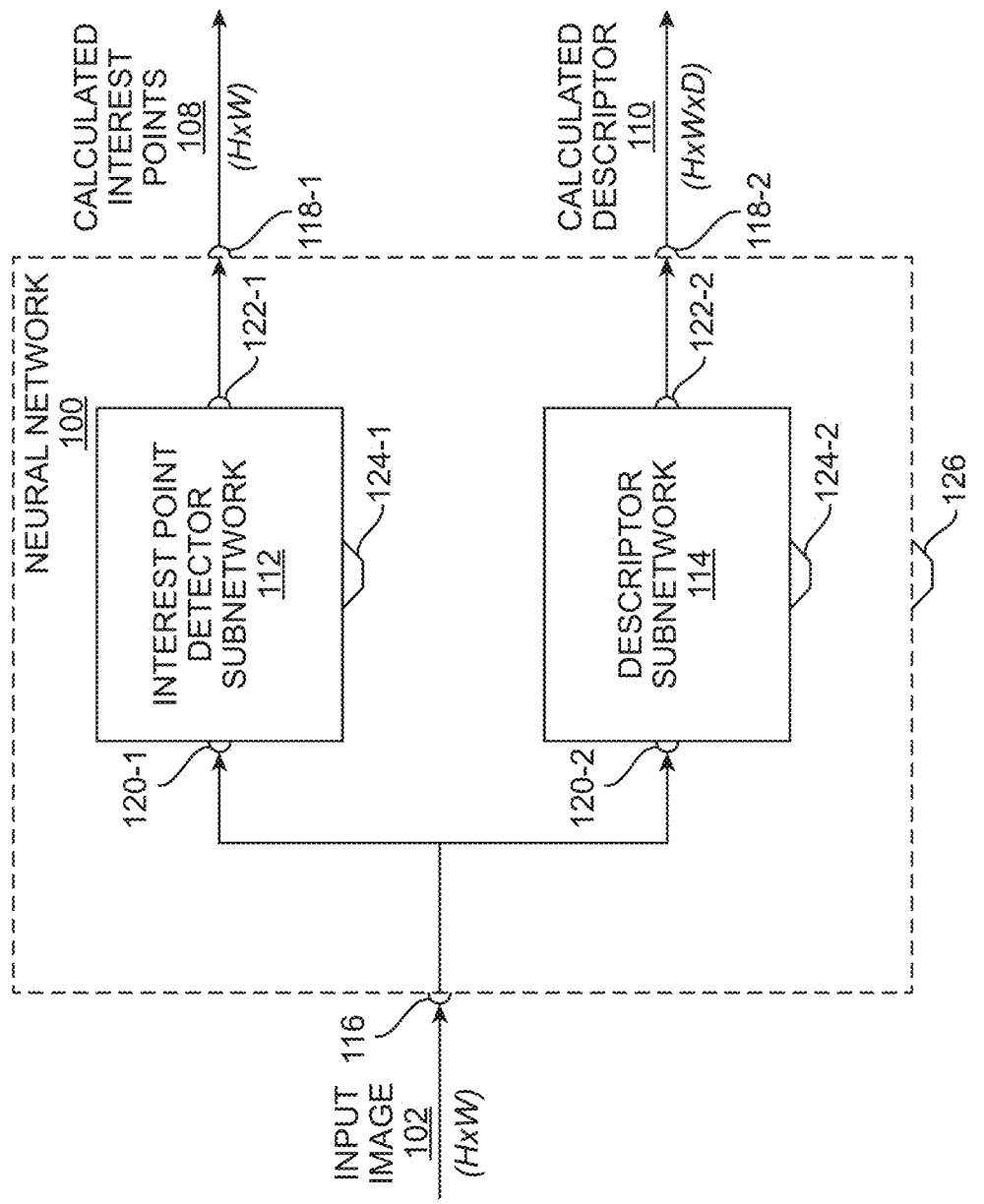
FIG. 2 illustrates a general architecture of a neural network, according to some embodiments.

FIG. 2 illustrates a general architecture of neural network 100, according to some embodiments. Neural network 100 may include an interest point detector subnetwork 112 and a descriptor subnetwork 114, each of the two subnetworks having a single subnetwork input 120-1, 120-2 (respectively) and a single subnetwork output 122-1, 122-2 (respectively). Although the two subnetworks are illustrated separately, they may share one or more convolutional layers and/or neurons as described in reference to FIG. 9. In some embodiments, neural network 100 may include a network input 116 configured to receive input image 102 as input. Input image 102 may then be fed to subnetwork inputs 120-1, 120-2. Upon receiving input image 102 at subnetwork input 120-1, interest point detector subnetwork 112 may calculate and output calculated interest points 108 at subnetwork output 122-1, which is then fed into network output 118-1. Upon receiving input image 102 at subnetwork input 120-2, descriptor subnetwork 114 may calculate and output calculated descriptor 110 at subnetwork output 122-2, which is then fed into network output 118-2. Accordingly, subnetworks 112, 114 can provide different outputs based on the same input, and represent different branches of neural network 100.

Neural network 100 may operate on a full-sized image and may produce interest point detections accompanied by fixed length descriptors in a single forward pass. In some embodiments, input image 102 may have a dimensionality of H×W where H is the height of input image 102 in pixels and W is the width of input image 102 in pixels. In the same embodiments, calculated interest points 108 may be a list of interest point pixel locations (e.g., a list of coordinate pairs) or, additionally or alternatively, calculated interest points 108 may be a 2D map having a dimensionality of H×W where each pixel corresponds to a probability "point" for that pixel in the input (i.e., input image 102). In the same embodiments, calculated descriptor 110 may be a set of fixed length descriptors, each of which corresponds to an identified interest point or, additionally or alternatively, calculated descriptor 110 may have a dimensionality of H×W×D where D is the length of the descriptors calculated at each pixel of the H×W image. Accordingly, even pixels having a low probability of containing an interest point have a descriptor of length D.

Training of neural network 100 may be enabled by network modifier 126 and/or subnetwork modifiers 124-1, 124-2, which may receive an error signal, a loss signal, and/or a correction signal during a training phase causing layers and/or neurons of the networks to be modified. Neural network 100 may be modified such that an error between the network outputs (calculated interest points 108 and calculated descriptor 110) and ground truth data may be reduced during subsequent runs with the same input image 102 or different images. For example, neural network 100 may be modified based on an error signal/value that indicates a difference between an output and ground truth, based on a loss signal/value that indicates some quantity that is to be minimized, and/or based on a correction signal that indicates a specific modification to be made to neural network 100. Modifying neural network 100 may include modifying only interest point detector subnetwork 112, modifying only descriptor subnetwork 114, and/or modifying both of subnetworks 112, 114.

Figure 3:
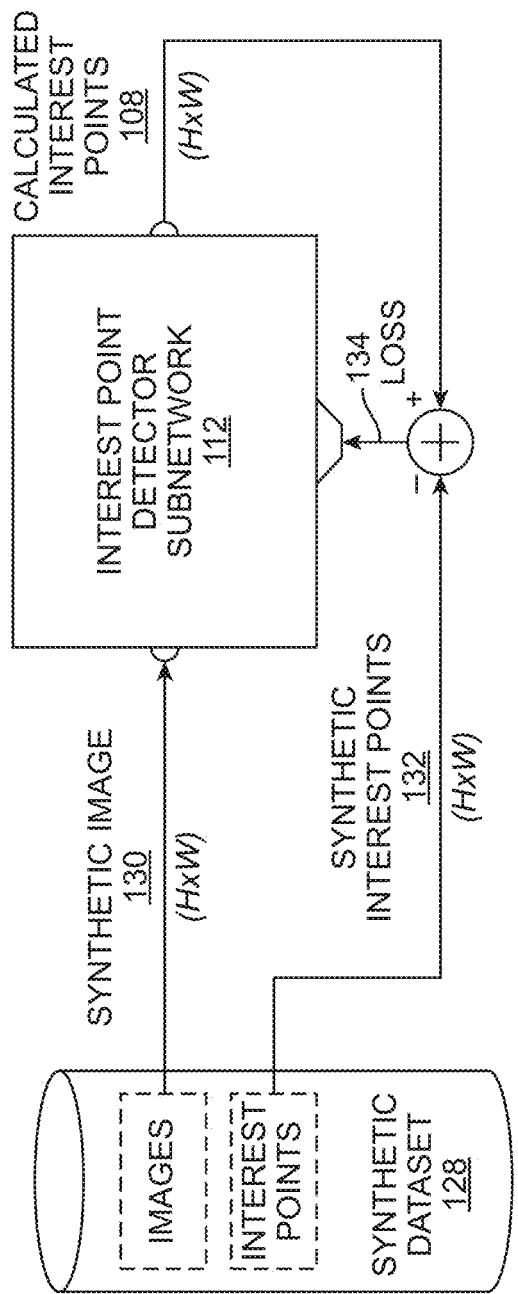
FIG. 3 illustrates a first training step according to some embodiments in which an interest point detector subnetwork is trained using a synthetic dataset comprising a plurality of synthetic images.

FIG. 3 illustrates a first training step according to some embodiments in which interest point detector subnetwork 112 is trained using a synthetic dataset 128 comprising a plurality of synthetic images. The training step illustrated in FIG. 3 may only include interest point detector subnetwork 112 and may ignore descriptor subnetwork 114. Because there is no pre-existing large database of interest point labeled images, a deep interest point detector benefits from the creation of a large-scale synthetic dataset that consists of simplified 2D geometry via synthetic data rendering of quadrilaterals, triangles, lines and ellipses. Examples of these shapes are shown in reference to FIG. 7. In this dataset, label ambiguity can be removed by modeling interest points with simple Y-junctions, L-junctions, T-junctions as well as centers of tiny ellipses and end points of line segments.

Once the synthetic images are rendered, homographic warps are applied to each image to augment the number of training examples. The data may be generated in real time and no example may be seen by the network twice. During a single training iteration, a synthetic image 130 is provided to interest point detector subnetwork 112, which calculates a set of calculated interest points 108. A set of synthetic interest points 132 corresponding to synthetic image 130 are compared to calculated interest points 108 and a loss 134 is calculated based on the comparison. Interest point detector subnetwork 112 is then modified based on loss 134. Multiple training iterations are performed until one or more conditions are met, such as loss 134 dropping below a predetermined threshold and/or synthetic dataset 128 being exhaustively used.

Compared to other traditional corner detection approaches such as FAST, Harris corners, and Shi-Tomasi's "Good Features to Track", interest point detector subnetwork 112 produces superior results on synthetic dataset 128. Further evaluation of interest point detector subnetwork consisted of using simple synthetic geometry that a human could easily label with the ground truth corner locations. In one performance evaluation, two different models of interest point detector subnetwork 112 were used. Both models shared the same encoder architecture but differed in the number of neurons per layer, the first model having 64-64-64-64-128-128-128-128 neurons per layer and the second model having 9-9-16-16-32-32-32-32 neurons per layer. Each detector was given an evaluation dataset with synthetic dataset 128 to determine how well they localized simple corners. An evaluation demonstrated that interest point detector subnetwork 112 outperformed the classical detectors in all categories, with the classical detectors having difficulty with random inputs in particular.

Figure 4:
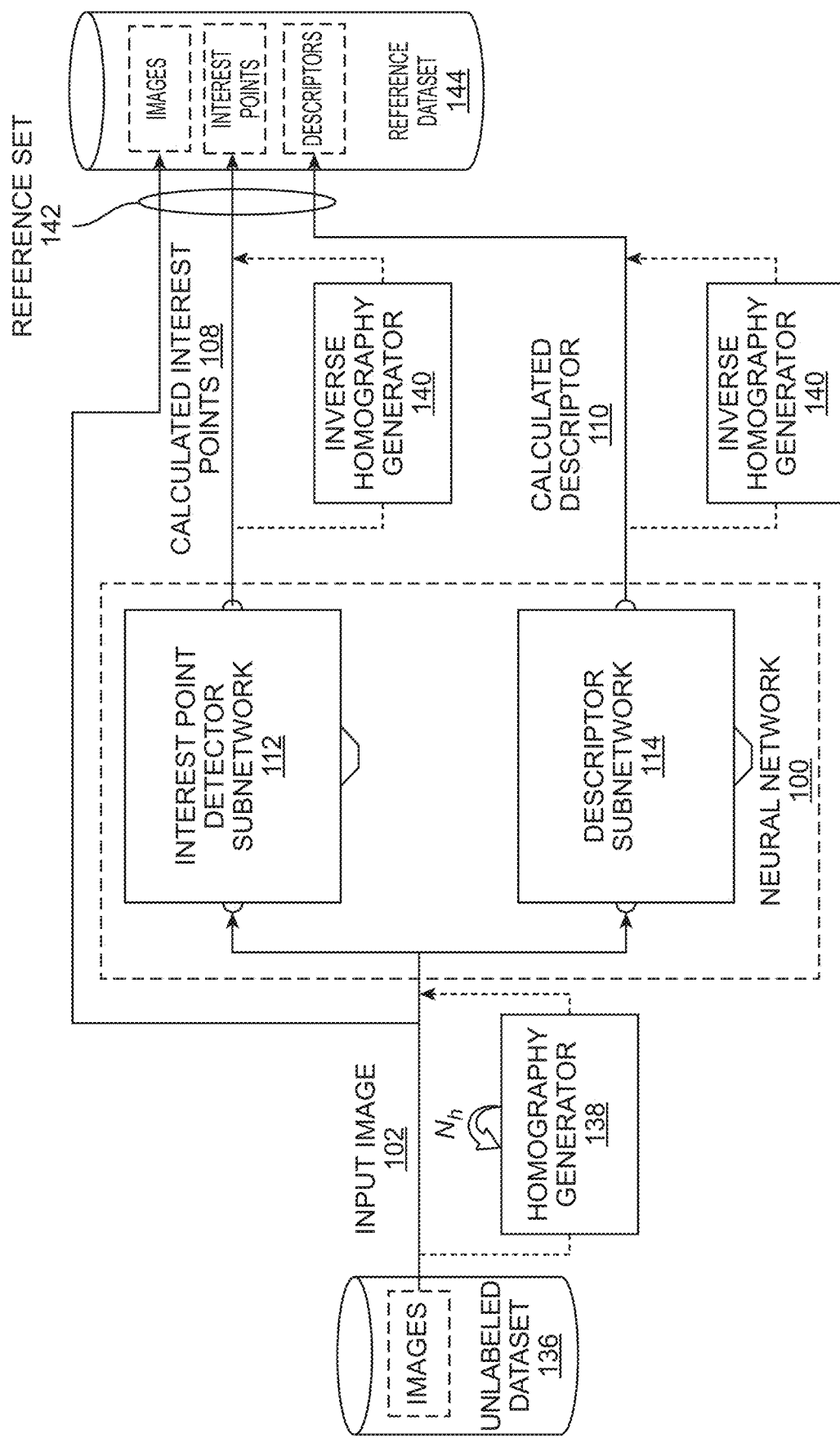
FIG. 4 illustrates a second training step according to some embodiments in which a reference dataset is compiled using homographic adaptation.

FIG. 4 illustrates a second training step according to some embodiments in which a reference dataset 144 is compiled using homographic adaptation. Reference dataset 144 represents a pseudo-ground truth dataset that includes images taken from an unlabeled dataset 136 comprising, for example, real world images, as well as reference interest points and reference descriptors. Input image 102 is taken from unlabeled dataset 136 and is provided to neural network 100, which calculates a set of calculated interest points 108 and a calculated descriptor 110 based on input image 102. Data may be stored in reference dataset 144 as a reference set 142, each reference set 142 including input image 102, the calculated interest point 108 corresponding to input image 102, and the calculated descriptor 110 corresponding to input image 102.

During a single training iteration, homographic adaptation may be employed to use the average response across a large number of homographic warps of input image 102. A homograph generator 138 may be used to apply a plurality of random or pseudo-random homographs to input image 102 prior to passing the image through neural network 100. On the other side of neural network 100, an inverse homograph generator 140 may be used to apply a plurality of inverse homographs to calculated interest points 108, the plurality of inverse homographs, being the inverse of the plurality of homographs so as to unwarp calculated interest points 108. The process may repeat, for the same input image 102, to obtain a plurality of unwarped calculated interest points. The plurality of unwarped calculated interest points may be aggregated/combined to obtain the set of reference interest points that is stored in reference dataset 144 along with input image 102 and the reference descriptor as part of reference set 142.

Additionally, or alternatively, homographic adaptation may be employed to improve the descriptors outputted by neural network 100. For example, during a single training iteration, homograph generator 138 may be used to apply a plurality of random or pseudo-random homographs to input image 102 prior to passing the image through neural network 100. On the other side of neural network 100, an inverse homograph generator 140 may be used to apply a plurality of inverse homographs to calculated descriptor 110, the plurality of inverse homographs being the inverse of the plurality of homographs so as to unwarp calculated descriptor 110. The process may repeat, for the same input image 102, to obtain a plurality of unwarped calculated descriptors. The plurality of unwarped calculated descriptors may be aggregated/combined to obtain the reference descriptor that is stored in reference dataset 144 along with input image 102 and the set of reference interest points as part of reference set 142.

The number of homographic warps Nh is a hyper-parameter of this approach. In some embodiments, the first homograph is set be equal to identity, so that Nh=1 (meaning no adaptation). In testing, the range of Nh was varied to try and determine a preferred value, with Nh in some embodiments running from small (Nh=10), to medium (Nh=100), and large (Nh=1000). Results suggest there are diminishing returns when performing more than 100 homographs. On a held-out set of images from MS-COCO, a repeatability score of 0.67 without any homographic adaptation was met, a repeatability boost of 21% when performing Nh=100 transforms, and a repeatability boost of 22% when Nh=1000 sufficiently demonstrated minimal benefit of using more than 100 homographs.

When combining interest point response maps or descriptor maps, it may be beneficial to differentiate between within-scale aggregation and across-scale aggregation. Real-world images typically contain features at different scales, as some points which would be deemed interesting in high-resolution images, are often not even visible in coarser, lower resolution images. However, within a single-scale, transformations of the image such as rotations and translations should not make interest points appear/disappear. This underlying multi-scale nature of images has different implications for within-scale and across-scale aggregation strategies. Within scale aggregation should be similar to computing the intersection of a set and across-scale aggregation should be similar to the union of a set. The average response across scale can also be used as a multi-scale measure of interest point confidence. The average response across scales is maximized when the interest point is visible across all scales, and these are likely to be the most robust interest points for tracking applications.

When aggregating across scales, the number of scales considered Ns is a hyper-parameter of the approach. The setting of Ns=1 corresponds to no multi-scale aggregation (or simply aggregating across the large possible image size only). In some embodiments, for Ns>1, the multi-scale set of images being processed are referred to as "the multi-scale image pyramid." Weighting schemes that weigh levels of the pyramid differently may give higher-resolution images a larger weight. This may be important because interest points detected at lower resolutions have poor localization ability, and final aggregated points should be localized as well. Experimental results demonstrated that within-scale aggregation has the biggest effect on repeatability. In some embodiments, the homographic adaptation technique is applied at training time to improve the generalization ability of subnetworks 112, 114 and network 100 on real images.

Theoretical support for the homographic adaptation approach is described in the following paragraphs. In some embodiments, an initial interest point function is represented by $f_\theta(\cdot)$, I the input image, x the resultant points, and H a random homograph, such that:

$$x = f_\theta(I)$$

An ideal interest point operator should be covariant with respect to homographs. A function $f_\theta(\cdot)$ is covariant with H if the output transforms with the input. In other words, a covariant detector will satisfy, for all $$Hx = f_\theta(H(I))$$

For clarity, the notation Hx denotes the homograph, matrix H being applied to the resulting interest points, and H(I) denotes the entire image I being warped by homograph matrix H. Moving the homograph related terms to the right produces:

$$x = H^{-1} f_\theta(H(I))$$

In practice, an interest point detector will not be perfectly covariant, and different homographs in the previous equation will result in different interest points x. In some embodiments, this is addressed by performing an empirical sum over a sufficiently large sample of random H's. The resulting aggregation over samples yields a superior interest point detector F(•), defined as follows:

$$\hat{F}(I; f\theta) = \frac{1}{N_h} \sum_{i=1}^{N_h} H_i^{-1} f\theta(H_i(I))$$

In some embodiments, not all matrices produce good results, not for lack of technical capability, but as not all possible random homographs represent plausible camera transformations. In some embodiments, potential homographs are decomposed into more simple, less expressive transformation classes by sampling within pre-determined ranges for translation, scale, in-plane rotation, and symmetric perspective distortion using a truncated normal distribution. These transformations are composed together with an initial root center crop to help avoid bordering artifacts.

Figure 5:
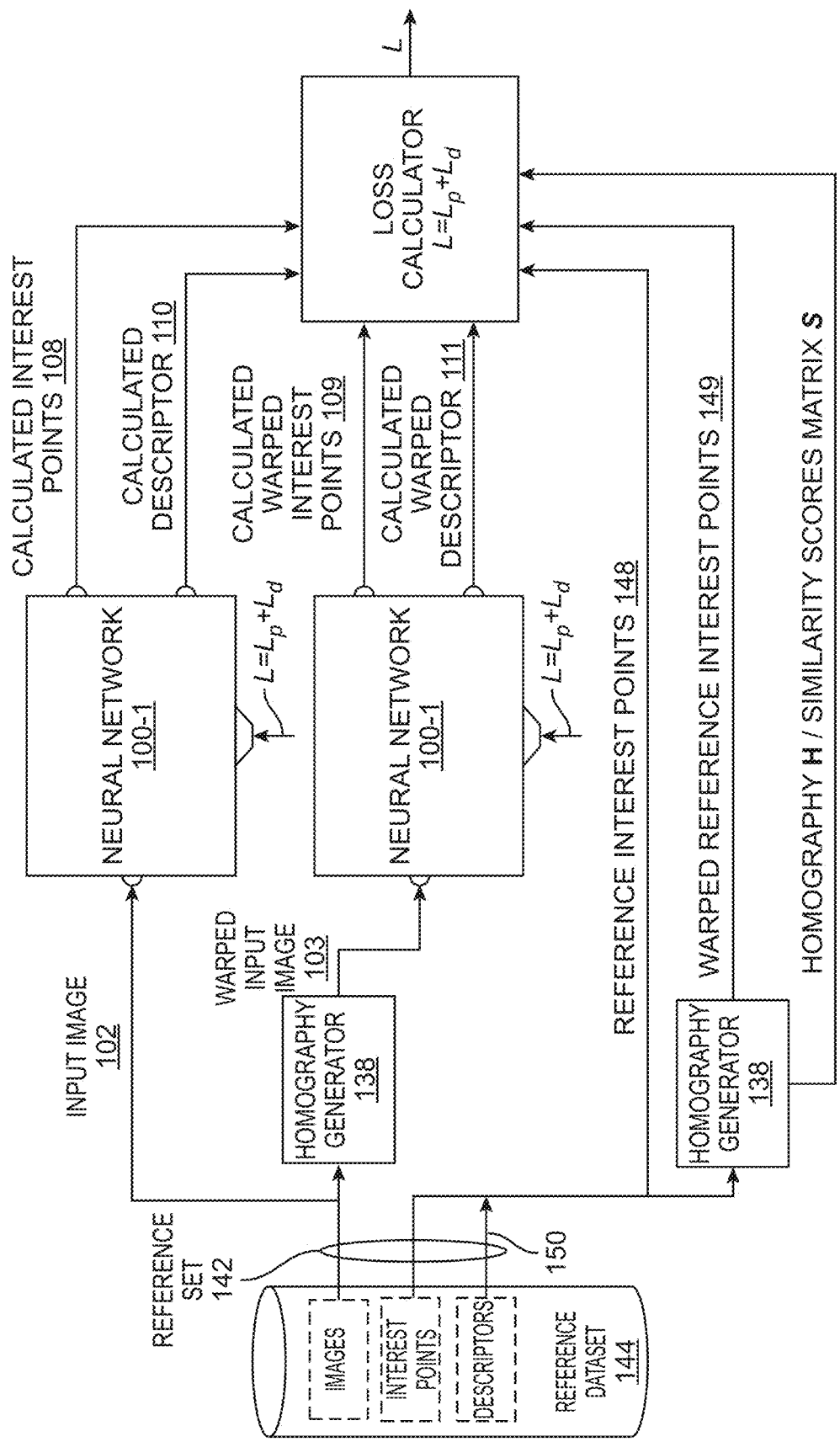
FIG. 5 illustrates a third training step according to some embodiments in which a neural network is trained using a reference dataset.

FIG. 5 illustrates a third training step according to some embodiments in which neural network 100 is trained using reference dataset 144. During a single training iteration, a single reference set 142 contained in reference dataset 144 is retrieved. Each reference set 142 may include an input image 102, a set of reference interest points 148 corresponding to input image 102, and (optionally) a reference descriptor 150 corresponding to input image 102. Using one or more homograph generators 138, a warped input image 103 is generated by applying a homograph to input image 102, and a warped set of reference interest points 149 is generated by applying the same homograph to reference interest points 148. Sequentially or concurrently, neural network 100-1 receives input image 102 and calculates a set of calculated interest points 108 and a calculated descriptor 110 based on input image 102, and neural network 100-2 receives warped input image 103 and calculates a set of calculated warped interest points 109 and a calculated warped descriptor 111 based on warped input image 103.

A loss L may be calculated based on calculated interest points 108, calculated descriptor 110, calculated warped interest points 109, calculated warped descriptor 111, reference interest points 148, warped reference interest points 149, and/or the homograph H, as described below. Neural network 100 may then be modified based on loss L. Modifying neural network 100 based on loss L may include modifying only interest point detector subnetwork 112, modifying only descriptor subnetwork 114, and/or modifying both of subnetworks 112, 114. In some embodiments, neural network 100 is modified such that loss L is reduced for a subsequent run using the same reference set 142. Multiple training iterations are performed until one or more conditions are met, such as loss L dropping below a predetermined threshold and/or reference dataset 144 being exhaustively used.

In some embodiments, loss L is the sum of two intermediate losses: one for the interest point detector, Lp, and one for the descriptor, Ld. Simultaneous loss optimization is enabled due to the availability of pairs of synthetically warped images which have both (a) pseudo-ground truth interest point locations and (b) the ground truth correspondence from a randomly generated homograph H which relates the two images. Loss L is balanced as a function on λ by $$L(X,X',D,D',Y,Y',S)=L_p(X,Y)+L_p(X',Y')+\lambda L_d(D,D',S)$$

where X is (or is related to) calculated interest points 108, X' is (or is related to) calculated warped interest points 109, Y is (or is related to) reference interest points 148, Y' is (or is related to) warped reference interest points 149, D is (or is related to) calculated descriptor 110, and D' is (or is related to) calculated warped descriptor 111. S is the similarity scores matrix and may be determined based entirely on the randomly generated homograph H. As illustrated in FIG. 5, either homograph H or similarity scores matrix S may be fed into the loss calculator.

The interest point detector loss function $L_p$ is a fully convolutional cross entropy loss over the cells $x_{hw} \in X$. The corresponding ground-truth interest point labels Y and individual entries are $y_{hw}$. The loss is thus:

$$L_p(X, Y) = \frac{1}{H_c W_c} \sum_{h=1,w=1}^{H_c W_c} l_p(x_{hw}; y_{hw})$$

where $$l_p(x_{hw}; y_{hw}) = -\log\left(\frac{\exp(x_{hwy})}{\sum_{k=1}^{65} \exp(x_{hwk})}\right)$$

The descriptor loss is applied to all pairs of descriptor cells $d_{hw} \in D$ from input image 102 and $d'_{h'w'} \in D'$ from warped input image 103. The homograph-induced correspondence between the (h, w) cell and the (h', w') cell can be written as follows:

$s_{hwh'w'}=1$ if $\|\widehat{Hp_{hw}} - p_{h'w'}\| \leq 80$ otherwise

Where $p_{hw}$ denotes the location of the center pixel in the (h, w) cell, and $\widehat{Hp_{hw}}$ denotes multiplying the cell location $p_{hw}$ by the homograph H. The entire set of correspondence for a pair of images is S.

Figure 6:
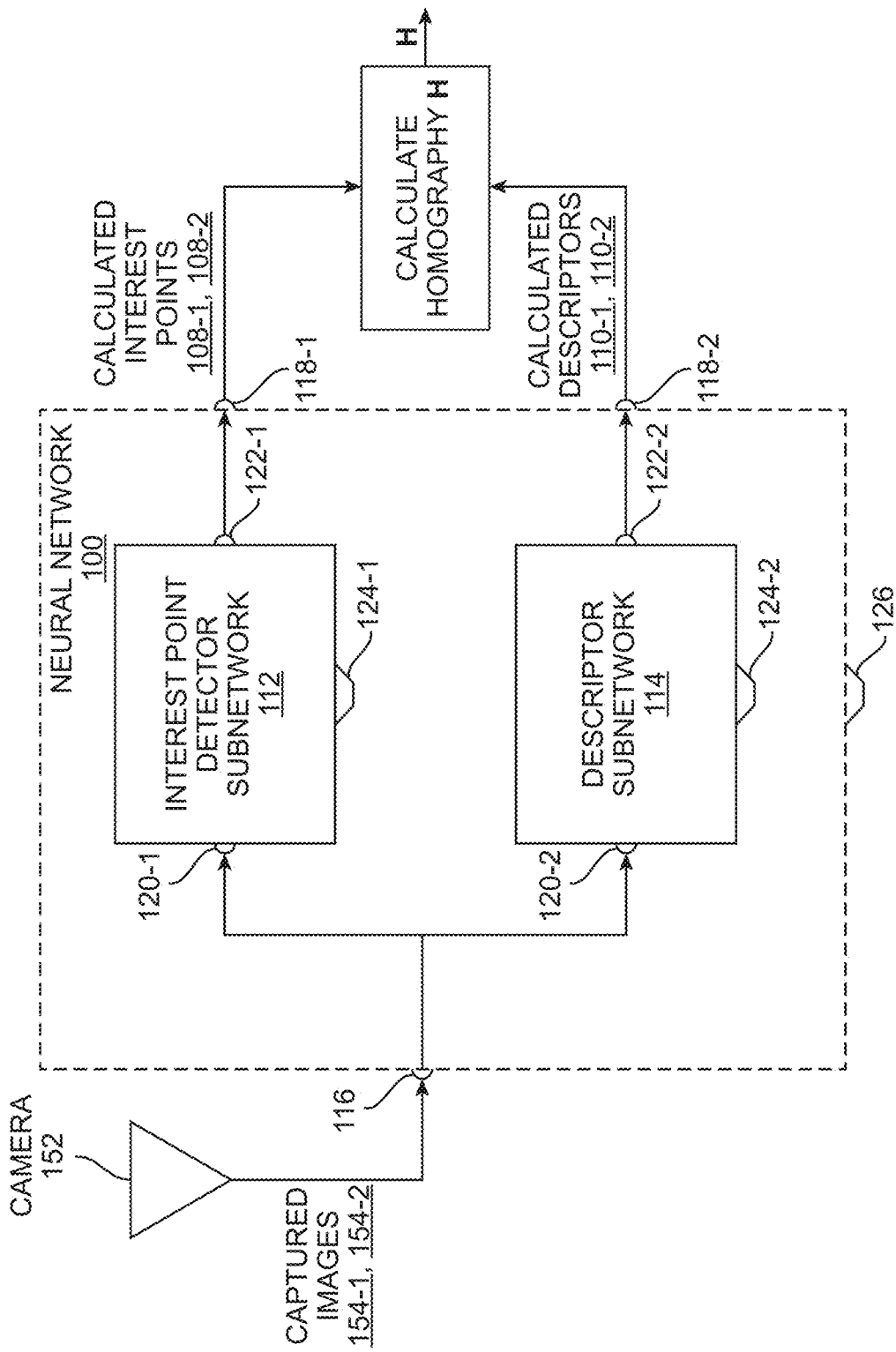
FIG. 6 illustrates a calculation of a homograph between two captured images using a neural network, according to some embodiments.

In some embodiments, a weighting term $\lambda_d$ helps balance the presence of more positive correspondences than negative ones. The descriptor loss is given by:

$$L_d(D, D', S) = \frac{1}{(H_c W_c)^2} \sum_{h=1,w=1}^{H_c W_c} \sum_{h'=1,w'=1}^{H_c W_c} l_d(d_{hw}, d'_{h'w'}; s_{hwh'w'})$$

where $l_d(d,d';s)=\lambda_d * s * \max(0, m_p - d^T d') + (1-s) * \max(0, d^T d' - m_n)$ FIG. 6 illustrates the calculation of a homograph H between two captured images 154-1, 154-2 using neural network 100, according to some embodiments. The illustrated embodiment may correspond to a number of systems or devices utilizing neural network 100, such as an optical device, e.g., an AR or mixed reality (MR) device, a self-driving car, an unmanned aerial vehicle, a manned vehicle, a robot, among other possibilities.

After training using the techniques described herein, neural network 100 may operate in a runtime mode in which captured images 154-1, 154-2 are received from a single camera 152 or from multiple cameras. For example, captured image 154-1 may be received from a first camera and captured image 154-2 may be received from a second camera. Captured images 154-1, 154-2 may be captured by different cameras simultaneously or at different times by different cameras or by a single camera. Neural network 100 may receive captured images 154-1, 154-2 via network input 116 and may calculate a set of calculated interest points 108-1 and a calculated descriptor 110-1 based on captured image 154-1, and a set of calculated interest points 108-2 and a calculated descriptor 110-2 based on captured image 154-2.

In some embodiments, prior to determining homograph H, point correspondences 106 are determined by a comparison between calculated interest points 108-1 and 108-2, which is informed by the descriptors associated with each of the interest points. For example, descriptors associated with different interest points may be matched. The interest points corresponding to different images having the most similar descriptors may be determined to correspond to each other, according to one of several possible similarity scoring procedures. Homograph H may be calculated from point correspondences 106. For example, a relative pose between captured images 154-1, 154-2 may be calculated based on point correspondences 106, and homograph H may by calculated as the matrix that represents the camera rotation and translation of the relative pose. Additionally, or alternatively, the relative pose may be equal to homograph H.

Figure 7:
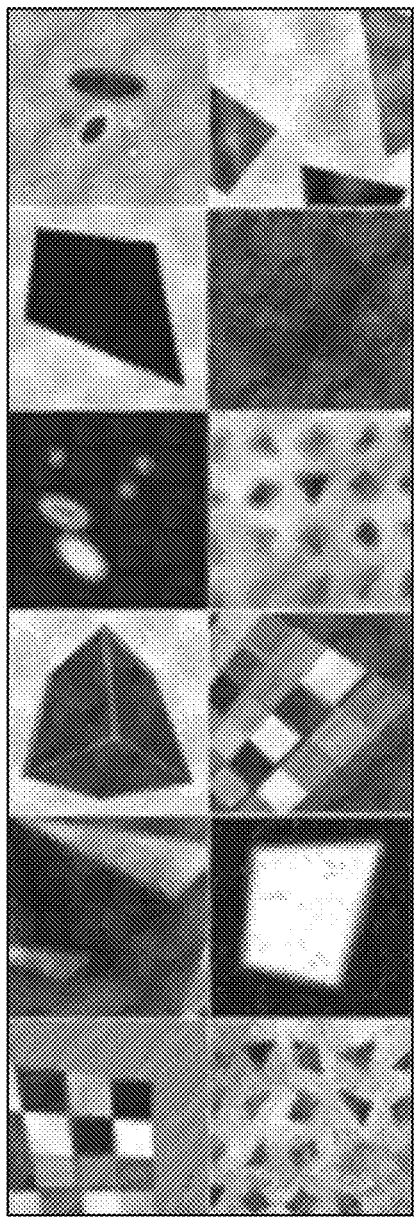
FIG. 7 illustrates an example of a synthetic dataset, according to some embodiments.

FIG. 7 illustrates an example of synthetic dataset 128, according to some embodiments. In some embodiments, synthetic dataset 128 may contain a plurality of shapes that are representative of a wide number of shape types that have relatively well-defined interest points, such as circles, triangles, quadrilaterals (e.g., squares, rectangles, rhombuses, parallelograms, etc.), pentagons, hexagons, stars, cubes, spheres, ellipsoids, cylinders, cones, prisms, pyramids, lines, etc.

Figure 8:
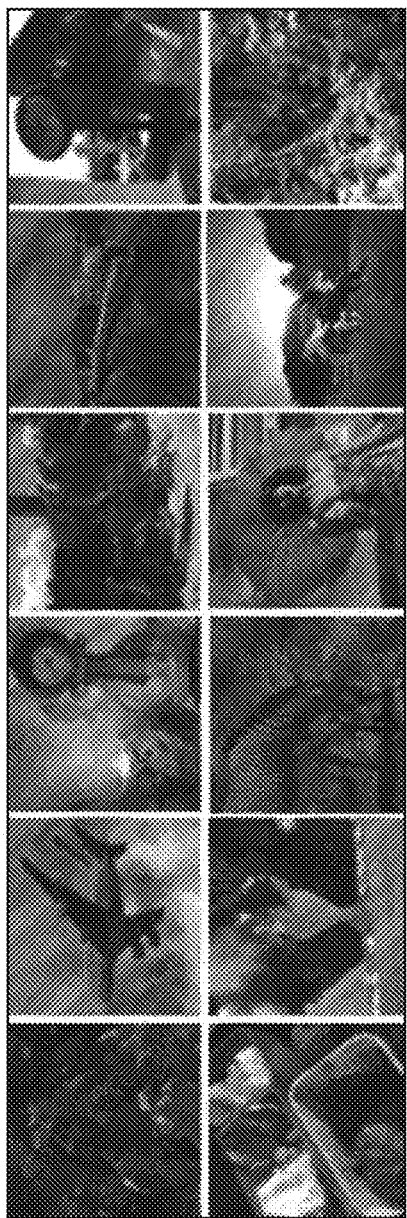
FIG. 8 illustrates an example of an unlabeled dataset, according to some embodiments.

FIG. 8 illustrates an example of unlabeled dataset 136, according to some embodiments. Unlabeled dataset 136 may contain images of the real world having varying lighting, noise, camera effects, etc. Real images are much more cluttered and noisier than synthetic images and contain diverse visual effects that cannot easily be modeled in a synthetic world.

Figure 9:
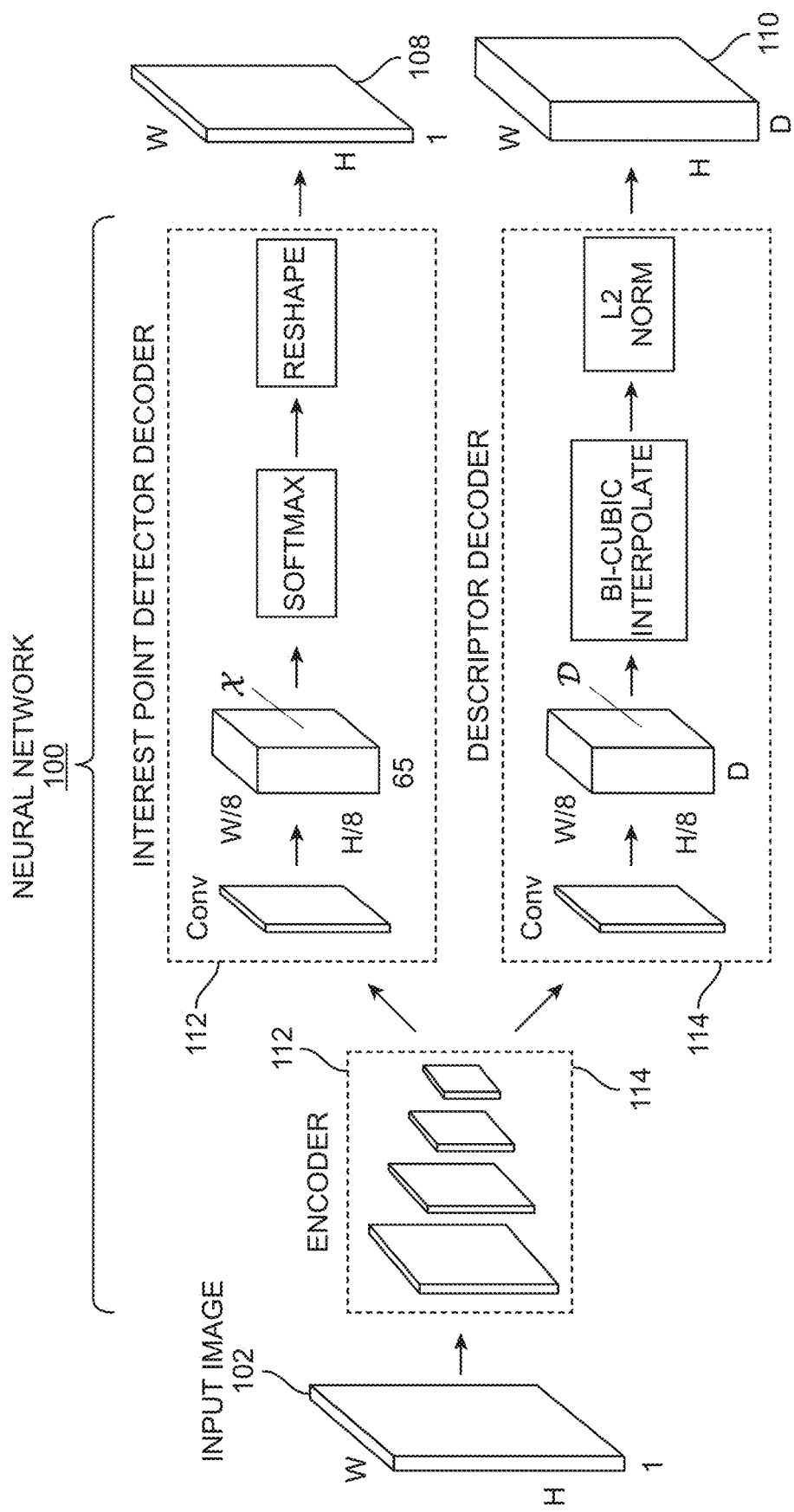
FIG. 9 illustrates an example architecture of a neural network, according to some embodiments.

FIG. 9 illustrates an example architecture of neural network 100, according to some embodiments. In the illustrated embodiment, neural network 100 includes a single shared encoder that processes and reduces the input image dimensionality. Once processed by the encoder, in some embodiments, the architecture splits into two decoder "heads," which learn task specific weights, one for interest point detection and the other for interest point description.

In some embodiments, neural network 100 uses a VGG-style encoder to reduce the dimensionality of the image. The encoder consists of convolutional layers, spatial down sampling via pooling operations and non-linear activation functions. In some embodiments, the encoder is three max-pooling layers, defining $H_c = H/8$ and $W_c = W/8$ for image I of dimensions H×W. Pixels in lower dimensional outputs are referred to as cells, where three 2×2 non overlapping max pooling operations in the encoder result in 8×8 pixel cells. The encoder maps the input image $I \in \mathbb{R}^{H_c \times W_c \times F}$ with smaller spatial dimension and greater channel depth (i.e., $H_c < H$, $W_c < W$, and $F > 1$).

In some instances, network design for dense prediction may involve an encoder-decoder pair, where the spatial resolution is decreased via pooling or strided convolution, and then up sampled back to full resolution via up convolution operations. Unfortunately, up sampling layers tend to add a high amount of compute and can introduce unwanted checkerboard artifacts, thus for some of the embodiments disclosed herein the interest point detection head utilizes an explicit decoder to reduce the computation of the model. In some embodiments, the interest point detector head computes a value, $X \in \mathbb{R}^{H_c \times W_c \times 65}$ and outputs a tensor sized $X \in \mathbb{R}^{H \times W}$. The 65 channels correspond to local, nonoverlapping 8×8 grid regions of pixels plus an extra "no interest point" dustbin. After a channel-wise softmax function, the dustbin dimension is removed and a $\mathbb{R}^{H_c W_c \times 64}$ to $\mathbb{R}^{H \times W}$ reshape function is performed.

The descriptor head computes $D \in \mathbb{R}^{H_c \times W_c \times D}$ and outputs a tensor sized $\mathbb{R}^{H \times W \times D}$. To output a dense map of L2-normalized fixed length descriptors, a model similar to UCN may be used to first output a semi-dense grid of descriptors (for example, one every 8 pixels). Learning descriptors semi-densely rather than densely reduces training memory and keeps the run-time tractable. The decoder then performs bicubic interpolation of the descriptor and then L2-normalizes the activations to be unit length. As depicted in FIG. 9, both decoders operate on a shared and spatially reduced representation of the input. To keep the model fast and easy to train, in some embodiments, both decoders use non-learned up sampling to bring the representation back to $\mathbb{R}^{H \times W}$.

In some embodiments, the encoder is a VGG-like architecture with eight 3×3 convolution layers sized 64-64-64-64-128-128-128-128. Every two layers there is a 2×2 max pool layer. Each decoder head has a single 3×3 convolutional layer of 256 units followed by a 1×1 convolution layer with 65 units and 256 units for the interest point detector and descriptor respectively. All convolution layers in the network may be followed by ReLU non-linear activation and BatchNorm normalization.

Figure 10:
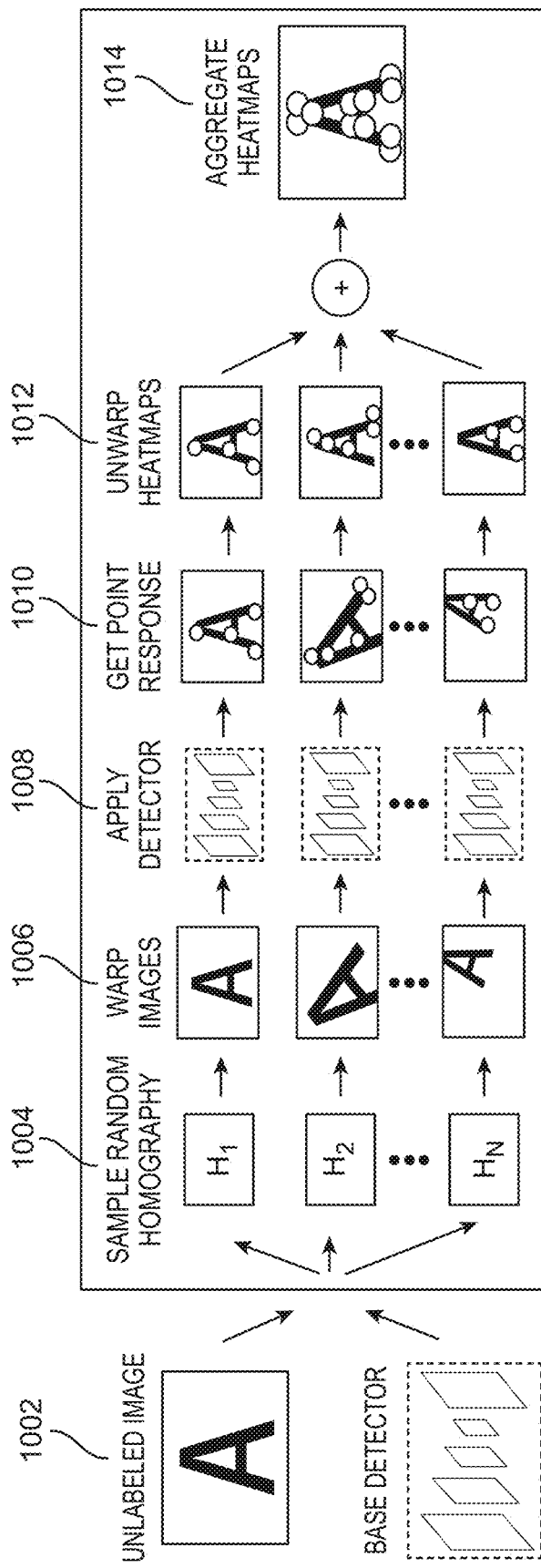
FIG. 10 illustrates various steps of the homographic adaptation that is employed during the second training step, according to some embodiments.

FIG. 10 illustrates various steps of the homographic adaptation that is employed during the second training step (described in reference to FIG. 4), according to some embodiments. At step 1002, an unlabeled image (e.g., input image 102) is taken from unlabeled dataset 136. At step 1004, a number of random homographs are sampled at homograph generator 138. At step 1006, the random homographs are applied to the unlabeled image, generating a number of warped images. At step 1008, the warped images are passed through interest point detector subnetwork 112. At step 1010, a number of point responses (e.g., sets of calculated interest points 108) are calculated by interest point detector subnetwork 112. At step 1012, the point responses (i.e., heatmaps) are unwarped by applying a number of inverse homographs (generated by inverse homograph generator 140) to the point responses, generating a number of unwarped heatmaps. At step 1014, the unwarped heatmaps are aggregated by, for example, averaging, summing, or combining through one of various available techniques.

Figure 11:
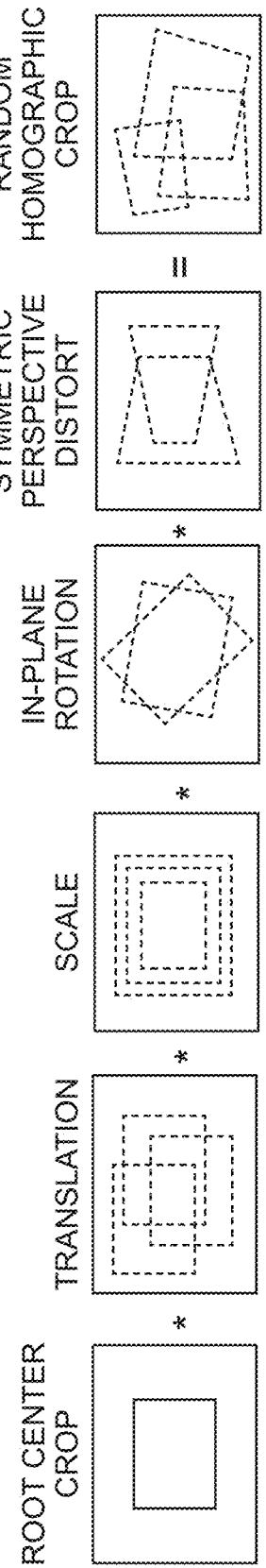
FIG. 11 illustrates certain aspects of random homograph generation, according to some embodiments.

FIG. 11 illustrates certain aspects of random homograph generation, according to some embodiments. To generate random realistic homographic transformations, a homograph can be decomposed into more simple transformations, such as translations, scaling, rotations, and symmetric perspective distortion. To help avoid bordering artifacts, which happens when the sample region contains pixels outside of the original image, the random homograph begins with a center crop, as illustrated in FIG. 11. The transformation magnitudes of the simple transformations are random Gaussian and uniform distributions. To generate the final homographic transformation, the randomly sampled simple transformations are applied consecutively to obtain the final homograph.

Figure 12:
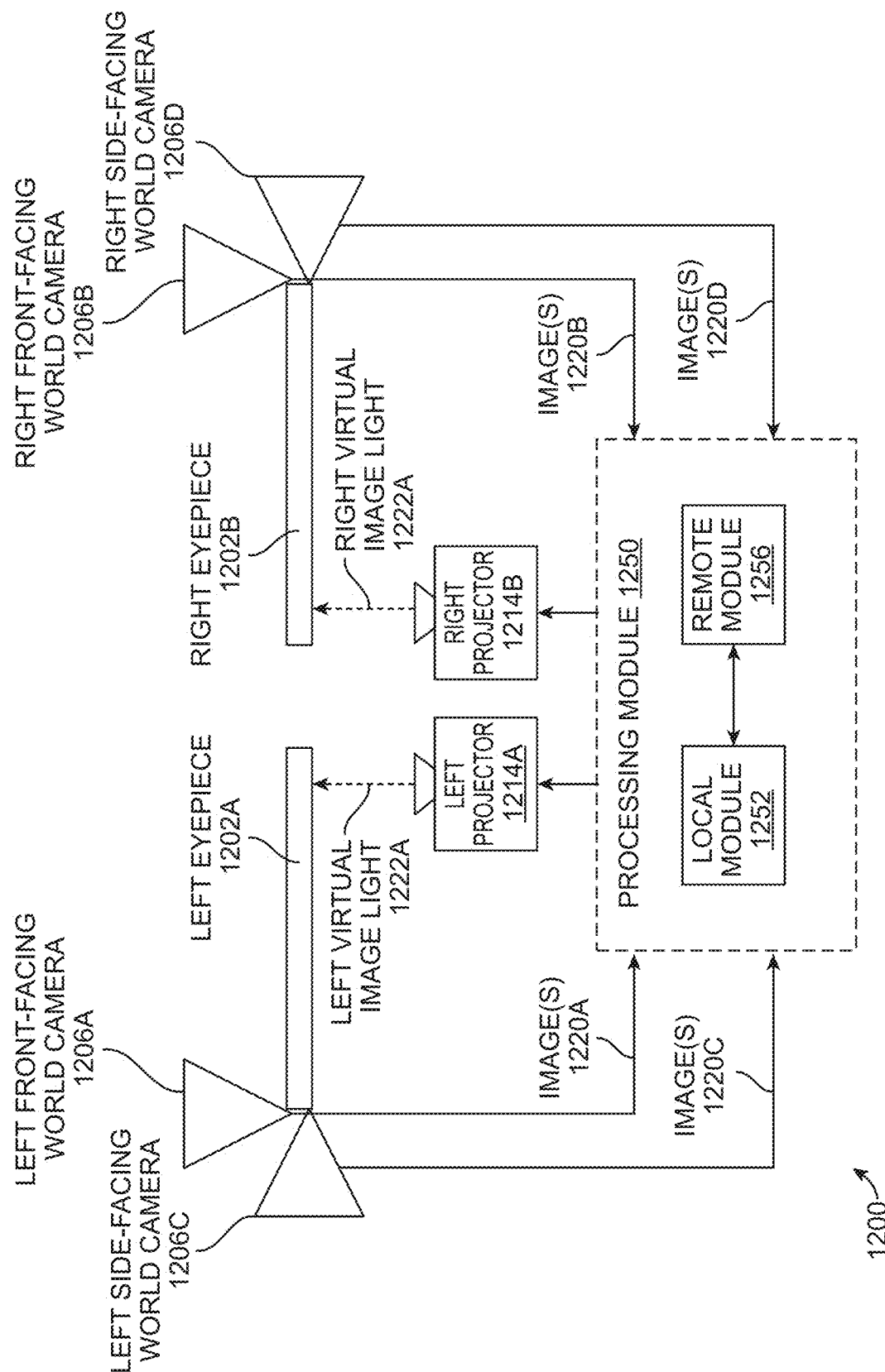
FIG. 12 illustrates a schematic view of an AR device that may utilize embodiments described herein.

FIG. 12 illustrates a schematic view of an AR device 1200 that may utilize embodiments described herein. AR device 1200 may include a left eyepiece 1202A and a right eyepiece 1202B. In some embodiments, AR device 1200 includes one or more sensors including, but not limited to: a left front-facing world camera 1206A attached directly to or near left eyepiece 1202A, a right front-facing world camera 1206B attached directly to or near right eyepiece 1202B, a left side-facing world camera 1206C attached directly to or near left eyepiece 1202A, a right side-facing world camera 1206D attached directly to or near right eyepiece 1202B, a left eye tracker positioned so as to observe a left eye of a user, a right eye tracker positioned so as to observe a right eye of a user, and an ambient light sensor, among other possibilities. In some embodiments, AR device 1200 includes one or more image projection devices such as a left projector 1214A optically linked to left eyepiece 1202A and a right projector 1214B optically linked to right eyepiece 1202B.

Some or all of the components of AR device 1200 may be head mounted such that projected images may be viewed by a user. In one particular implementation, all of the components of AR device 1200 shown in FIG. 12 are mounted onto a single device (e.g., a single headset) wearable by a user. In another implementation, one or more components of a processing module 1250 are physically separate from and communicatively coupled to the other components of AR device 1200 by one or more wired and/or wireless connections. For example, processing module 1250 may include a local module 1252 on the head mounted portion of AR device 1200 and a remote module 1256 physically separate from and communicatively linked to local module 1252. Remote module 1256 may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 1250 may include a processor and an associated digital memory, such as non-volatile memory (e.g., flash memory), both of which may be utilized to assist in the processing, caching, and storage of data. The data may include data captured from sensors (which may be, e.g., operatively coupled to AR device 1200) or otherwise attached to a user, such as cameras 1206, the ambient light sensor, eye trackers, microphones, inertial measurement units, accelerometers, compasses, GPS units, radio devices, and/or gyros. For example, processing module 1250 may receive image(s) 1220 from cameras 1206. Specifically, processing module 1250 may receive left front image(s) 1220A from left front-facing world camera 1206A, right front image(s) 1220B from right front-facing world camera 1206B, left side image(s) 1220C from left side-facing world camera 1206C, and right side image(s) 1220D from right side-facing world camera 1206D. In some embodiments, image(s) 1220 may include a single image, a pair of images, a video comprising a stream of images, a video comprising a stream of paired images, and the like. Image(s) 1220 may be periodically generated and sent to processing module 1250 while AR device 1200 is powered on, or may be generated in response to an instruction sent by processing module 1250 to one or more of the cameras. As another example, processing module 1250 may receive ambient light information from the ambient light sensor. As another example, processing module 1250 may receive gaze information from the eye trackers. As another example, processing module 1250 may receive image information (e.g., image brightness values) from one or both of projectors 1214.

Eyepieces 1202A, 1202B may comprise transparent or semi-transparent waveguides configured to direct and out-couple light from projectors 1214A, 1214B, respectively. Specifically, processing module 1250 may cause left projector 1214A to output left virtual image light 1222A onto left eyepiece 1202A, and may cause right projector 1214B to output right virtual image light 1222B onto right eyepiece 1202B. In some embodiments, each of eyepieces 1202 may comprise a plurality of waveguides corresponding to different colors and/or different depth planes. Cameras 1206A, 1206B may be positioned to capture images that substantially overlap with the field of view of a user's left and right eyes, respectively. Accordingly, placement of cameras 1206 may be near a user's eyes but not so near as to obscure the user's field of view. Alternatively, or additionally, cameras 1206A, 1206B may be positioned so as to align with the incoupling locations of virtual image light 1222A, 1222B, respectively. Cameras 1206C, 1206D may be positioned to capture images to the side of a user, e.g., in a user's peripheral vision or outside the user's peripheral vision. Image(s) 1220C, 1220D captured using cameras 1206C, 1206D need not necessarily overlap with image(s) 1220A, 1220B captured using cameras 1206A, 1206B.

Figure 13:
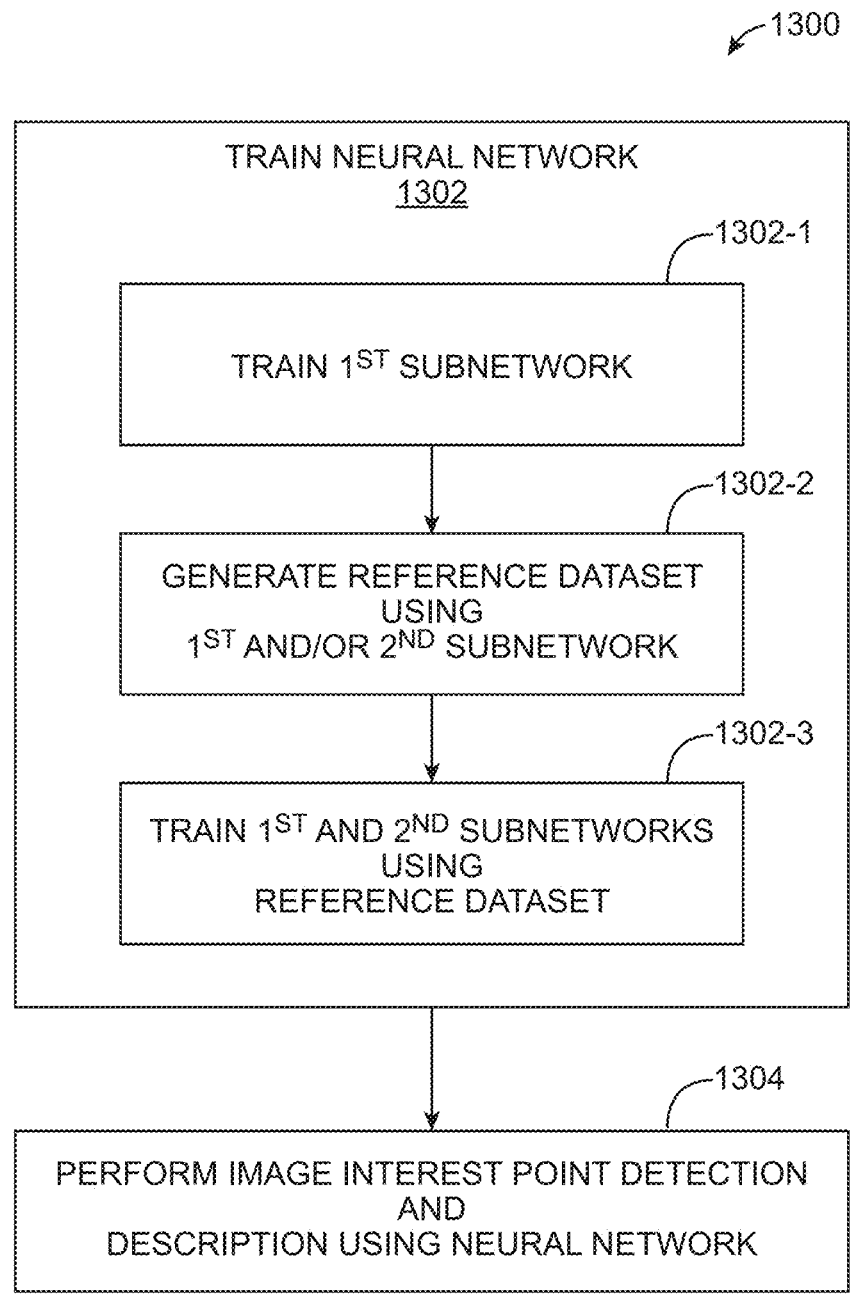
FIG. 13 illustrates a method of training a neural network and performing image interest point detection and description using the neural network, according to some embodiments.

FIG. 13 illustrates a method 1300 of training neural network 100 and performing image interest point detection and description using neural network 100, according to some embodiments. One or more steps of method 1300 may be performed in an order different than that shown in the illustrated embodiment, and one or more steps of method 1300 may be omitted during performance of method 1300.

At step 1302, neural network 100 is trained. At step 1302-1, interest point detector subnetwork 112 of neural network 100 is trained using synthetic dataset 128. Synthetic dataset 128 may include a plurality of synthetic images and a plurality of sets of synthetic interest points corresponding to the plurality of synthetic images. Step 1302-1 is further described in reference to FIG. 3.

At step 1302-2, reference dataset 144 is generated using interest point detector subnetwork 112 and/or descriptor subnetwork 114. In some embodiments reference dataset 144 is generated using homographic adaptation in which a plurality of warped images are generated by applying a plurality of homographs to input image 102, and a plurality of sets of calculated interest points 108 are calculated by passing the plurality of warped images through interest point detector subnetwork 112. The plurality of sets of calculated interest points 108 are then unwarped and aggregated to obtain the set of reference interest points that is stored in reference dataset 144. Additionally, or alternatively, a plurality of calculated descriptors 110 are calculated by passing the plurality of warped images through descriptor subnetwork 114. The plurality of calculated descriptors 110 are then unwarped and aggregated to obtain the reference descriptor that is stored in reference dataset 144. Step 1302-2 is further described in reference to FIG. 4.

At step 1302-3, interest point detector subnetwork 112 and descriptor subnetwork 114 are concurrently trained using reference dataset 144. During a single training iteration, a reference set 142 comprising input image 102, reference interest points 148, and (optionally) reference descriptor 150 is retrieved from reference dataset 144 and is used to calculate loss L. One or both of interest point detector subnetwork 112 and descriptor subnetwork 114 may be modified based on the calculated loss L. Step 1302-3 is further described in reference to FIG. 5.

At step 1304, image interest point detection and description is performed using neural network 100. In some embodiments, a first captured image 154-1 and a second captured image 154-2 are captured using camera 152 or two different cameras. Captured images 154-1, 154-2 may then be passed through neural network 100. Calculated interest points 108-1, 108-2 and calculated descriptors 110-1, 110-2 may be used to calculate homograph H. In some embodiments, AR device 1200 may adjust one or both of virtual image light 1222A, 1222B based on homograph H. For example, when a user of AR device 1200 turns his/her head while viewing virtual content perceived by the user viewing virtual image light 1222A, 1222B projected onto eyepieces 1202A, 1202B by projectors 1214A, 1214B, the virtual light will need to be adjusted based on the homograph H associated with the new viewing angle. Step 1304 is further described in reference to FIG. 6.

Figure 14:
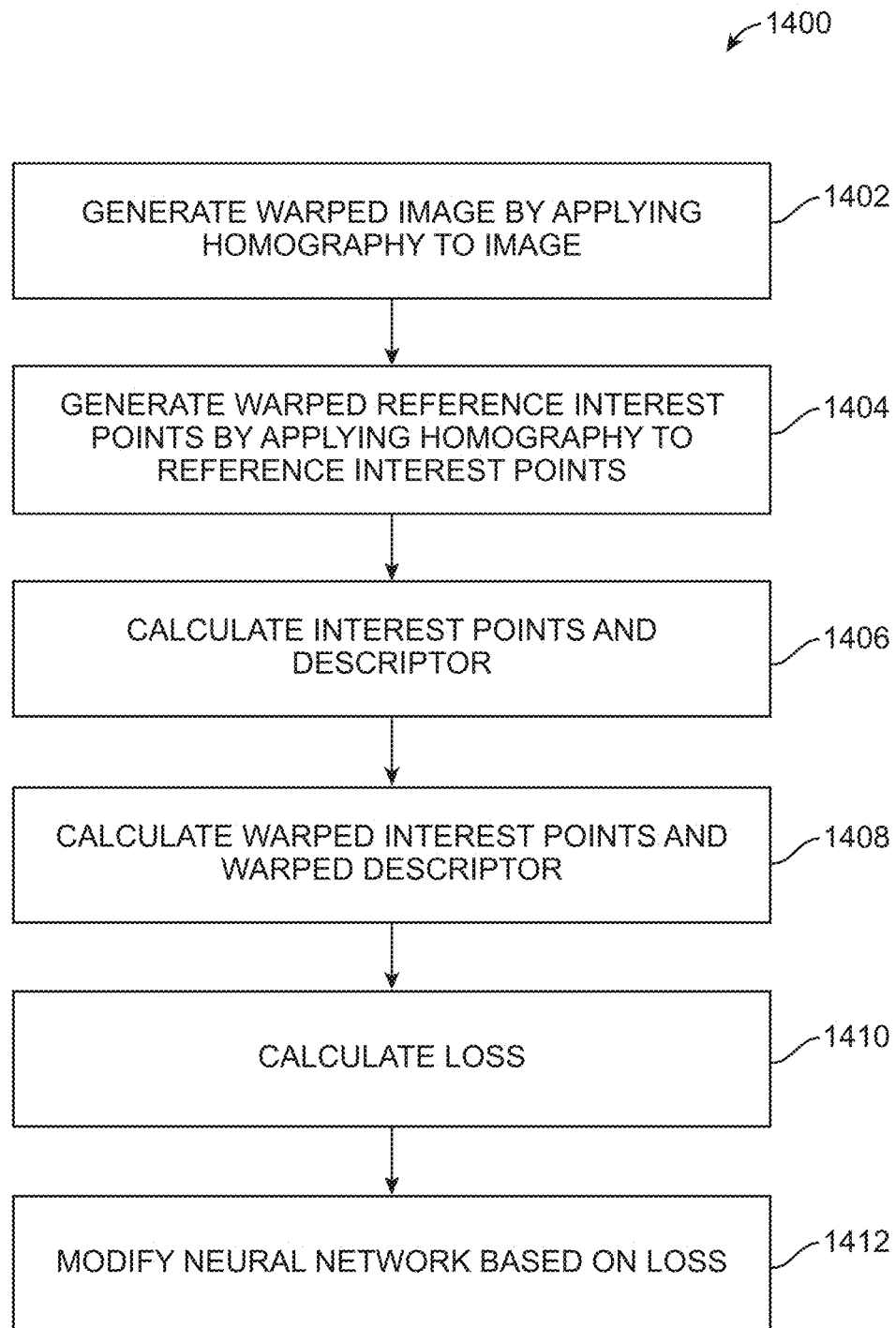
FIG. 14 illustrates a method of training a neural network for image interest point detection and description, according to some embodiments.
Figure 15:
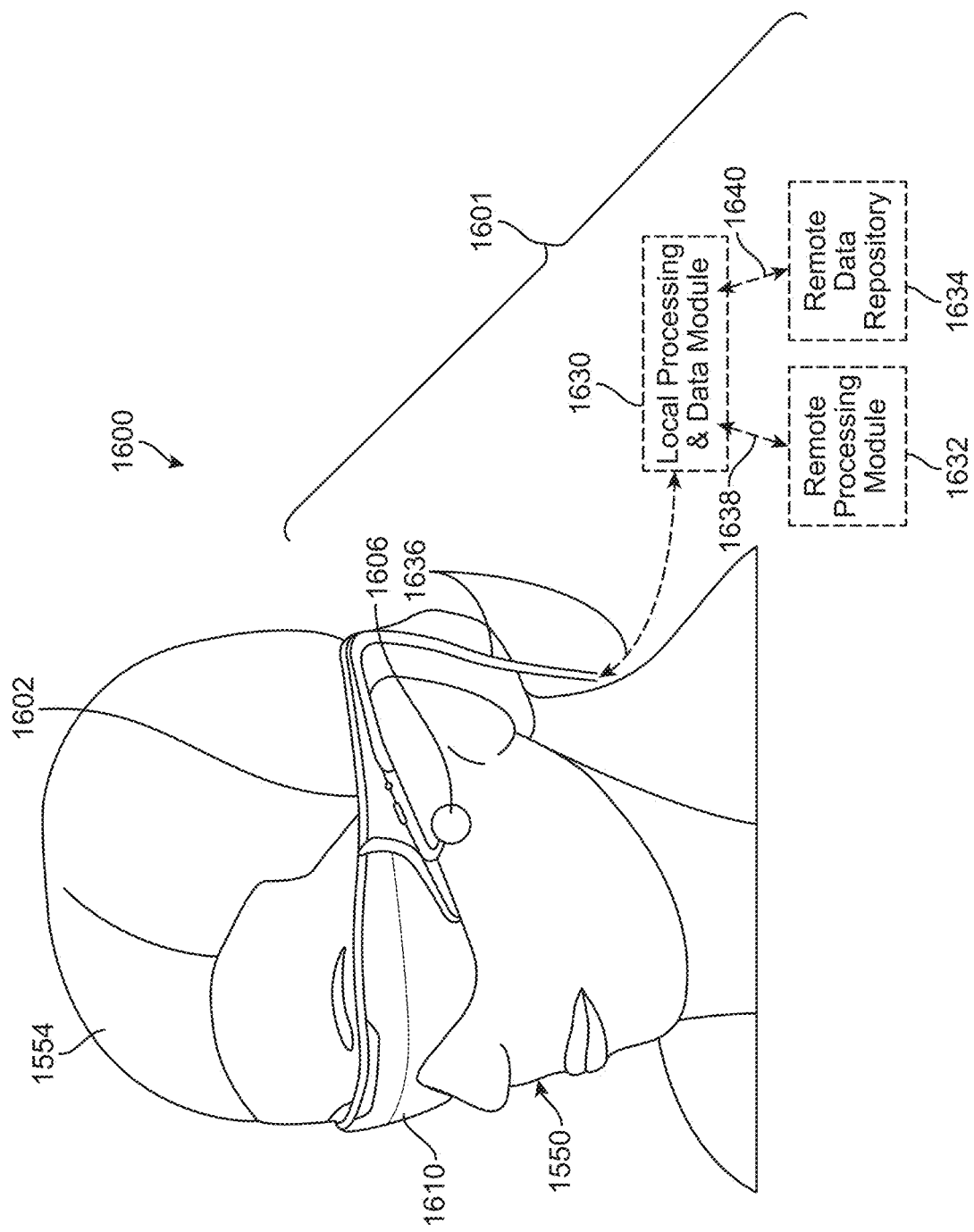
FIG. 15 illustrates an image display system having an image display device in accordance with some embodiments.
Figure 16:
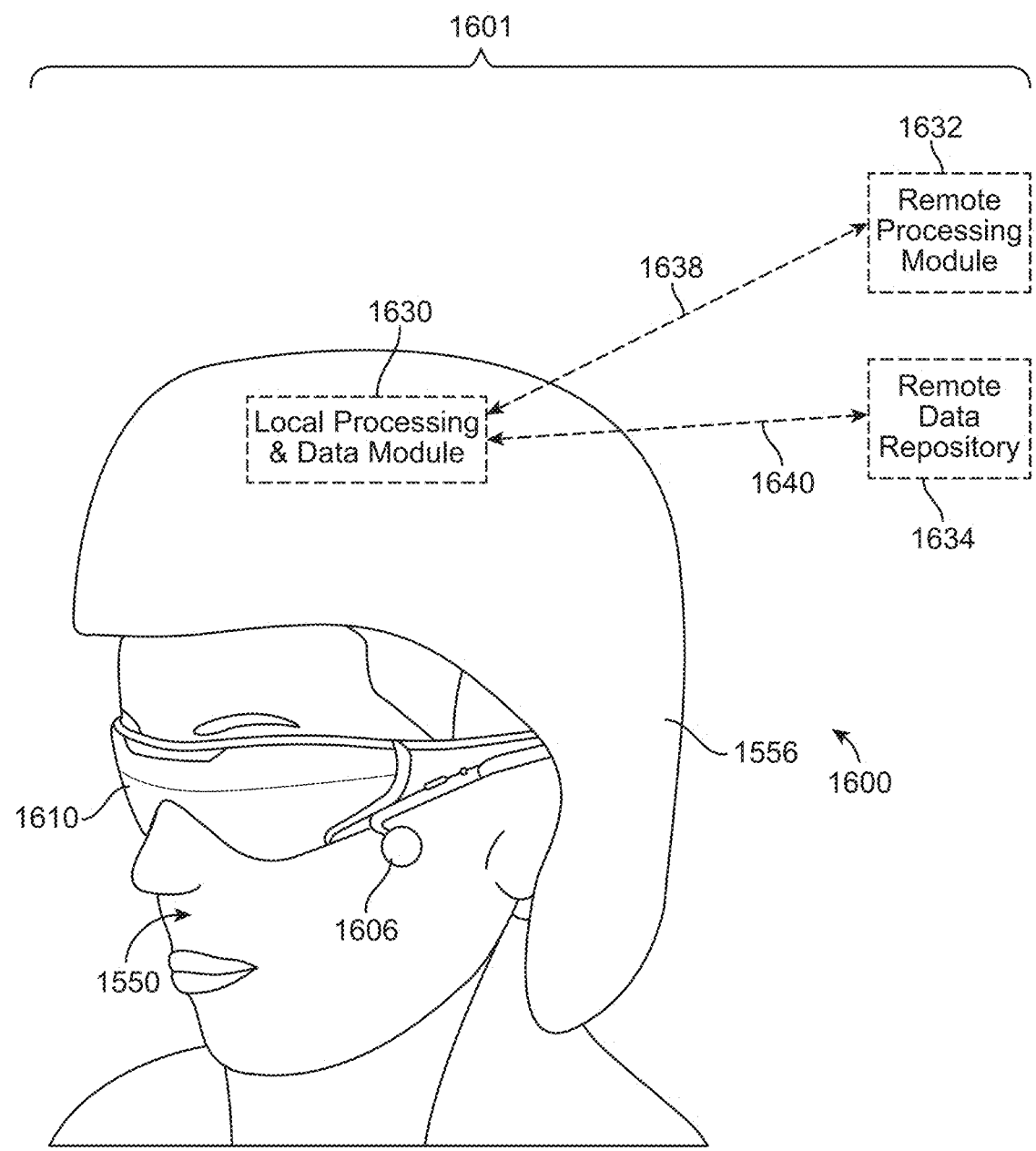
FIG. 16 illustrates another image display system having an image display device in accordance with some embodiments.
Figure 17:
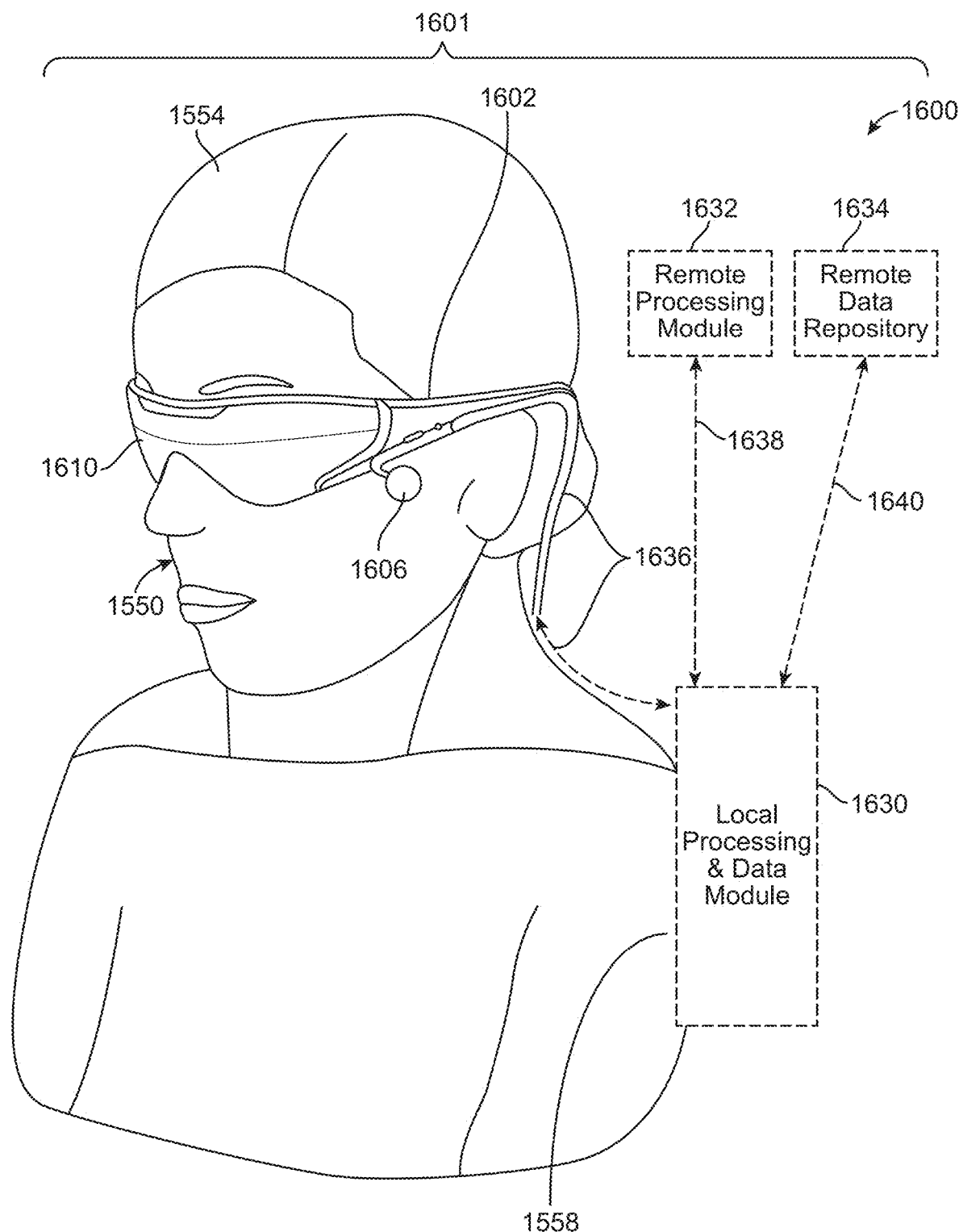
FIG. 17 illustrates another image display system having an image display device in accordance with some embodiments.

FIG. 14 illustrates a method 1400 of training neural network 100 for image interest point detection and description, according to some embodiments. One or more steps of method 1400 may be performed in an order different than that shown in the illustrated embodiment, and one or more steps of method 1400 may be omitted during performance of method 1400.

At step 1402, warped input image 103 is generated by applying a homograph to input image 102. At step 1404, warped reference interest points 149 are generated by applying the homograph to reference interest points 148. At step 1406, calculated interest points 108 and calculated descriptor 110 are calculated by neural network 100 receiving input image 102 as input. At step 1408, calculated warped interest points 109 and calculated warped descriptor 111 are calculated by neural network 100 receiving warped input image 103 as input.

At step 1410, loss L is calculated based on one or more of calculated interest points 108, calculated descriptor 110, calculated warped interest points 109, calculated warped descriptor 111, reference interest points 148, warped reference interest points 149, and the homograph. In some embodiments, loss L is further calculated based on the homograph. At step 1412, neural network 100 is modified based on loss L.

It should be noted that the neural network that can be used in the various embodiments described herein is not limited to the example described with reference to FIGS. 1-14. In some embodiments, the neural network may be trained differently using other techniques. Also, in some embodiments, a database including good and consistent features (e.g., corners) for each image may be used as training data. In such cases, the training data includes images and their respective ground truth detection. For example, the training data may include a data structure storing images in association with detected features (e.g., corners, corners' positions, etc.) in each image. Such training data can be used to train the neural network to classify regions (e.g., whether a region in an image has good feature candidates or not). In some embodiments, other mechanisms may be used to provide good "ground truth" detections. For example, in some embodiments, any known detectors may be used to run on the training dataset, and the neural network model may be trained with it. In some embodiments, any other database of good features (e.g., corners) may be used to train the neural network model.

In some embodiments, the neural network described herein may be implemented as a part of a head-worn image display device, or may be implemented as a component that is in communication with a head-worn image display device. In some cases, in order to localize a user of a head-worn image display device with respect to the user's environment, a localization map of the environment is obtained. Then real-time input image from the camera system of the image display device is then matched against the localization map to localize the user. For example, corner features of the input image may be detected from the input image, and match against corner features of the localization map. In some embodiments, the neural network described herein may process an input image to identify a set of features that are potential candidates of corners, and then a corner detector is used to identify one or more corners based on the potential candidates of corners identified by the neural network.

FIGS. 15-18 illustrate various components of an image display system 1600 in various embodiments. The image display system 1600 includes an image display device 1601, and an apparatus 1700 for providing input for the image display device 1601. The apparatus 1700 will be described in further detail below. The image display device 1601 may be a VR device, an AR device, a MR device, or any of other types of display devices. The image display device 1601 includes a frame structure 1602 worn by an end user 1550, a display subsystem 1610 carried by the frame structure 1602, such that the display subsystem 1610 is positioned in front of the eyes of the end user 1550, and a speaker 1606 carried by the frame structure 1602, such that the speaker 106 is positioned adjacent the ear canal of the end user 1550 (optionally, another speaker (not shown) is positioned adjacent the other ear canal of the end user 1550 to provide for stereo/shapeable sound control). The display subsystem 1610 is designed to present the eyes of the end user 1550 with light patterns that can be comfortably perceived as augmentations to physical reality, with high-levels of image quality and three-dimensional perception, as well as being capable of presenting two-dimensional content. The display subsystem 1610 presents a sequence of frames at high frequency that provides the perception of a single coherent scene.

In the illustrated embodiments, the display subsystem 1610 employs "optical see-through" display through which the user can directly view light from real objects via transparent (or semi-transparent) elements. The transparent element, often referred to as a "combiner," superimposes light from the display over the user's view of the real world. To this end, the display subsystem 1610 comprises a partially transparent display. The display is positioned in the end user's 1550 field of view between the eyes of the end user 1550 and an ambient environment, such that direct light from the ambient environment is transmitted through the display to the eyes of the end user 1550.

In the illustrated embodiments, an image projection assembly provides light to the partially transparent display, thereby combining with the direct light from the ambient environment, and being transmitted from the display to the eyes of the user 1550. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally, or alternatively, picture elements may be blended across two or more layers to increase perceived continuity of transition between layers in the light field, even if those layers are more sparsely stacked (i.e., one layer is outside the cone of confusion of an adjacent layer). The display subsystem 1610 may be monocular or binocular.

The image display device 1601 may also include one or more sensors (not shown) mounted to the frame structure 1602 for detecting the position and movement of the head 1554 of the end user 1550 and/or the eye position and inter-ocular distance of the end user 1550. Such sensors may include image capture devices (such as cameras), microphones, inertial measurement units, accelerometers, compasses, GPS units, radio devices, and/or gyros), or any combination of the foregoing. Many of these sensors operate on the assumption that the frame 1602 on which they are affixed is in turn substantially fixed to the user's head, eyes, and ears.

The image display device 1601 may also include a user orientation detection module. The user orientation module detects the instantaneous position of the head 1554 of the end user 1550 (e.g., via sensors coupled to the frame 1602) and may predict the position of the head 1554 of the end user 1550 based on position data received from the sensors. Detecting the instantaneous position of the head 1554 of the end user 1550 facilitates determination of the specific actual object that the end user 1550 is looking at, thereby providing an indication of the specific virtual object to be generated in relation to that actual object and further providing an indication of the position in which the virtual object is to be displayed. The user orientation module may also track the eyes of the end user 1550 based on the tracking data received from the sensors.

The image display device 1601 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 1601 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 1610.

Figure 18:
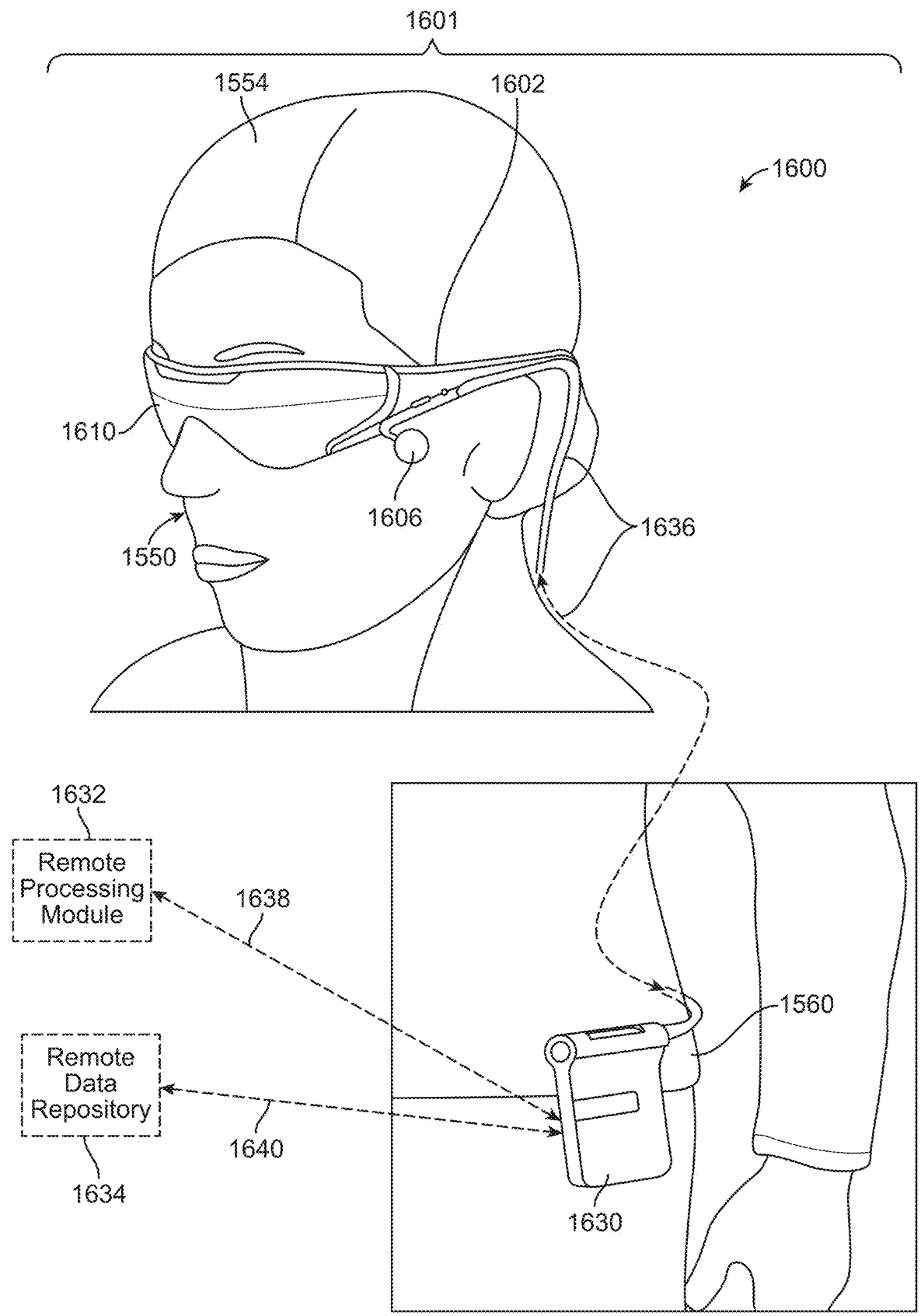
FIG. 18 illustrates another image display system having an image display device in accordance with some embodiments.

The various processing components of the image display device 101 may be physically contained in a distributed subsystem. For example, as illustrated in FIGS. 15-18, the image display device 1601 may include a local processing and data module 1630 operatively coupled, such as by a wired lead or wireless connectivity 1636, to the display subsystem 1610 and sensors. The local processing and data module 1630 may be mounted in a variety of configurations, such as fixedly attached to the frame structure 1602 (FIG. 15), fixedly attached to a helmet or hat 1556 (FIG. 16), removably attached to the torso 1558 of the end user 1550 (FIG. 17), or removably attached to the hip 1560 of the end user 1550 in a belt-coupling style configuration (FIG. 18). The image display device 1601 may also include a remote processing module 1632 and remote data repository 1634 operatively coupled, such as by a wired lead or wireless connectivity 1638, 1640, to the local processing and data module 1630, such that these remote modules 1632, 1634 are operatively coupled to each other and available as resources to the local processing and data module 1630.

The local processing and data module 1630 may comprise a power-efficient processor or controller, as well as digital memory, such as flash memory, both of which may be utilized to assist in the processing, caching, and storage of data captured from the sensors and/or acquired and/or processed using the remote processing module 1632 and/or remote data repository 1634, possibly for passage to the display subsystem 1610 after such processing or retrieval. The remote processing module 1632 may comprise one or more relatively powerful processors or controllers configured to analyze and process data and/or image information. The remote data repository 1634 may comprise a relatively large-scale digital data storage facility, which may be available through the internet or other networking configuration in a "cloud" resource configuration. In some embodiments, all data is stored and all computation is performed in the local processing and data module 1630, allowing fully autonomous use from any remote modules.

The couplings 1636, 1638, 1640 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 15-18. Thus, the particular choice of wired or wireless communications should not be considered limiting.

In some embodiments, the user orientation module is contained in the local processing and data module 1630, while CPU and GPU are contained in the remote processing module. In alternative embodiments, the CPU, GPU, or portions thereof may be contained in the local processing and data module 1630. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the image display system 1600 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In some embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 19:
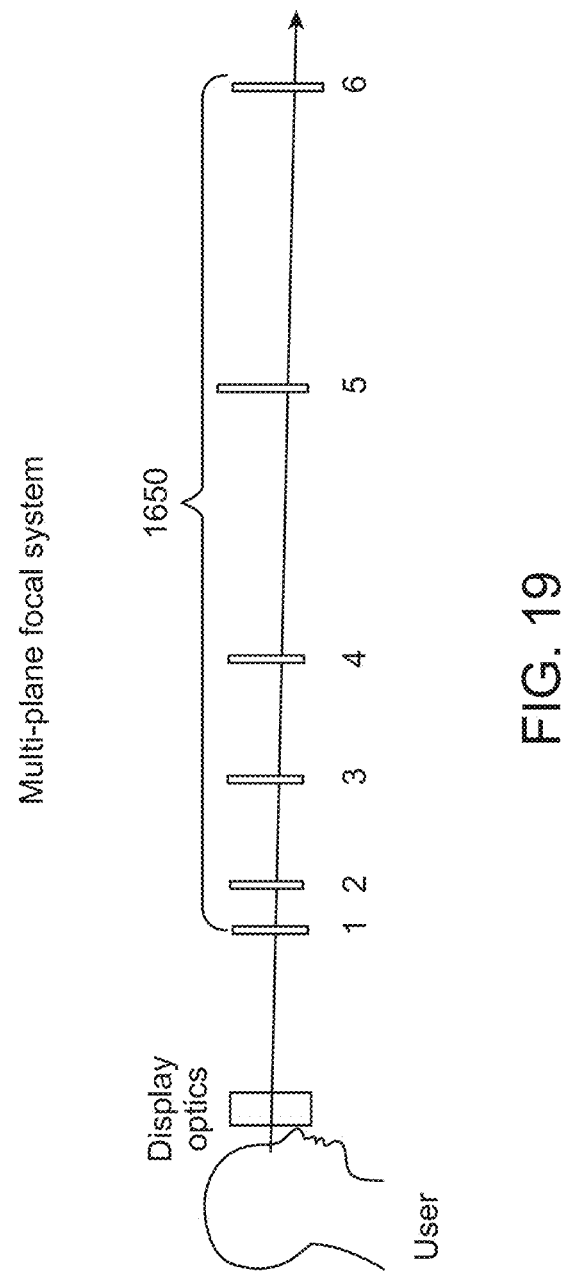
FIG. 19 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 19, it should be appreciated that multiple-plane focus systems may display frames at fixed depth planes 1650 (e.g., the six depth planes 1650 shown in FIG. 19). Although MR systems can include any number of depth planes 1650, one exemplary multiple-plane focus system has six fixed depth planes 1650 in the Z direction. In generating virtual content one or more of the six depth planes 1650, 3-D perception is created such that the user perceives one or more virtual objects at varying distances from the user's eye. Given that the human eye is more sensitive to objects that are closer in distance than objects that appear to be far away, more depth planes 1650 are generated closer to the eye, as shown in FIG. 19. In some embodiments, the depth planes 1650 may be placed at equal distances away from each other.

Depth plane positions 1650 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that some embodiments may generate depth planes 1650 at other distances/diopters. Thus, in generating virtual content at strategically placed depth planes 1650, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In some embodiments, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 19) may be utilized. Then an image of a closer tree branch may be injected at time 2 and an LOE configured to create an image appearing to originate from a depth plane 10 meters away (e.g., depth plane 5 from FIG. 19) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 1600 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Localization Map

Figure 20:
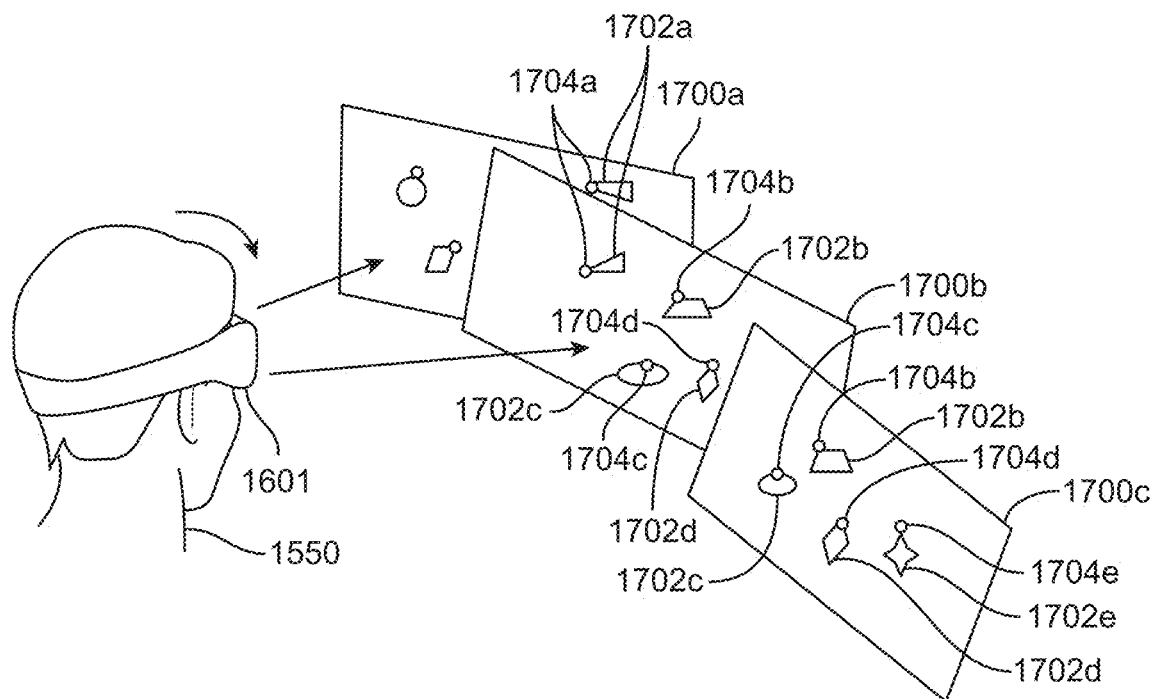
FIG. 20 illustrates a method for determining a map for allowing an image display device to localize a user of the image display device, and/or to perform other function(s).

FIG. 20 illustrates a method for determining a map for allowing the image display device 1601 to localize the user 1550 of the image display device 1601. As shown in the figure, when the user 1550 is using the image display device 1601, the user 1550 can move the image display device 1601 to achieve different viewing locations and/or directions. For example, the user 1550 may turn his/her head, turn his/her body, and/or walk to different locations. In some embodiments, the image display device 1601 includes a forward facing camera. In some embodiments, the camera may be a visible light camera (e.g., RGB camera). In some embodiments, the camera may be an infrared light camera (e.g., IR/depth camera). In some embodiments, the camera may be a full spectrum camera (e.g., a visible light camera and depth camera in one). By moving the image display device 1601, the field of view of the forward facing camera of the image display device 1601 will change accordingly. While the user 1550 is at different poses, the camera of the image display device 1601 generates corresponding images. In the illustrated example, the user 1550 achieves three different poses by turning his/her head, and the forward facing camera of the image display device 1601 generates three images 1700a-1700c that correspond with the three poses. Each of the images 1700a-1700c captures certain objects 1702 in the environment. For example, image 1700b captures objects 1702a-1702d, and image 1700c captures objects 1702b-1702e. Depending on the poses of the user 1550, certain objects in the environment may be captured in multiple images 1700 of the camera, and certain other objects may be captured in only one image 1700. In some embodiments, the processing unit 1630 of the image display device 1601 is configured to obtain the images 1700 from the camera of the image display device 1601, and perform image processing to extract features from the images 1700 to create a map. The map may be stored in a non-transitory medium of the image display device 1601, and may be used by the processing unit 1630 to perform localization of the user 1550. Thus, the map functions as a localization map. In the illustrated embodiments, the map is a three dimensional representation of the environment detected by the different poses of the user 1550.

Figure 21:
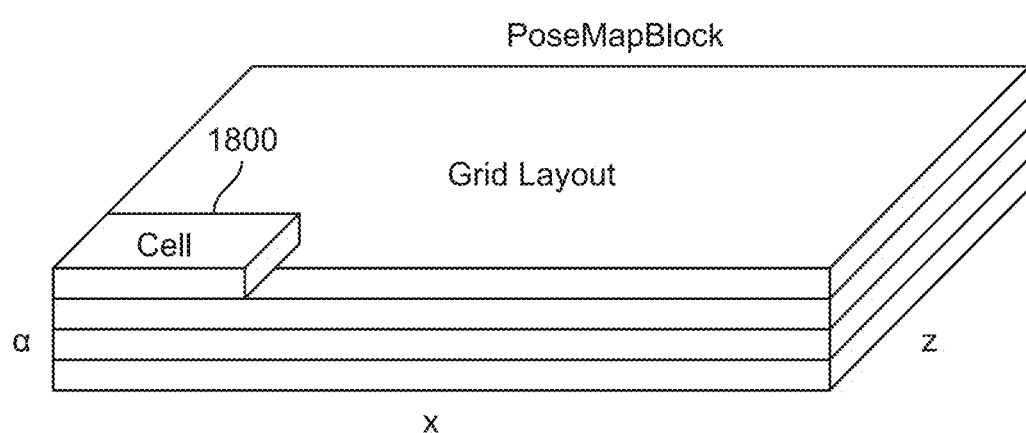
FIG. 21 illustrates an example of an environment being divided into multiple cells.

In some embodiments, the environment surrounding the user 1550 may be divided into multiple cells. In such cases, the above map creation technique may be employed for the different cells of the environment. FIG. 21 illustrates an example of an environment being divided into multiple cells 1800. Each cell 1800 is a defined three-dimensional space representing a portion of the environment. Each cell 1800 may have a pre-determined size and shape. For example, each cell 1800 may have a footprint area that is 2 m×2 m, and a height that is 2 m. Each cell 1800 may have other footprint dimensions and/or other heights in other embodiments. Also, in some embodiments, each cell 1800 may not have a rectangular configuration shown, and may have other shapes. In the illustrated embodiments, the cells 1800 all have the same shape and dimensions. In some embodiments, at least two of the cells 1800 may have different respective dimensions and/or shapes.

In some embodiments, the user 1550 of the image display device 1601 may go to different locations in the environment corresponding to the different cells 1800, and may scan the spaces in the corresponding cells using the camera of the image display device 1601 to create different maps for the respective cells of the environment. The maps may be stored in the non-transitory medium of the image display device 1601 for allowing the processing unit 1630 of the image display device 1601 to perform localization of the user 1550.

During use of the localization map to localize the user 1550, the camera of the image display device 1601 captures an image of the environment at a current position and orientation of the user 1550. Such camera image serves as a tracking image (tracking map) for allowing the processing unit 1630 of the image display device 1601 to track a position of the user 1550. In particular, the processing unit 1630 of the image display device 1601 processes the tracking image from the camera to determine if features in the tracking image match with features in the localization map. If matches are found, the processing unit 1630 may then determine the position and orientation of the user 1550 based on the matched features. In some embodiments, the localization map may contain less information (e.g., features) than the tracking image captured by the camera of the image display device 1601. This is advantageous because it allows the processing unit 1630 to efficiently match the features of the tracking image with features in the localization map. In some embodiments, the localization map may be called a "canonical map". When performing localization, the processing unit 1630 performs features extraction to extract features from the tracking image, and matches the extracted features with features in the canonical map. In some embodiments, the processing unit 1630 is configured to find a six degree of freedom transformation between feature(s) of the tracking image and feature(s) of the canonical map to localize the user 1550. In some embodiments, the processing unit 1630 is configured to find a six degree of freedom transformation between the tracking image itself and the canonical map itself to localize the user 1550. In some embodiments, once the user 1550 can be successfully localize with respect to his/her environment using the localization map, the processing unit 1630 may then allow the user 1550 to place virtual content with respect to the environment using the localization map, retrieve the virtual content from previous session, share the virtual content with other user(s), etc.

During use of the image display device 1601, the processing unit 1630 may need to perform feature detection on images provided by the camera system of the image display device 1601. For example, in some embodiments, when creating the localization map using the images, the processing unit 1630 may need to detect features, such as corners, in these images. The detected features may be utilized by the processing unit 1630 as features to construct the localization map. When performing localization using the localization map, the processing unit 1630 may need to match features in tracking images with features of the localization map. Accordingly, the processing unit 1630 may be configured to detect features in tracking images. Features such as corners are generally more stable features in the sense that corners are generally detectable from different viewing directions. Accordingly, the detectability of corners in images may not be significantly affected by change in view point. Therefore, corners are good features to match between tracking images and the localization map. Corners are also good features to use in stereo matching between images generated at different times and at different viewing directions. In some embodiments, features other than corners may be used.

Feature Detection

Figure 22A:
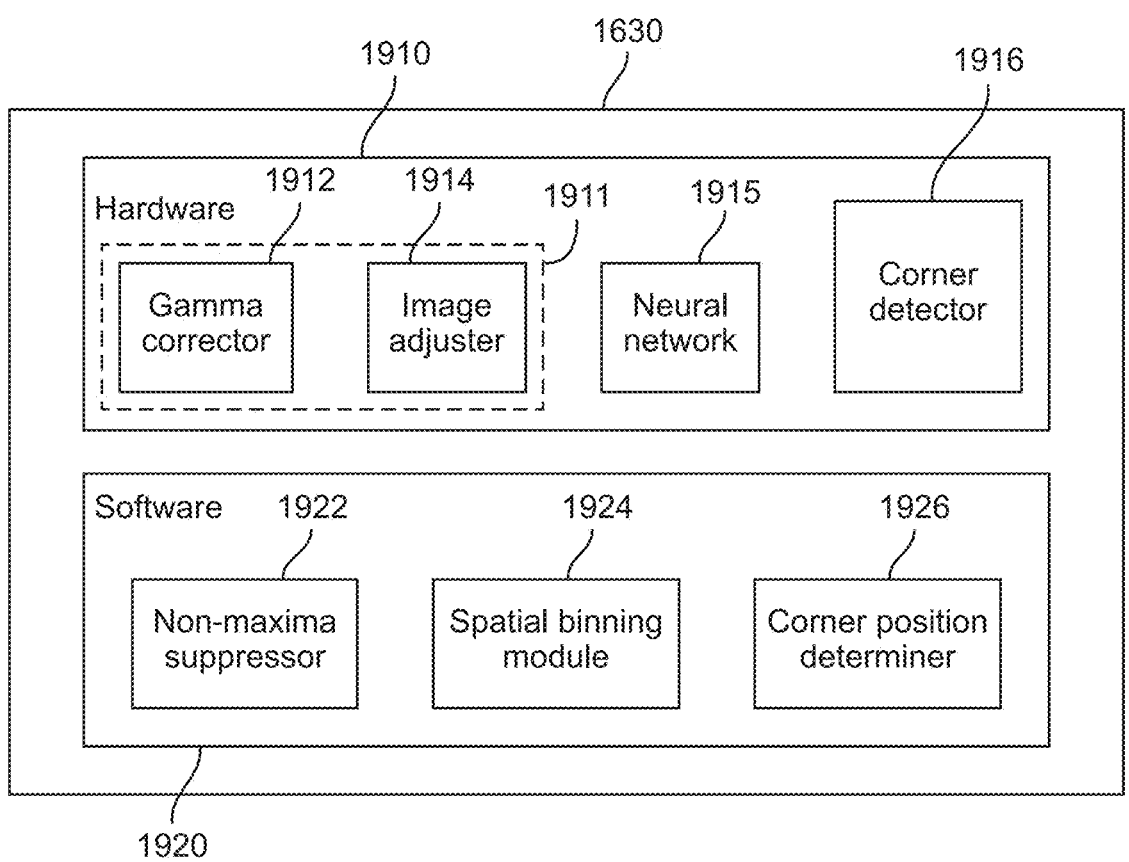
FIG. 22A illustrates a processing unit of an image display device.

FIG. 22A illustrates the processing unit 1630, particularly showing components for implementing corner detection. As shown in the figure, the processing unit 1630 includes hardware 1910 and software 1920. The processing unit 1630 also includes a gamma corrector 1912, an image adjuster 1914, an optional neural network 1915, a corner detector 1916, an optional non-maxima suppressor 1922, an optional spatial binning module 1924, and a corner position determiner 1926. In the illustrated embodiments, the gamma corrector 1912, the image adjuster 1914, the neural network 1915, and the corner detector 1916 are implemented using the hardware 1910 of the processing unit 1630. Also, in the illustrated embodiments, the non-maxima suppressor 1922, the spatial binning module 1924, and the corner position determiner 1926 are implemented using the software 1920 of the processing unit 1630. In some embodiments, the gamma corrector 1912 and the image adjuster 1914 may be implemented using an image signal processor 1911. In some embodiments, the processing unit 1630 does not include the neural network 1915. Instead, the processing unit 1630 may be configured to communicate with the neural network 1915.

In some embodiments, the gamma corrector 1912, the image adjuster 1914, the neural network 1915, the corner detector 1916, or any combination of the foregoing, may be implemented using the software 1920 of the processing unit 1630. Also, in some embodiments, the non-maxima suppressor 1922, the spatial binning module 1924, the corner position determiner 1926, or any combination of the foregoing, may be implemented using the hardware 1910 of the processing unit 1630.

In some embodiments, any of the components 1912, 1914, 1915, 1916, 1922, 1924, 1926 in the processing unit 1630 may be implemented using hardware, software, or a combination of both.

The gamma corrector 1912 is configured to adjust a nonlinear relationship between pixel value and luminance. For example, in some embodiments, the gamma corrector 1912 may be configured to adjust a relationship between a pixel value and luminance so that their relationship is linear, or more linear compared to that in the original raw image.

The image adjuster 1914 is configured to obtain an image, and optionally downscale the resolution of the image to provide an adjusted image. In some embodiments, the image adjuster 1914 is configured to obtain a first image that has a first resolution, and downscale the first image to obtain a second image with a second resolution that is less than the first resolution. For example, in some cases, the first image may have a VGA resolution, and the second image may have a QVGA resolution. In such cases, the second image has a number of pixels that is a quarter of that for the first image. In other examples, the second image may have a number of pixels that is other fractions of that for the first image.

The neural network 1915 may be any of the neural network, or a component therefore, described with reference to any of FIGS. 1-14. The neural network 1915 is configured to process input image(s) (e.g., camera image(s)) from the image display device 1601, and identify a set of features in each input image. In some embodiments, the set of features identified in each input image may serve as "hint" of where corners may be detected.

The corner detector 1916 is configured to detect corner(s) in an image based on one or more criteria. In the illustrated embodiments, the corner detector 1916 is configured to use locations of features identified by the neural network 1915 to determine possible locations of corners, and perform corner detections on those locations to detect corners. In some embodiments, the corner detector 1926 is configured to detect corners in an image using Harris corner detection technique. Harris corner detection is achieved by calculating each pixel's gradient. If the absolute gradient values are both great (e.g., above a certain threshold(s)) in two directions (e.g., orthogonal directions), then the corner detector 1916 may determine the pixel as a corner. In one implementation of the Harris corner detection technique, the following algorithm is employed to calculate a score for each pixel in an image:

(1) Compute x and y derivatives of image $$I_x = G_\sigma^{x} * I \quad I_y = G_\sigma^{y} * I$$

where $G^x$ and $G^y$ are the first-order directional differentials. In some cases, $G^x$ and $G^y$ may be calculated by convolving gray values and difference operators in direction x, y.

(2) Compute products of derivatives at every pixel $$I_{x2} = I_x \cdot I_x \quad I_{y2} = I_y \cdot I_y \quad I_{xy} = I_x \cdot I_y$$

(3) Compute the sums of the products of derivatives at each pixel $$S_{x2} = G_{\sigma 1} * I_{x2} \quad S_{y2} = G_{\sigma 1} * I_{y2} \quad S_{xy} = G_{\sigma 1} * I_{xy}$$

(4) Define at each pixel (x, y) the matrix $$H(x, y) = \begin{bmatrix} S_{x2}(x, y) & S_{xy}(x, y) \\ S_{xy}(x, y) & S_{y2}(x, y) \end{bmatrix}$$

Alternatively, the matrix H may be represented as:

$$\begin{bmatrix} I_x^2 & I_x I_y \\ I_x I_y & I_y^2 \end{bmatrix}$$

where $(I_x, I_y)$ is the gradient at (x, y).

(5) Compute the score (Harris response) for each pixel $$R = \text{Det}(H) - k(\text{Trace}(H))^2$$

where Det $(H) = \lambda_1 \lambda_2$, Trace $(H) = \lambda_1 + \lambda_2$, and $\lambda_1$ and $\lambda_2$ are eigenvalues of H.

Figure 23A:
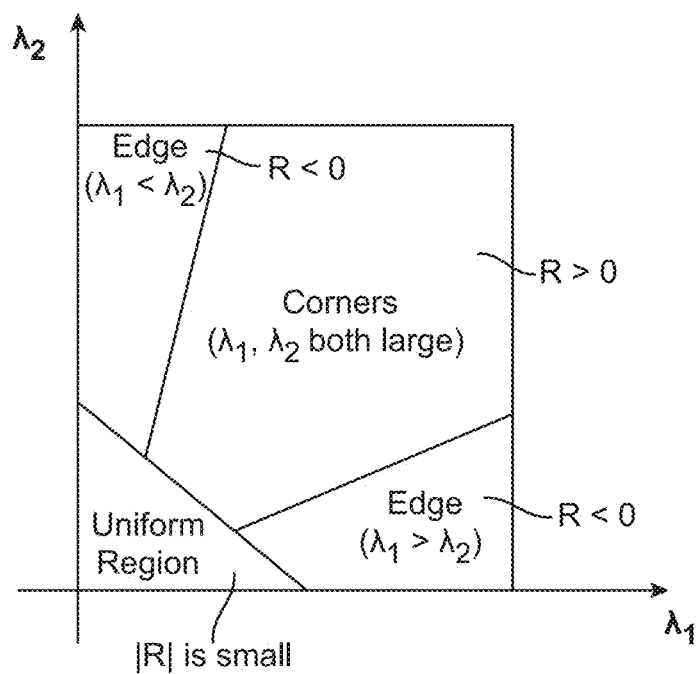
FIGS. 23A-23B illustrate classifications of image points using eigenvalues and/or Harris score.
Figure 23B:
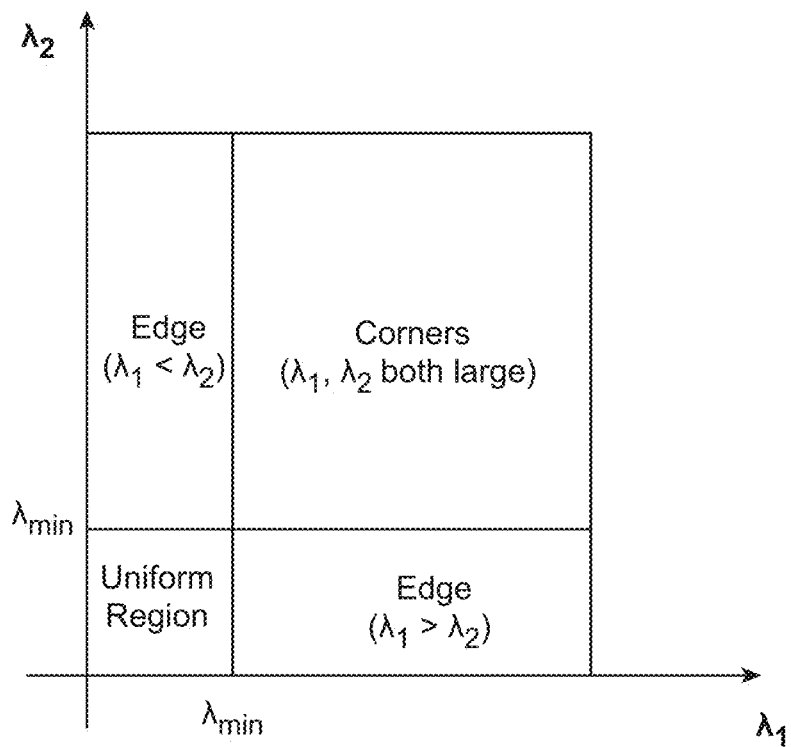

In some embodiments, the Harris response R and/or the eigenvalues $\lambda_1$, $\lambda_2$ may be used by the corner detector 1916 in one or more criteria for corner detection. FIG. 23A shows classification of image points using response R and/or eigenvalues according to Harris scoring function. FIG. 23B shows classification of image points using eigenvalues according to Shi-Tomasi criteria. In some embodiments, for example, as shown in FIGS. 23A-23B, if both eigenvalues $\lambda_1$, $\lambda_2$ are small, then the pixel may be a part of a flat region. Accordingly, the corner detector 1916 may be configured to detect corner based at least in part on a criterion that min $(\lambda_1, \lambda_2)$>threshold. In some embodiments, as shown in FIGS. 23A-23B, if the larger eigenvalue $\lambda_2$ is larger than the smaller eigenvalue $\lambda_1$ by a threshold, then the pixel may be a part of an object with a linear configuration (e.g., a line, edge, etc.). Accordingly, the corner detector 1916 may be configured to detect corner based at least in part on a criterion that $\lambda_2/\lambda_1$<threshold. In some embodiments, the corner detector 1916 may be configured to detect corners based on both criteria:

(1) min $(\lambda_1, \lambda_2)$>threshold T1

(2) $\lambda_2/\lambda_1$<threshold T2

In some embodiments, the threshold T1 may be set to be 300. In some embodiments, the threshold T1 may have other values different from 300. In some embodiments, the threshold T2 may be set to be 5. In some embodiments, the threshold T2 may have other values different from 5.

In some embodiments, the above two criteria may be expressed in terms of Det (H) and Trace (H), as follows:

$$\text{Trace } (H) > 2T1 \tag{1}$$

$$\text{Det } (H) - T1 \times \text{Trace } (H) + T1^2 > 0 \tag{2}$$

$$\text{Det } (H) - \frac{T2}{(1+T2)^2} \times \text{Trace } (H)^2 > 0 \tag{3}$$

In such cases, the corner detector 1516 may be configured to use two Harris responses of different k (k1, k2) to calculate Det and Trace, as follows:

Harris response based on k1>0 when T2=5, where $$k1 = \frac{T2}{(1+T2)^2} = 0.139 \tag{4}$$

$$\text{Trace}^2 = \tag{5}$$

$$\frac{(\text{Harris response based on } k2 - \text{Harris response based on } k1)}{(k1 - k2)} > 4T1^2$$

In some embodiments, k2 may be selected in a manner that would simplify calculation. For example, the above equation (5) may be rewritten as:

(Harris response based on k2−Harris response based on k1)>(4T1²×(k1−k2)) (6)

In such cases, k2 may be selected so that the term on the right side ((4T1^2)*(k1−k2)) becomes 1, and the evaluation may be simplified based on the expression on the left side being greater than 1. In some embodiments, k2 may be calculated based on the formula:

$$K2 = \frac{k1 - \frac{1}{16}}{16} \quad (7)$$

Accordingly, if k1 is set to be 0.139, k2 is then equal to 0.00478125 based on the above equation.

It should be noted that k1 and k2 are not limited to have the above values, and may have other values in other embodiments. For example, in some embodiments, k1 may have a value that is anywhere from 0.1 to 0.2. Also, for example, in some embodiments, k2 may have a value that is less than 0.001.

In addition, it should be noted that as used in this specification, the term "corner" is not limited to a point of intersection between two rectilinear lines, and may also refer to any point along a curve line that connects two lines (e.g., rectilinear lines), wherein the curve line may have a radius of curvature (such that, the smaller the radius of curvature, the sharper the "corner").

In some embodiments, the corner detector 1916 may be configured to apply Harris corner detection one or more times on the first image to detect a set of corners in the first image based on one or more criteria. The corner detector 1916 may also be configured to apply Harris corner detection one or more times on the second image to detect a set of corners in the second image based on one or more criteria. The one or more criteria may be selected so that only corners with certain desired features are detected.

Also, it should be noted that the corner detector 1916 is not limited to detecting corners based on the above formulas and examples of values, and that the corner detector 1916 may be configured to detect corners based on other formulas that may be derivation, variation, and/or modification of the above formulas. In addition, in other embodiments, the corner detector 1916 may be configured to detect corners based on other corner detection techniques that are different from Harris corner detection technique. In some embodiments, features other than corners may be detected, and one of ordinary skill in the art would appreciate that the principles disclosed herein would apply.

Returning to FIG. 22A, the non-maxima suppressor 1922 is configured to perform non-maxima suppression for detected corners, so that duplicate detection of the same corner is prevented. In some cases, due to the image resolution of the image and/or the manner in which corner detection is implemented, the same corner may be detected multiple times. For example, the corner detector 1916 may detect the same corner three times at three locations that are close to each other, when in fact those three detected corners are all for the same corner in the image. Thus, as used in this specification, the term "corner" may refer to one corner, or instance(s) of a corner that is detected multiple times. In some embodiments, the non-maxima suppressor 1922 may be configured to perform 3×3 non-maxima suppression. In such cases, if there are multiple corners detected within a 3×3 pixel region, the non-maxima suppressor 1922 will select one of the multiple detected corners in this region as the detected corner. In some embodiments, the non-maxima suppressor 1922 may be configured to determine corner scores for the respective multiple detected corners within a region, and select the corner with the highest score as the detected corner for that region. The score may indicate a probability that the detected corner is at the detected location, or an accuracy of the position of the detected corner. In some embodiments, approaches other than non-maxima suppression may be used for detected corners, so that duplicate detection of the same corner is prevented, and one of ordinary skill in the art would appreciate that the principles disclosed herein would apply.

The spatial binning module 1924 is configured to select certain ones of the detected corners for the given image so that different regions of the image will have a somewhat even distribution of detected corners. In particular, after the non-maxima suppressor 422 removes duplicate detected corners, there may still be a lot of detected corners for the given image, and/or the remaining detected corners may have different distributions in different regions of the image. The spatial binning module 1924 is configured to select a subset of the detected corners so that different regions of the image will have a certain maximum number of detected corners that meet certain criteria. In some embodiments, the second image may be divided into two or more regions. For example, the second image may be divided into four regions. The four regions may have different respective numbers of detected corners, and respective scores, as follow:

Region 1: (C1, 0.7), (C2, 0.8) (C3, 0.85) (C4, 0.9)
Region 2: (C5, 0.6), (C6, 0.65)
Region 3: (C7, 0.66), (C8, 0.82)
Region 4: (C9, 0.9), (C10, 0.88), (C11, 0.63)

In the above example, region 1 has three detected corners C1-C4, region 2 has two detected corners C5-C6, region 3 has two detected corners C7-C8, and region 4 has three detected corners C9-C11. If the maximum number of corners desired for each region is selected to be three, and if the criteria for selecting a corner is that the corner must have a score of 0.7 or higher, then the spatial binning module 1924 may select the following corner(s) for the different respective regions 1-4:

Region 1: C2, C3, C4 (note that corner C1 has the lowest score in region 1, and so the three corners with the highest score in the region 1 is selected; the spatial binning module 1924 cannot select all 4 corners C1-C4 because the maximum number of corners is prescribed to be 3 in the example).

Region 2: No corner selected (because both corners C5 and C6 have scores that do not meet the minimum score criteria).

Region 3: Only corner C8 is selected (because corner C7 has score that does not meet the minimum score criteria).

Region 4: Only corners C9 and C10 are selected (because corner C11 has score that does not meet the minimum score criteria).

The corner position determiner 1926 is configured to determine the final positions of the respective detected corners. Because the corners were detected by the corner detector 1916 based on an image that may be reduced in resolution, it may be desirable to refine the positions of these detected corners based on a higher resolution image. As discussed, in some embodiments, the image adjuster 1914 is configured to convert a first image with a first resolution to a second image with a second resolution. In some embodiments, the second resolution of the second image that is used to detect the corners is a quarter of the first resolution of the first image. Following this example, for every pixel in the second image that has been identified as a position of a detected corner, there are four corresponding pixels in the first image that correspond with the detected corner. Accordingly, the corner position determiner 1926 may be configured to select one of four pixels in the first image (that corresponds with the pixel of the detected corner in the second image) as the detected corner.

In some embodiments, the corner position determiner 1926 is configured to select one pixel (from the four pixels in the first image) based on one or more corners detected in the first image. For example, the corner detector 1916 may detect that there are two corners in the first image that are in close proximity with the coordinate (xr, yr) of the corner in the second image. The coordinates of the two corners in the first image may be determined by the corner position determiner 1926 as (x1, y1), (x2, y2). Next, the corner position determiner 1926 calculates the distances between the respective pixel coordinates of the corners in the first image and the pixel coordinate of the corner in the second image, as follow:

$$D1=((x1-xr)^2+(y1-yr)^2)^{1/2} \qquad (8)$$

$$D2=((x2-xr)^2+(y2-yr)^2)^{1/2} \qquad (9)$$

The corner position determiner 1926 then selects the coordinate of the pixel in the first image that has the lowest corresponding distance D (i.e., min (D1, D2)) as the position of the detected corner.

In some embodiments, the corner position determiner 1926 may refine the position of the detected corner (detected from the second image) using other techniques. For example, the positions of the set of corners (which are selected as a subset of detected corners in the second image by the non-maxima suppressor 1922 and the spatial binning module 1924) output by the spatial binning module 424 may be input to the corner detector 1916. The corner detector 1916 then executes a corner detection algorithm to detect corners in the first image in discrete locations that correspond with the positions of the set of corners from the second image. In some embodiments, the corner detector 1916 may execute Harris corner detection algorithm to detect a set of corners in the first image that correspond in position with respect to those detected corners in the second image. This technique is advantageous in that the Harris corner detection is not required to be performed on the entire first image, but only on discrete portions of the first image, thereby saving time and computational resources.

In some embodiments, the gamma corrector 1912, the image adjuster 1914, and the corner detector 1916 may be implemented using specialized hardware that is specifically designed to perform the functions of these components. By means of non-limiting examples, the hardware may include one or more FPGA processors, one or more ASIC processors, one or more signal processors, one or more math processors, one or more processors specifically designed to perform matrix operations, or any combination of the foregoing. Also, in some embodiments, the processing unit 1630 may be implemented as separate components that are communicatively coupled together. For example, the processing unit 1630 may have a first substrate carrying the gamma corrector 1912 and the image adjuster 1914, and another substrate carrying the corner detector 1916. As another example, the processing unit 1630 may have a processor for executing the software 1920, wherein the processor may be implemented on a same substrate supporting the corner detector 1916, or on a different substrate as that for the corner detector 1916. In some embodiments, there may be separate substrates carrying the gamma corrector 1912, the image adjuster 1914, the corner detector 1916, and the processor running the software 1920, respectively. In some embodiments, any, some, or all of the components of the processing unit 1630 may be implemented at the head-worn frame structure 1602. In some embodiments, any, some, or all of the components of the processing unit 1630 may be implemented at a device that is away from the head-worn frame structure 1602, such as at a belt-clip module, a neck-worn module, a cell phone, etc.

Figure 22B:
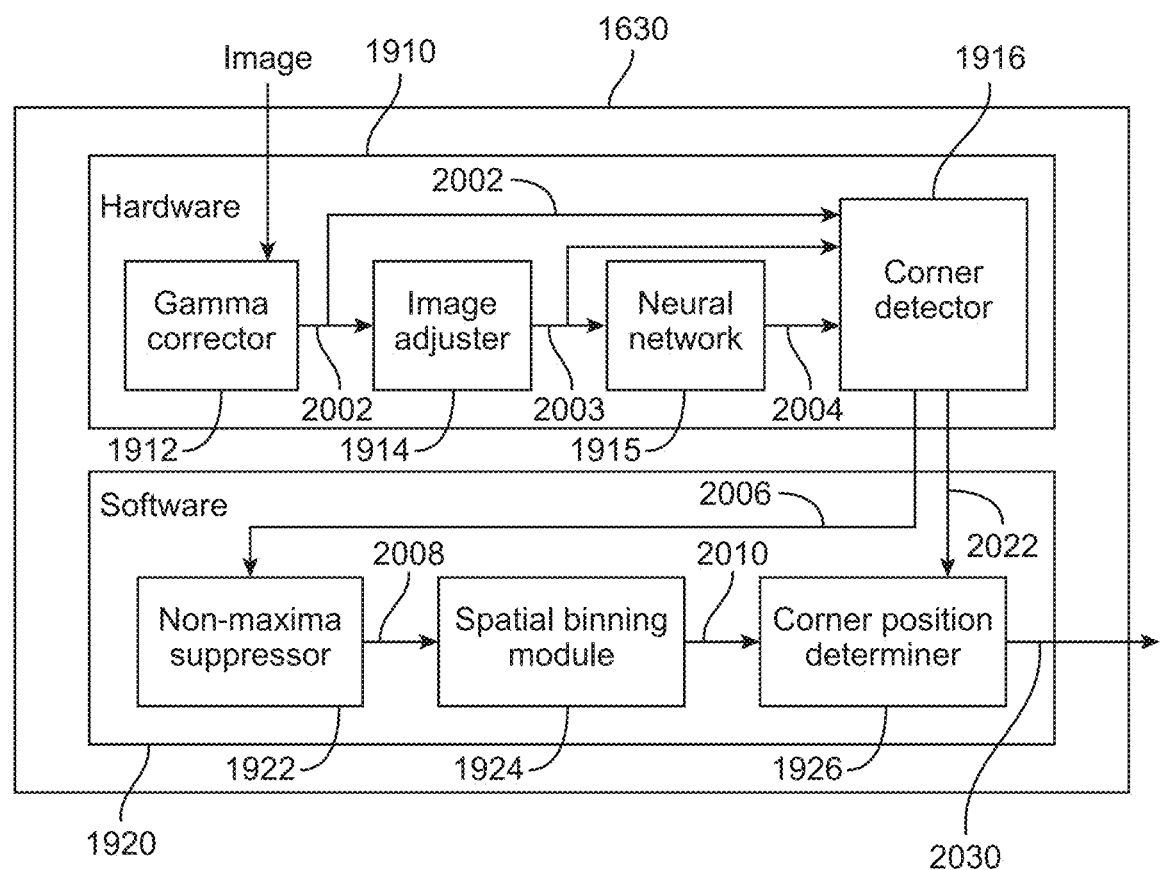
FIG. 22B illustrates a signal flow for the processing unit of FIG. 22A.

FIG. 22B illustrates an example of signal flow among the various components of the processing unit 1630 of FIG. 22A. The signal flow will be described with reference to the graphical example shown in FIG. 22D. As shown in FIG. 22B, the processing unit 1630 receives an image from camera system of the image display device 1601. The image may be a real-time image, or an image that has a time lag. In some embodiments, the image may be received from a non-transitory medium that stores the image. The non-transitory medium may be a part of the image display device 1601, or an external device, such as another image display device, a server, a cell phone, a media device, etc. The image is initially processed by the gamma corrector 1912 of the processing unit 1630. In particular, the gamma corrector 1912 of the processing unit 1630 adjusts a nonlinear relationship between pixel value and luminance for the pixels in the image. For example, the gamma corrector 1912 may adjust the relationship between the pixel value and luminance so that their relationship is linear, or more linear compared to that in the original raw image. After the image is adjusted for gamma correction, the gamma corrector then passes the image 2002 to the image adjuster 1914.

Figure 22C:
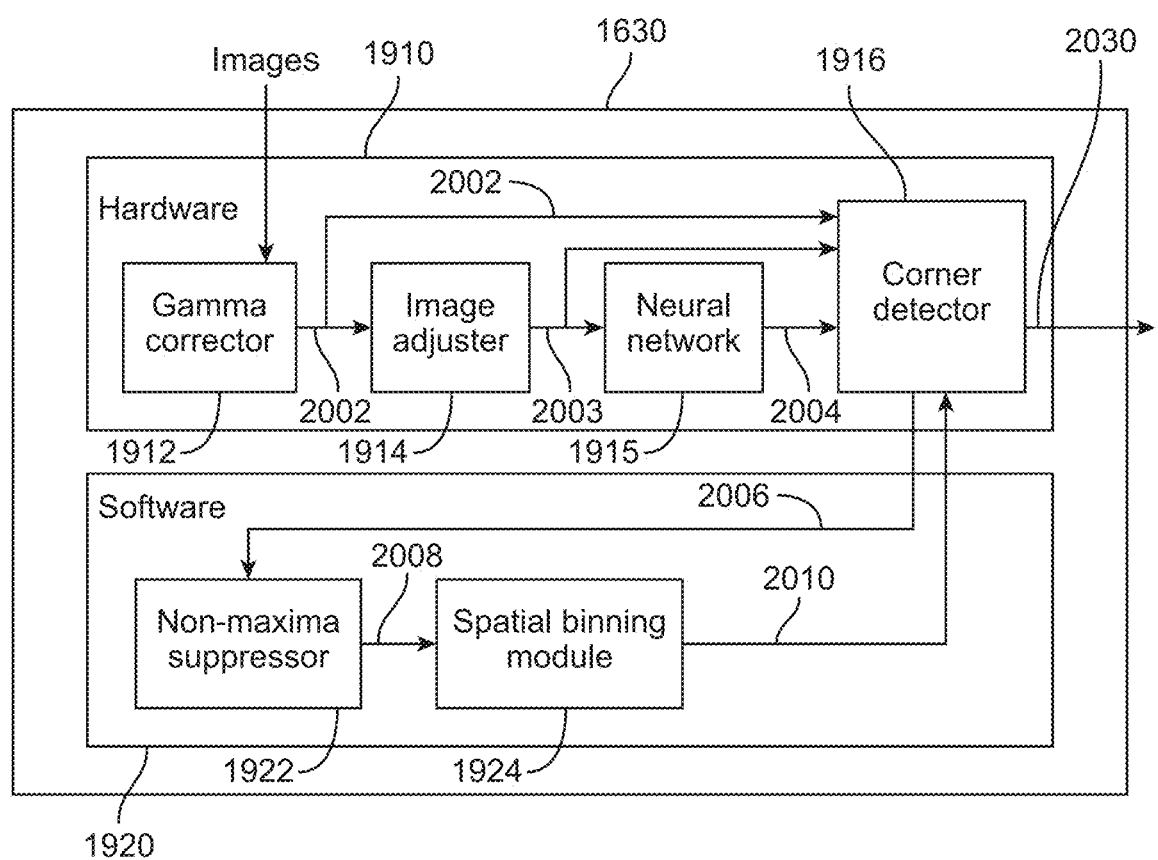
FIG. 22C illustrates a variation of the processing unit of FIG. 22A.
Figure 22D:
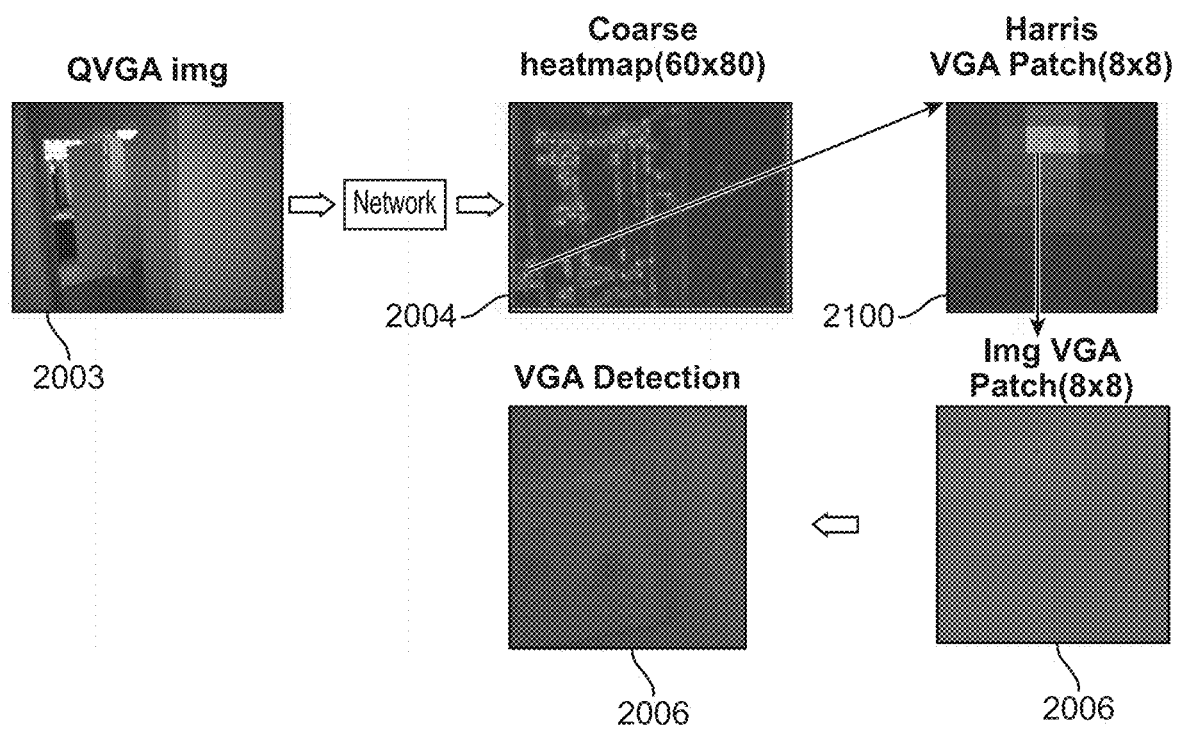
FIG. 22D illustrates an example of the signal flow described with reference to FIG. 22B.

The image adjuster 1914 is configured to obtain the image (first image) 2002 with a first resolution, and adjust the image 2002 to obtain a second image 2003 with a second resolution that is lower than the first resolution. For example, the first image 2002 may have a VGA resolution, and the second image 2003 may have a QVGA resolution. In such cases, the second image 2003 has a quarter of the number of pixels in the first image 2002. In some embodiments, the first image 2002 may have a resolution that is different from VGA resolution, and the second image 2003 may have a resolution that is different from QVGA resolution. After the second image 2003 is obtained, the image adjuster 1914 then passes the second image 2003 to the neural network 1915. As shown in the example of FIG. 22D, the second image 2003 includes image(s) of object(s) with corners.

Returning to FIG. 22B, the neural network 1915 processes the second image 2003 to detect a set of features in the second image 2003, and the positions of the respective features. For example, the neural network 1915 may utilize any of the techniques described with reference to FIGS. 1-14 to detect a set of features in the second image 2003 and their positions in the second image 2003. In the illustrated embodiments, the neural network 1915 is configured to output information 2004 identifying a set of locations for the detected features. The information 2004 may be utilized by the corner detector 1916 as positions of possible corners. In some cases, the information 2004 may be a heatmap. An example of the heatmap is illustrated in FIG. 22D. The heatmap identifies the locations in the image that has features of interest. The neural network 1915 is able to use global context to identify features of interest because of the convolution layers it has. Accordingly, the features of interest identified by the neural network 1915 are more relevant.

As used in this specification, the term "neural network" refers to any computing device, system, or module made up of a number of interconnected processing elements, which process information by their dynamic state response to input. In some embodiments, the neural network may have deep learning capability and/or artificial intelligence. In some embodiments, the neural network may be simply any computing element that can be trained using one or more data sets. By means of non-limiting examples, the neural network may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

Returning to FIG. 22B, the corner detector 1916 detects corners in the second image 2003 using the information 2004 provided by the neural network 1915 as "hints" of possible corner locations. Accordingly, the corner detector 1916 does not need to perform corner detection on the entirety of the image. In some embodiments, for each position of the feature identified in the second image 2003 by the neural network 1915, the corner detector 1916 determines a region of interest within the second image 2003 that includes the detected feature. The region of interest may be an 8×8 patch having 64 pixels. In some embodiments, the region of interest for each detected feature may have other patch sizes. Also, in some embodiments, instead of the second image 2003 with reduced resolution, the corner detector 1916 may determine a region of interest within the first image 2002 with the original resolution. In the illustrated embodiments, the corner detector 1916 is configured to detect corner(s) in each patch using a corner detection algorithm. For example, the corner detector 1916 may detect corners using Harris corner detection algorithm, or other types of corner detection techniques. In some embodiments, the patches may be identified by the neural network 1915 (instead of the corner detector 1916).

In some embodiments, the neural network 1915 is configured to assign a score to each of the pixels within a patch. The corner detector 1916 may be configured to identify a pixel with the maximum score within the patch, and use the location of the identified pixel as a location of a possible corner.

After the corner detector 1916 detects the corner(s) in each of the patches, the corner detector 1916 then passes corner detection result 2006 to the non-maxima suppressor 1922. The corner detection result 2006 may include identifiers of a set of the detected corners, and their respective coordinates. In some embodiments, the corner detection result 2006 may also optionally include scores for the respective detected corners. The score may indicate a quality of the detected corner, a confidence level of the detected corner, an accuracy of the detected corner, etc.

The non-maxima suppressor 1922 is configured to identify and remove duplicate identified corners. For example, the corner detector 1916 may detect two corners that are close to each other, when in fact they are for the same corner in the image. Accordingly, the non-maxima suppressor 422 is employed to perform non-maxima suppression for the detected corners, so that duplicate detection of the same corner is prevented. In some embodiments, the non-maxima suppressor 1922 utilizes a 3×3 window to ensure that there is no duplicate detected corner within a grid of 3×3 pixels. In some embodiments, the non-maxima suppressor 1922 may utilizes other window size to perform the non-maxima suppression. After the non-maxima suppressor 1922 removes duplicate detected corners, the non-maxima suppressor 1922 then passes the result 2008 to the spatial binning module 1924. In some embodiments, the result 2008 is a subset of the result 2006 output by the corner detector 1916.

The spatial binning module 1924 selects certain ones of the detected corners for the image so that different regions of the image will have a somewhat even distribution of detected corners. The spatial binning module 1924 is advantageous because it ensures that the detected corners are not concentrated in certain part of the image, and prevents too many detected corners for a certain part of the image. In some embodiments, the processing unit 1630 may not include the spatial binning module 1924.

In some embodiments, if the detection of the corners by the corner detector 1916 is performed based on the second image 2003 with a reduced resolution, it may be desirable to refine the positions of the detected corners based on the resolution of the first image 2002 in order to obtain a more accurate of the positions of the detected corners in the result 2010 output by the spatial binning module 1924 (or the result 2006 if the processing unit 1630 does not include the non-maxima suppressor 1922 and the spatial binning module 1924). As shown in FIG. 22B, the corner position determiner 1926 is configured to refine the positions of the corners (output by the spatial binning module 1924/the non-maxima suppressor 1922/corner detector 1916), based on output 2022 provided by the corner detector 1916. In particular, in some embodiments, the first image 2002 with the first resolution is also processed by the corner detector 1916 to obtain a set of corners. In some embodiments, the first image 2002 may be processed by the corner detector 1916 based on Harris corner detection technique. In some embodiments, the corner detector 1916 may use different corner detection techniques to detect corners in the first image 2002. The corner position determiner 1926 is configured to refine the positions of the detected corners in the set (result 2006/2008/2010) based on the detected corners in the first image 2002, in order to determine the final positions of the detected corners for the output 2030. In some embodiments, the corner position determiner 1926 is configured to determine which corner (in the output 2022) detected based on the first image 2002 has a best spatial correspondence with each of the corners in the set output by the spatial binning module 1924 (i.e., in the output 2010). For example, to improve the position of a detected corner, if the corner in the output 2010 (based on the second image 2003) has position (x=83, y=97), and if a corner in the output 2022 (based on the first image 2002) has position (x=84, y=95) that is the closest to the position of the corner, then the corner position determiner 1926 will use the position (x=84, y=95) as the final position for the detected corner. In some embodiments, the corner position determiner 1926 may be configured to examine only corners within a discrete region of the first image 2002 to identify a corner that corresponds with that in the output 2010. In some embodiments, the output 530 from the corner position determiner 1926 includes the set of detected corners from the spatial binning module 1924/the non-maxima suppressor 1922/the corner detector 1916, but with improved positions for the identified corners.

In some embodiments, the detection of the corners by the corner detector 1916, the non-maxima suppression by the non-maxima suppressor 1922, and the spatial binning by the spatial binning module 1924 are all performed based on the second image 2003 with a reduced resolution. This technique is advantageous in that it allows these operations to be performed very quickly without significant computational resources. In the example in which the first image 2002 has VGA resolution and the second image 2003 has QVGA resolution, the processing unit 1630 needs to process only a quarter of the pixels using patches in the second image 2003 (compared to the scenario in which patches in the first image 2002 are used) in all three stages of the processing by the corner detector 1916, the non-maxima suppressor 1922, and the spatial binning module 1924. In some embodiments, such technique allows corner features to be extracted very quickly from an image. For example, using the above technique, a set of corners (after going through non-maxima suppression and spatial binning) may be obtained from an image in less than 10 ms, less than 6 ms, less than 4 ms, less than 2 ms, etc. This is advantageous because it allows real-time processing of input camera images.

In some embodiments, the corner position determiner 1926 may refine the position of the detected corner (detected from the second image) using other techniques. For example, as shown in FIG. 22C, in some embodiments, the output 2010 by the spatial binning module 1924 (e.g., positions of the set of corners selected as a subset of detected corners in the second image by the non-maxima suppressor 1922 and the spatial binning module 1924) may be input to the corner detector 1916. The corner detector 1916 then executes corner detection algorithm to detect corners in the first image 2002 in discrete locations that correspond with the positions of the set of corners from the second image 2003. In some embodiments, the corner detector 1916 may execute Harris corner detection algorithm to detect a set of corners in the first image 2002 that correspond in position with respect to those detected corners in the second image 2003. This technique is advantageous in that the Harris corner detection is not required to be performed on the entire first image 2002, but only on discrete portions of the first image 2002, thereby further saving time and computational resources. In such cases, the corner detector 1916 may provide the output 2030, which includes a set of corners with refined positions for use as features/map points for the image.

In some embodiments, the processing unit 1630 may not include the non-maxima suppressor 1922 and/or the spatial binning module 1924. In such cases, the corner detector 1916 may provide its output 2006 directly to the corner position determiner 1926, which determines the positions of the identified corners.

In some embodiments, the processing unit 1630 may not include the non-maxima suppressor 1922, the spatial binning module 1924, and the corner position determiner 1926. In such cases, the corner detector 1916 may output positions of the identified corners (e.g., information 2030).

In some embodiments, instead of the second image 2003 with reduced resolution, the corner detector 1916 may be configured to detect corners in the first image 2002 (with the original higher resolution) using the information 2004 provided by the neural network 1915 as "hints" of possible corner locations. In some embodiments, for each position of the feature identified in the second image 2003 by the neural network 1915, the corner detector 1916 determines a region of interest in the corresponding position within the first image 2002 that includes the detected feature. The region of interest may be an 8×8 patch having 64 pixels with the original resolution. In other embodiments, the region of interest for each detected feature may have other patch sizes. For example, in other embodiments, the patch may be a N×N patch, wherein N is any integer larger than 1. In further embodiments, the patch may have 144 pixels or less, with the pixels being arranged in a square shape or non-square (e.g., rectangular) shape. In the illustrated embodiments, the corner detector 1916 is configured to detect corner(s) in each patch in the first image 2002 using a corner detection algorithm. For example, the corner detector 1916 may detect corners using Harris corner detection algorithm, or other types of corner detection techniques. Having the corner detector 1916 operates on the first image 2002 with the original resolution is advantageous because it obviates the need to make fine adjustment to the determined positions of the detected corners (which may be required if the corner detector 1916 operates on the second image 2003 with reduced resolution).

In some embodiments, the processing unit 1630 may not include the gamma corrector 1912. In such cases, images are directly inputted to the image adjuster 1914.

In some embodiments, the processing unit 1630 may not include the image adjuster 1914. In such cases, both the neural network 1915 and the corner detector 1916 are configured to perform their operations using the image with the original resolution.

In some embodiments, one or more of the components in the processing unit 1630 may be combined. For example, in some embodiments, the non-maxima suppressor 1922, the spatial binning module 1924, the corner position determiner 1926, or any combination of the foregoing, may be implemented as parts of the corner detector 1916. In some embodiments, the gamma corrector 1912 and/or the image adjuster 1914 may be implemented as a part of the neural network 1915.

In some embodiments, the detection of corners may be performed by the processing unit 1630 to process real-time input images from the camera system of the image display device 1601. For example, input image may be provided by the camera system, and the processing unit 1630 may determine a set of corners from the input image. The set of corners may be utilized as a set of features for the input image for matching with corresponding features with localization map in order to localize the user of the image display device 1601.

In some embodiments, the detection of corners may be performed by the processing unit 1630 to process images from the camera system of the image display device 1601 in order to create a localization map. For example, a sequence of images may be provided by the camera system, and the processing unit 1630 may determine a set of corners from each of the images in the sequence. The images may be obtained by the camera system when the user of the image display device 1601 has different head poses so that the images correspond with different viewing directions of the user. The processing unit 1630 may also perform stereo matching in which it matches a corner in one image in the sequence with a corner in another image in the sequence, in order to create a 3D map point for that corner. The 3D map point is then included as a part of the localization map.

It should be noted that using a hybrid technique (i.e., neural network plus corner detector) to detect corners is advantageous over the technique that utilizes only corner detector without any neural network. This is because the hybrid technique produces corner detection result with fewer false positives, and enables the extraction of "weak" corners. Also, the hybrid technique is able to extract weak corners (which otherwise may be undetectable using only Harris corner detection). In some embodiments, the neural network hints that there may be a corner inside a patch, and the system uses the strongest response to detect the corner. See, for example, FIG. 22D, where the Img VGA patch is very hard to identify a corner, but the neural network can tell there's a corner because it processes a larger part of the image (see for example—the "VGA detection" in FIG. 22D). The neural network outputs the coarse areas where there are expected to be good features (e.g., corners).

Figure 22E:
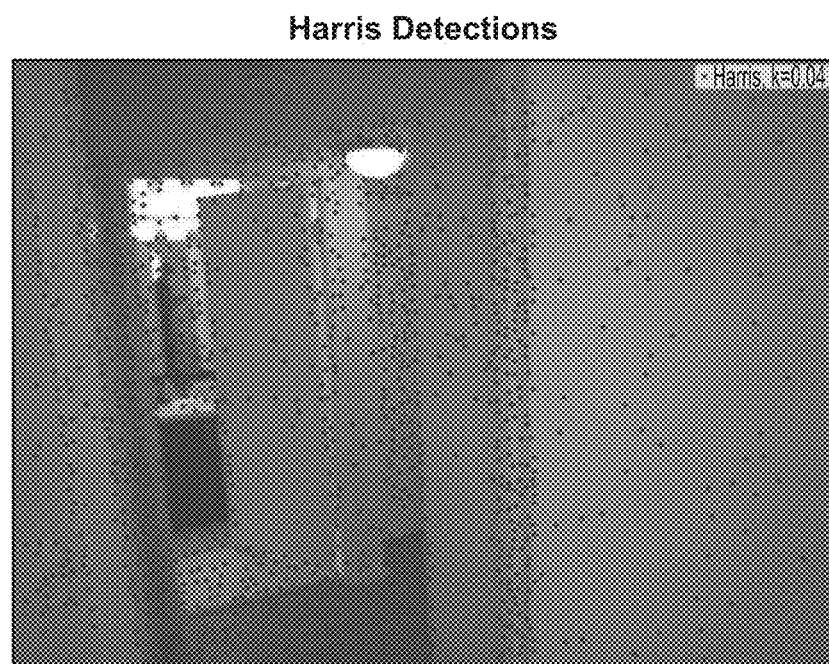
FIG. 22E illustrates an example of Harris detection result.
Figure 22F:
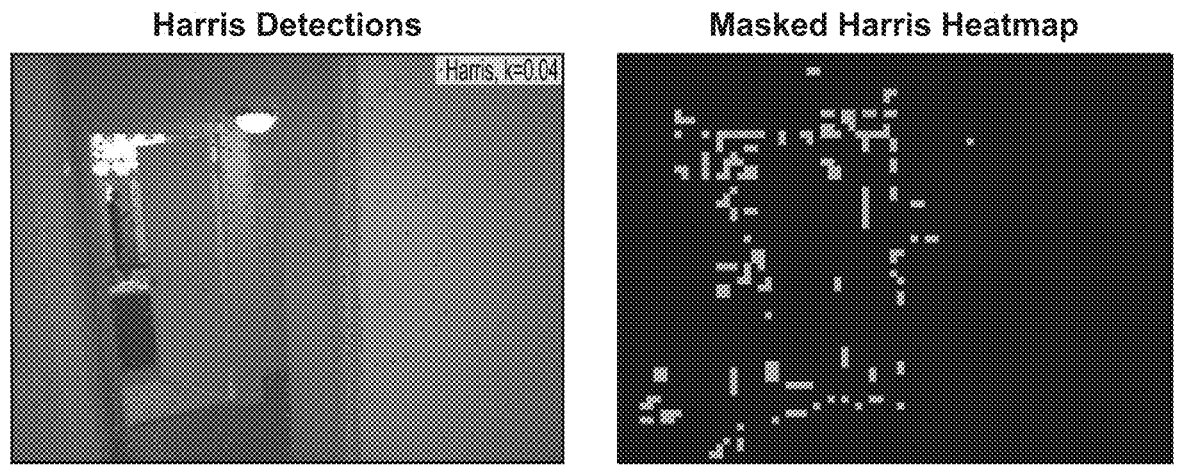
FIG. 22F illustrates an example of a mask in comparison with Harris detection result.
Figure 22G:
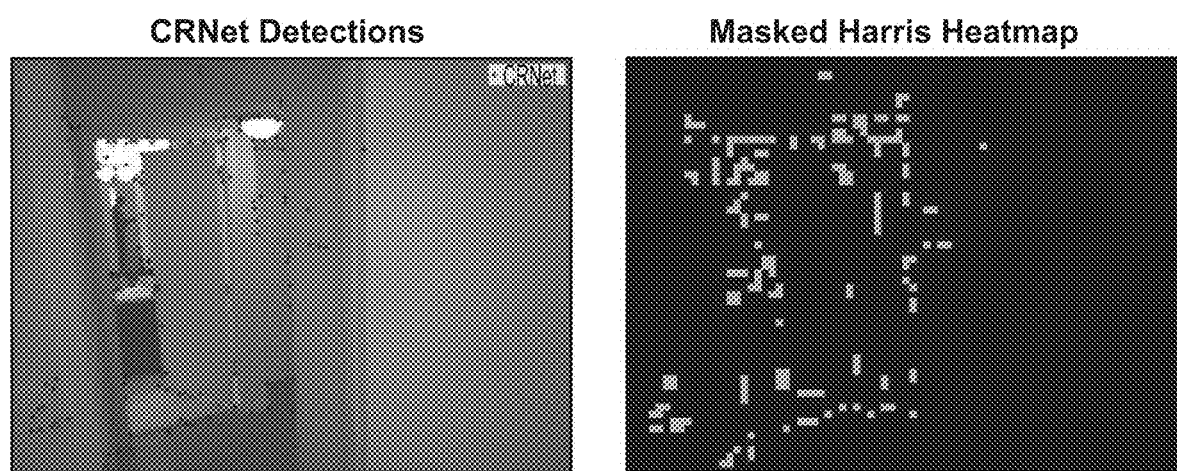
FIG. 22G illustrates an example of a result of hybrid corner detection.

FIG. 22E illustrates an example of result obtained using Harris corner detection and without the benefit of neural network. As shown in the figure, the corner detector identifies a lot of points in the image as corners, when many of the points are false-positives (i.e., they are not corners). As shown in FIG. 22F, the heatmap provides by the neural network may function as a mask to eliminate many of the false-positives. As a result, the hybrid technique identifies a set of corners in an image that are more accurate. As shown in FIG. 22G, the number of corners identified in the image using the hybrid technique are fewer compared to that shown in FIG. 22E.

Also, using the neural network 1915 to provide the heatmap for use as "hint" by the corner detector 1916 is advantageous. The heatmap provides a classification of the patches—i.e., it indicates whether there is a feature of interest or not, in the patch. Accordingly, the output of the neural network 1915 turns a corner-detection problem into a simple classification problem (i.e., a yes or no classification). Based on the classification, the corner detector 1916 then confirms whether there is in fact a corner in the location within the patch.

The hybrid technique of combining the neural network with the corner detector is also advantageous because it works well to detect corners in images with low light. Because the neural network 1915 uses global context to identify features of interest, it allows the corner detector 1916 to identify corners using the heatmap provided by the neural network 1915 even in low light situations.

Figure 24:
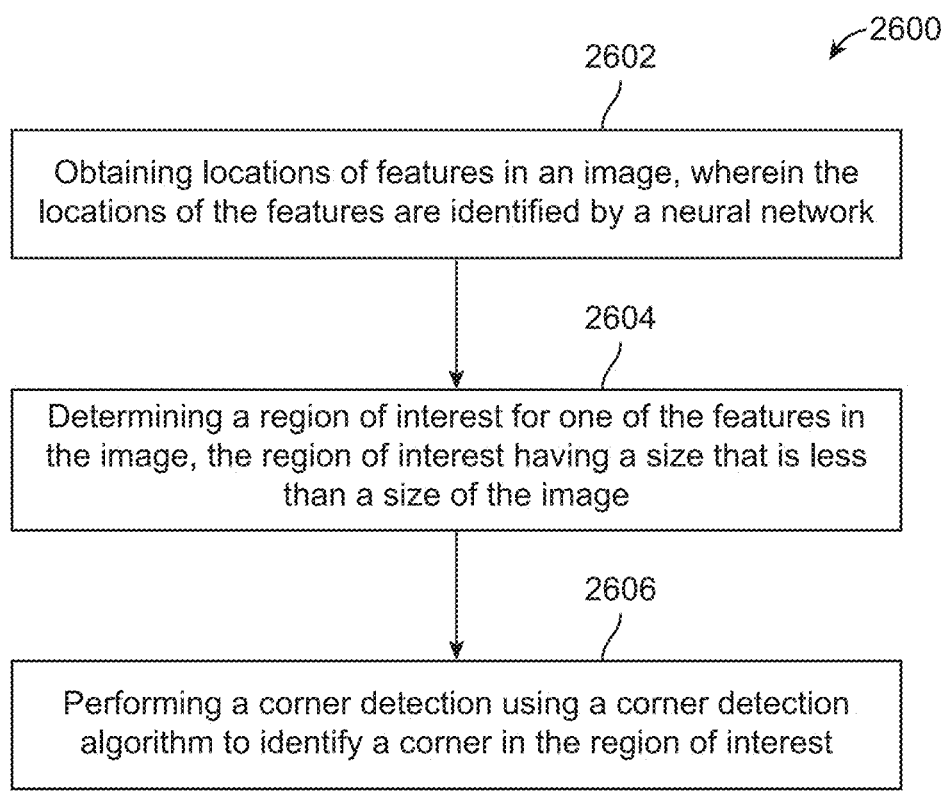
FIG. 24 illustrates a method performed by the processing unit of FIG. 22A.

Method Performed by the Processing Unit and/or Application in the Processing Unit FIG. 24 illustrates a method 2600 in accordance with some embodiments. The method 2600 may be performed by an apparatus that is configured to be head-worn by a user, the apparatus having a screen configured to present graphics for the user, a camera system configured to view an environment in which the user is located, and a processing unit. In some embodiments, the method 2600 may be performed by any of the image display devices 1601 shown in FIGS. 15-18. For example, the method 2600 may be performed by the processing unit 1630 of the image display device 1601. The method 2600 includes: obtaining locations of features in an image, wherein the locations of the features are identified by a neural network (item 2602); determining a region of interest for one of the features in the image, the region of interest having a size that is less than a size of the image (item 2604); and performing a corner detection using a corner detection algorithm to identify a corner in the region of interest (item 2606).

Optionally, in the method 2600, the region of interest is determined based on at least one of the locations identified by the neural network.

Optionally, the method 2600 further includes: generating the image; and transmitting the image to the neural network.

Optionally, in the method 2600, the neural network is in a module of the head-worn image display device.

Optionally, in the method 2600, the neural network is implemented in one or more computing devices that are remote from the head-worn image display device.

Optionally, in the method 2600, the neural network has machine learning capability.

Optionally, in the method 2600, the locations of the features are obtained by receiving a heatmap from the neural network, wherein the heatmap indicates the locations of the features.

Optionally, in the method 2600, the region of interest comprises a N×N patch, and the corner detection is performed on the N×N patch, and wherein N is an integer larger than 1.

Optionally, in the method 2600, the region of interest comprises a patch having 144 pixels or less, and the corner detection is performed on the patch.

Optionally, in the method 2600, the region of interest comprises a 8×8 patch, and the corner detection is performed on the 8×8 patch.

Optionally, in the method 2600, the image has a first resolution, and wherein the locations of the features are identified by the neural network based on other image having a second resolution that is less than the first resolution.

Optionally, in the method 2600, the method further includes converting the image with the first resolution to the other image with the second resolution.

Optionally, in the method 2600, the first resolution comprises a VGA resolution.

Optionally, in the method 2600, the second resolution comprises a QVGA resolution.

Optionally, in the method 2600, the method further includes the neural network.

Optionally, in the method 2600, the neural network has been trained using a reference dataset.

Optionally, in the method 2600, the neural network comprises a convolutional neural network.

Optionally, in the method 2600, the neural network is configured to compute interest point locations and descriptors.

Optionally, in the method 2600, the neural network comprises an encoder configured to down sample an input image spatially.

Optionally, in the method 2600, the neural network also comprises: an interest point decoder configured to operate on an encoder output from the encoder, and produce a score for each pixel in the input image; and a descriptor decoder configured to operate on the encoder output, up sample the encoder output to a higher resolution, and produce a vector for each pixel in the input image.

Optionally, in the method 2600, the neural network is configured to use homographic adaptation for improving geometric consistency of an interest point detector.

Optionally, in the method 2600, the neural network comprises a convolutional neural network, and wherein the interest point detector is trained with the convolutional neural network.

Optionally, in the method 2600, the neural network is configured to perform image warping to create one or more warped images in the homographic adaptation.

Optionally, the method 2600 further includes determining a position of the corner in the image based at least in part on a position of the corner in the patch.

Optionally, the method 2600 further includes storing the position of the first corner in the image in a non-transitory medium.

Optionally, the method 2600 further includes determining a score for each pixel in the region of interest.

Specialized Processing System

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

Figure 25:
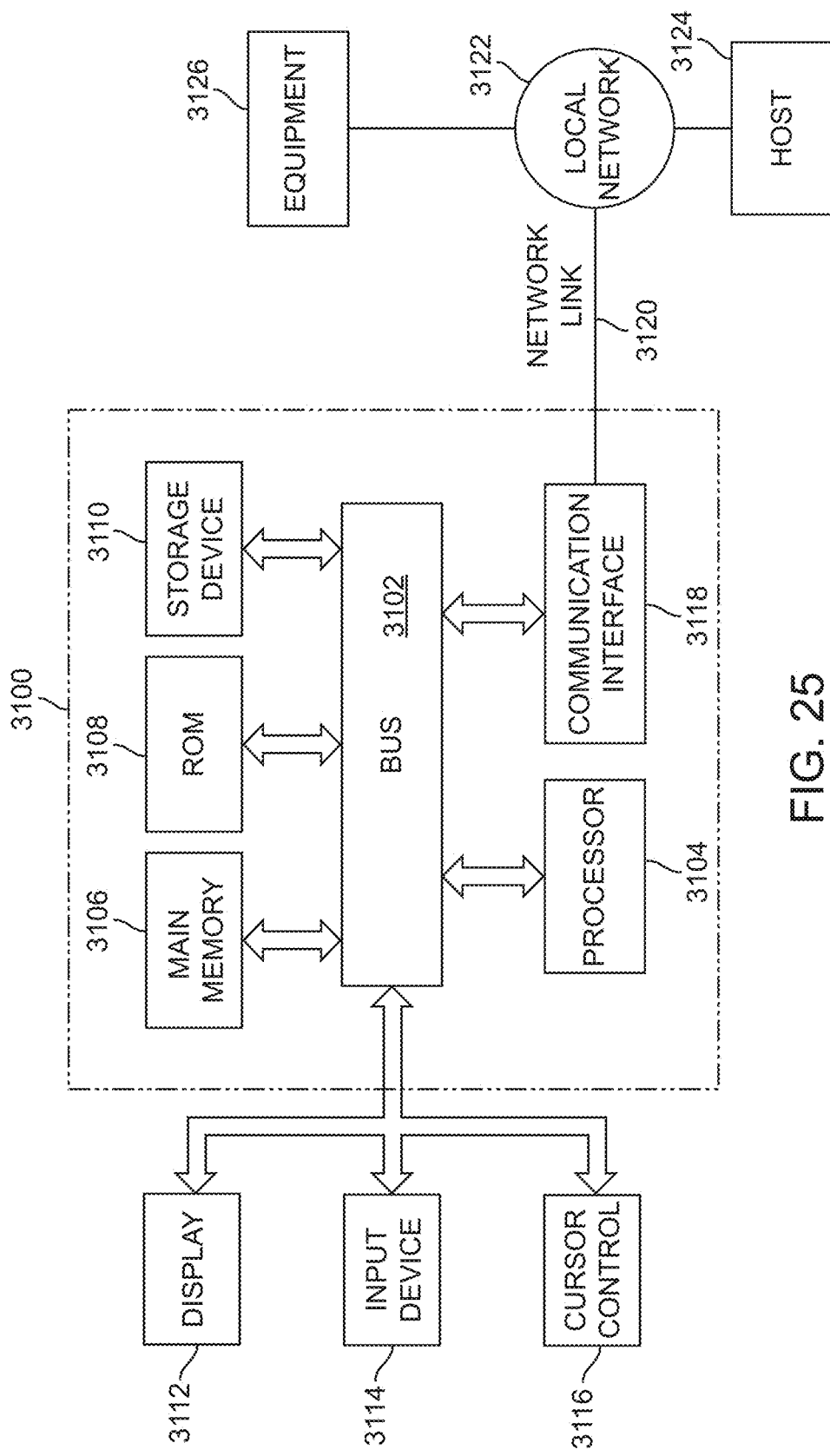
FIG. 25 illustrates a specialized processing system in accordance with some embodiments.

FIG. 25 is a block diagram illustrating an embodiment of a specialized processing system 3100 that can be used to implement various features described herein. For example, in some embodiments, the processing system 3100 may be used to implement the image display device 3101. Processing system 3100 includes a bus 3102 or other communication mechanism for communicating information, and a processor 3104 coupled with the bus 3102 for processing information. The processor system 3100 also includes a main memory 3106, such as a random access memory (RAM) or other dynamic storage device, coupled to the bus 3102 for storing information and instructions to be executed by the processor 3104. The main memory 3106 also may be used for storing temporary variables or other intermediate information during execution of instructions to be executed by the processor 3104. The processor system 3100 further includes a read only memory (ROM) 3108 or other static storage device coupled to the bus 3102 for storing static information and instructions for the processor 3104. A data storage device 3110, such as a magnetic disk, solid state disk, or optical disk, is provided and coupled to the bus 3102 for storing information and instructions.

The processor system 3100 may be coupled via the bus 3102 to a display 3112, such as a screen, for displaying information to a user. In some cases, if the processing system 3100 is part of the apparatus that includes a touch-screen, the display 3112 may be the touch-screen. An input device 3114, including alphanumeric and other keys, is coupled to the bus 3102 for communicating information and command selections to processor 3104. Another type of user input device is cursor control 3116, such as a mouse, a trackball, or cursor direction keys for communicating direction information and command selections to processor 3104 and for controlling cursor movement on display 3112. This input device typically has two degrees of freedom in two axes, a first axis (e.g., x) and a second axis (e.g., y), that allows the device to specify positions in a plane. In some cases, if the processing system 3100 is part of the apparatus that includes a touch-screen, the input device 3114 and the curser control may be the touch-screen. Another type of use input device is an optical camera and/or a depth sensing camera, which is configured to detect hand gestures. Such user input device does not require the user to touch anything, and command by the user may be interpreted based on the hand gesture.

In some embodiments, the processor system 3100 can be used to perform various functions described herein. According to some embodiments, such use is provided by processor system 3100 in response to processor 3104 executing one or more sequences of one or more instructions contained in the main memory 3106. Those skilled in the art will know how to prepare such instructions based on the functions and methods described herein. Such instructions may be read into the main memory 3106 from another processor-readable medium, such as storage device 3110. Execution of the sequences of instructions contained in the main memory 3106 causes the processor 3104 to perform the process steps described herein. One or more processors in a multi-processing arrangement may also be employed to execute the sequences of instructions contained in the main memory 3106. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 3104 for execution. Such a medium may take many forms, including but not limited to, non-volatile media, volatile media, and transmission media. Non-volatile media includes, for example, optical, solid state or magnetic disks, such as the storage device 3110. A non-volatile medium may be considered an example of non-transitory medium. Volatile media includes dynamic memory, such as the main memory 3106. A volatile medium may be considered an example of non-transitory medium. Transmission media includes coaxial cables, copper wire and fiber optics, including the wires that comprise the bus 3102. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 3104 for execution. For example, the instructions may initially be carried on a magnetic disk or solid state disk of a remote computer. The remote computer can load the instructions into its dynamic memory and send the instructions over a network, such as the Internet. The processing system 3100 can receive the data on a network line. The bus 3102 carries the data to the main memory 3106, from which the processor 3104 retrieves and executes the instructions. The instructions received by the main memory 3106 may optionally be stored on the storage device 3110 either before or after execution by the processor 3104.

The processing system 3100 also includes a communication interface 3118 coupled to the bus 3102. The communication interface 3118 provides a two-way data communication coupling to a network link 3120 that is connected to a local network 3122. For example, the communication interface 3118 may be a local area network (LAN) card to provide a data communication connection to a compatible LAN. Wireless links may also be implemented. In any such implementation, the communication interface 3118 sends and receives electrical, electromagnetic or optical signals that carry data streams representing various types of information.

The network link 3120 typically provides data communication through one or more networks to other devices. For example, the network link 3120 may provide a connection through local network 3122 to a host computer 3124 or to equipment 3126. The data streams transported over the network link 3120 can comprise electrical, electromagnetic or optical signals. The signals through the various networks and the signals on the network link 3120 and through the communication interface 3118, which carry data to and from the processing system 3100, are exemplary forms of carrier waves transporting the information. The processing system 3100 can send messages and receive data, including program code, through the network(s), the network link 3120, and the communication interface 3118.

In one aspect, some embodiments may employ the processing system 3100 to perform methods in accordance with various embodiments of the technology. According to a set of embodiments, some or all of the procedures of such methods are performed by the processing system 3100 in response to the processing system 310 executing one or more sequences of one or more instructions, which might be incorporated into an operating system and/or other code, such as an application program, contained in the memory of the processing system 3100. Such instructions may be read into the memory from another computer-readable medium, such as one or more of storage device(s). Merely by way of example, execution of the sequences of instructions contained in the memory might cause the processing system 3100 to perform one or more procedures of the methods described herein. Additionally, or alternatively, portions of the methods described herein may be executed through specialized hardware.

In some embodiments, the method 2600 described herein may be performed by the processing system 3100 executing an application, or by the application. The application may contain a set of instruction. Also, the processing system 3100 may be an example of the processing unit 1630. In one implementation, a specialized processing system having a non-transitory medium storing the set of instruction for the application may be provided. The execution of the instruction by the processing unit 1630 of the image display device 1601 will cause the processing unit 1630 to perform the features described herein.

In some embodiments, the image display device 1601 may also be considered as a specialized processing system. In particular, the image display device 1601 is a specialized processing system in that it contains instruction stored in its non-transitory medium for execution by the processing unit 1630 to provide unique tangible effects in a real world. The features provided by the image display device 1601 (as a result of the processing unit 1630 executing the instruction) provide improvements in the technological field of corner detection, localization map creation, and image-based localization.

It should be noted that the term "image", as used in this specification, may refer to image that is displayed, and/or image that is not in displayed form (e.g., image or image data being stored in a medium, or being processed).

In addition, as used in this specification, the term "apparatus" may refer to a single device or component, or multiple devices or components that may or may not be physically connected together and/or that may or may not be located in a same geographical region. For example, two or more devices or components in wireless communication with each other may be collectively considered as an "apparatus". As another example, an apparatus may comprise two devices in different geographical regions that are in communication with each other. Furthermore, an apparatus may be software, hardware, or a combination of both. In some embodiments, an apparatus includes at least some hardware, such as an integrated circuit (e.g., a processor).

Furthermore, as used in this specification, the term "processing unit" may refer to hardware, software, or a combination of both. By means of non-limiting examples, a processing unit may be one or more software modules, one or more applications, an integrated circuit (such as one or more processors, one or more hardware components, etc.), or a combination of the foregoing.

Exemplary aspects of the present application, together with details regarding material selection and manufacture have been set forth above. As for other details of the present application, these may be appreciated in connection with the above-referenced patents and publications as well as generally known or appreciated by those with skill in the art. The same may hold true with respect to method-based aspects of the present application in terms of additional acts as commonly or logically employed.

In addition, though the present application has been described in reference to several examples optionally incorporating various features, the present application is not to be limited to that which is described or indicated as contemplated with respect to each variation of the present application. Various changes may be made to the present application described and equivalents (whether recited herein or not included for the sake of some brevity) may be substituted without departing from the true spirit and scope of the present application. In addition, where a range of values is provided, it is understood that every intervening value, between the upper and lower limit of that range and any other stated or intervening value in that stated range, is encompassed within the present application.

Also, it is contemplated that any optional feature of the inventive variations described may be set forth and claimed independently, or in combination with any one or more of the features described herein. Reference to a singular item, includes the possibility that there is plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

The breadth of the present application is not to be limited to the examples provided and/or the subject specification, but rather only by the scope of claim language associated with this application.

In the foregoing specification, the present application has been described with reference to specific embodiments thereof. It will, however, be evident that various modifications and changes may be made thereto without departing from the broader spirit and scope of the present application. For example, the above-described process flows are described with reference to a particular ordering of process actions. However, the ordering of many of the described process actions may be changed without affecting the scope or operation of the present application. The specification and drawings are, accordingly, to be regarded in an illustrative rather than restrictive sense.

What is claimed is:

1. A method of training and using a neural network for image interest point detection, comprises:
   generating a reference dataset comprising a plurality of reference sets, wherein each of the plurality of reference sets comprises:
   an image, and
   a set of reference interest points corresponding to the image; and for each reference set of the plurality of reference sets:
    generating a warped image by applying a homograph to the image,
    generating a warped set of reference interest points by applying the homograph to the set of reference interest points,
    calculating, by the neural network receiving the image as input, a set of calculated interest points and a calculated descriptor,
    calculating, by the neural network receiving the warped image as input, a set of calculated warped interest points and a calculated warped descriptor,
    calculating a loss based on the set of calculated interest points, the calculated descriptor, the set of calculated warped interest points, the calculated warped descriptor, the set of reference interest points, the warped set of reference interest points, and the homograph, and
    modifying the neural network based on the loss; wherein the method further comprises: obtaining locations of features in an input image, wherein the locations of the features are identified by the neural network; determining a region of interest for one of the features in the input image, the region of interest having a size that is less than a size of the input image; and performing a corner detection using a corner detection algorithm to identify a corner in the region of interest.

2. The method of claim 1, wherein the neural network comprises an interest point detector subnetwork and a descriptor subnetwork,
    wherein the interest point detector subnetwork is configured to receive the image as input and calculate the set of calculated interest points based on the image, and
    wherein the descriptor subnetwork is configured to receive the image as input and calculate the calculated descriptor based on the image.

3. The method of claim 1, wherein modifying the neural network based on the loss comprises modifying one or both of the interest point detector subnetwork and the descriptor subnetwork based on the loss.

4. The method of claim 1, further comprising prior to generating the reference dataset, training the interest point detector subnetwork using a synthetic dataset comprising a plurality of synthetic images and a plurality of sets of synthetic interest points,
    wherein generating the reference dataset comprises generating the reference dataset using the interest point detector subnetwork.

5. The method of claim 1, wherein generating the reference dataset comprises:
    for each reference set of the plurality of reference sets:
        obtaining the image from an unlabeled dataset comprising a plurality of unlabeled images,
        generating a plurality of warped images by applying a plurality of homographs to the image,
        calculating, by the neural network receiving the plurality of warped images as input, a plurality of sets of calculated warped interest points,
        generating a plurality of sets of calculated interest points by applying a plurality of inverse homographs to the plurality of sets of calculated warped interest points, and
        aggregating the plurality of sets of calculated interest points to obtain the set of reference interest points.

6. The method of claim 1, wherein each of the plurality of reference sets further includes a reference descriptor corresponding to the image, and wherein generating the reference dataset includes:
    for each reference set of the plurality of reference sets:
        obtaining the image from an unlabeled dataset comprising a plurality of unlabeled images,
        generating a plurality of warped images by applying a plurality of homographs to the image,
        calculating, by the neural network receiving the plurality of warped images as input, a plurality of calculated warped descriptors,
        generating a plurality of calculated descriptors by applying a plurality of inverse homographs to the plurality of calculated warped descriptors, and
        aggregating the plurality of calculated descriptors to obtain the reference descriptor.

7. The method of claim 1, wherein the set of reference interest points is a two-dimensional map having values corresponding to a probability that a particular pixel of the image has an interest point is located at the particular pixel.

8. A method comprising:
    capturing a first image;
    capturing a second image;
    calculating, by a neural network receiving the first image as input, a first set of calculated interest points and a first calculated descriptor;
    calculating, by the neural network receiving the second image as input, a second set of calculated interest points and a second calculated descriptor; and
    determining a homograph between the first image and the second image based on the first and second sets of calculated interest points and the first and second calculated descriptors,
    wherein the neural network includes: an interest point detector subnetwork configured to calculate the first set of calculated interest points and the second set of calculated interest points, and a descriptor subnetwork configured to calculate the first calculated descriptor and the second calculated descriptor, and
    wherein the method further comprises:
        obtaining locations of features in an input image, wherein the locations of the features are identified by the neural network;
        determining a region of interest for one of the features in the input image, the region of interest having a size that is less than a size of the input image; and
        performing a corner detection using a corner detection algorithm to identify a corner in the region of interest.

9. The method of claim 8, wherein:
the interest point detector subnetwork is configured to calculate the first set of calculated interest points concurrently with the descriptor subnetwork calculating the first calculated descriptor; and
the interest point detector subnetwork is configured to calculate the second set of calculated interest points concurrently with the descriptor subnetwork calculating the second calculated descriptor.

10. The method of claim 8, further comprising training the neural network by generating a reference dataset comprising a plurality of reference sets, wherein each of the plurality of reference sets includes an image and a set of reference interest points corresponding to the image; and
    for each reference set of the plurality of reference sets:
        generating a warped image by applying a homograph to the image, generating a warped set of reference interest points by applying the homograph to the set of reference interest points, calculating, by the neural network receiving the image as input, a set of calculated interest points and a calculated descriptor, calculating, by the neural network receiving the warped image as input, a set of calculated warped interest points and a calculated warped descriptor, calculating a loss based on the set of calculated interest points, the calculated descriptor, the set of calculated warped interest points, the calculated warped descriptor, the set of reference interest points, the warped set of reference interest points, and the homograph, and modifying the neural network based on the loss.

11. The method of claim 10, wherein modifying the neural network based on the loss includes modifying one or both of the interest point detector subnetwork and the descriptor subnetwork based on the loss.

12. The method of claim 10, further comprising prior to generating the reference dataset, training the interest point detector subnetwork using a synthetic dataset including a plurality of synthetic images and a plurality of sets of synthetic interest points, wherein generating the reference dataset includes generating the reference dataset using the interest point detector subnetwork.

13. The method of claim 10, wherein generating the reference dataset includes:

for each reference set of the plurality of reference sets:
obtaining the image from an unlabeled dataset comprising a plurality of unlabeled images,
generating a plurality of warped images by applying a plurality of homographs to the image,
calculating, by the neural network receiving the plurality of warped images as input, a plurality of sets of calculated warped interest points,
generating a plurality of sets of calculated interest points by applying a plurality of inverse homographs to the plurality of sets of calculated warped interest points, and
aggregating the plurality of sets of calculated interest points to obtain the set of reference interest points.

14. The method of claim 10, wherein each of the plurality of reference sets further includes a reference descriptor corresponding to the image, and wherein generating the reference dataset includes:

for each reference set of the plurality of reference sets:
obtaining the image from an unlabeled dataset comprising a plurality of unlabeled images,
generating a plurality of warped images by applying a plurality of homographs to the image,
calculating, by the neural network receiving the plurality of warped images as input, a plurality of calculated warped descriptors,
generating a plurality of calculated descriptors by applying a plurality of inverse homographs to the plurality of calculated warped descriptors, and
aggregating the plurality of calculated descriptors to obtain the reference descriptor.

15. An optical device comprising:
at least one camera configured to capture a first image and a second image; and
one or more processors coupled to the camera and configured to perform operations comprising:
receiving the first image and the second image from the at least one camera,
calculating, by a neural network using the first image as an input, a first set of calculated interest points and a first calculated descriptor,
calculating, by the neural network using the second image as an input, a second set of calculated interest points and a second calculated descriptor, and
determining a homograph between the first image and the second image based on the first and second sets of calculated interest points and the first and second calculated descriptors;
wherein the neural network includes:
an interest point detector subnetwork configured to calculate the first set of calculated interest points and the second set of calculated interest points\, and
a descriptor subnetwork configured to calculate the first calculated descriptor and the second calculated descriptor; and
wherein the one or more processors are configured to:
obtain locations of features in an input image, wherein the locations of the features are identified by the neural network,
determine a region of interest for one of the features in the input image, the region of interest having a size that is less than a size of the image, and
perform a corner detection using a corner detection algorithm to identify a corner in the region of interest.

16. The optical device of claim 15, wherein:
the interest point detector subnetwork is configured to calculate the first set of calculated interest points concurrently with the descriptor subnetwork calculating the first calculated descriptor; and
the interest point detector subnetwork is configured to calculate the second set of calculated interest points concurrently with the descriptor subnetwork calculating the second calculated descriptor.

17. The optical device of claim 15, wherein the neural network was previously trained by generating a reference dataset comprising a plurality of reference sets, wherein each of the plurality of reference sets includes an image and a set of reference interest points corresponding to the image; and for each reference set of the plurality of reference sets:
generating a warped image by applying a homograph to the image,
generating a warped set of reference interest points by applying the homograph to the set of reference interest points,
calculating, by the neural network receiving the image as input, a set of calculated interest points and a calculated descriptor,
calculating, by the neural network receiving the warped image as input, a set of calculated warped interest points and a calculated warped descriptor,
calculating a loss based on the set of calculated interest points, the calculated descriptor, the set of calculated warped interest points, the calculated warped descriptor, the set of reference interest points, the warped set of reference interest points, and the homograph, and
modifying the neural network based on the loss.

18. The optical device of claim 17, wherein modifying the neural network based on the loss includes modifying one or both of the interest point detector subnetwork and the descriptor subnetwork based on the loss.

19. The optical device of claim 17, wherein generating the reference dataset includes:
for each reference set of the plurality of reference sets:
obtaining the image from an unlabeled dataset comprising a plurality of unlabeled images,
generating a plurality of warped images by applying a plurality of homographs to the image,
calculating, by the neural network receiving the plurality of warped images as input, a plurality of sets of calculated warped interest points,
generating a plurality of sets of calculated interest points by applying a plurality of inverse homographs to the plurality of sets of calculated warped interest points, and
aggregating the plurality of sets of calculated interest points to obtain the set of reference interest points.

* * * * *